US012638840B2

(12) United States Patent
Cohn et al.

(10) Patent No.: US 12,638,840 B2
(45) **Date of Patent: *May 26, 2026**

(54) METHOD AND SYSTEM FOR MANAGING COMMUNICATION CONNECTIVITY

(71) Applicant: iControl Networks, Inc., Philadelphia, PA (US)

(72) Inventors: Alan Wade Cohn, Austin, TX (US); Ronald E. Battles, Florence, TX (US); David Proft, Austin, TX (US); Scott William Shumate, Austin, TX (US)

(73) Assignee: iControl Networks, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,196

(22) Filed: Oct. 9, 2023

(65) Prior Publication Data

US 2024/0111280 A1     Apr. 4, 2024

Related U.S. Application Data

(63) Continuation of application No. 17/542,310, filed on Dec. 3, 2021, now Pat. No. 11,809,174, which is a
(Continued)

(51) Int. Cl.
*G05B 23/02* (2006.01)

(52) U.S. Cl.
CPC .................................. *G05B 23/027* (2013.01)

(58) Field of Classification Search
CPC .................................................... G05B 23/027
See application file for complete search history.

(56) References Cited

U.S. PATENT DOCUMENTS

| 686,838 A | 11/1901 | Richard |
| 1,738,540 A | 12/1929 | Replogle et al. |

(Continued)

FOREIGN PATENT DOCUMENTS

| AU | 2005223267 B2 | 12/2010 |
| AU | 2010297957 A1 | 5/2012 |

(Continued)

OTHER PUBLICATIONS

US Patent Application filed Mar. 10, 2014, entitled "Communication Protocols in Integrated Systems", U.S. Appl. No. 14/202,592.

(Continued)

*Primary Examiner* — Nay Tun
(74) *Attorney, Agent, or Firm* — BakerHostetler

(57) ABSTRACT

A system may provide a plurality of communication modes to a remote server system and provide remote control and monitoring of the system via two-way communication. The system may communicate with an alarm processor of an alarm system. The system may determine a communication mode to provide communication between the alarm system and the remote server. The system may send status and alarm conditions to the remote server, and the system may send control signals to the alarm system. The remote server may provide a pre-determined response to information received from the alarm system, for example the alarm system may provide alarm system condition information to a user or a monitoring station for response.

24 Claims, 8 Drawing Sheets

Related U.S. Application Data continuation of application No. 16/898,146, filed on Jun. 10, 2020, now Pat. No. 11,194,320, which is a continuation of application No. 13/153,807, filed on Jun. 6, 2011, now Pat. No. 10,747,216, which is a continuation of application No. 12/620,047, filed on Nov. 17, 2009, now Pat. No. 7,956,736, which is a continuation of application No. 11/711,972, filed on Feb. 28, 2007, now Pat. No. 7,633,385.

(56) References Cited

U.S. PATENT DOCUMENTS

| | | | |
|---|---|---|---|
| 3,803,576 A | 4/1974 | Dobrzanski et al. |
| 3,852,541 A | 12/1974 | Altenberger |
| 4,006,460 A | 2/1977 | Hewitt et al. |
| 4,141,006 A | 2/1979 | Braxton |
| 4,206,449 A | 6/1980 | Apsell et al. |
| 4,257,038 A | 3/1981 | Rounds et al. |
| 4,286,331 A | 8/1981 | Anderson et al. |
| 4,304,970 A | 12/1981 | Fahey et al. |
| 4,351,023 A | 9/1982 | Richer |
| 4,363,031 A | 12/1982 | Reinowitz |
| 4,459,582 A | 7/1984 | Sheahan et al. |
| 4,465,904 A | 8/1984 | Gottsegen et al. |
| 4,520,503 A | 5/1985 | Kirst et al. |
| 4,559,526 A | 12/1985 | Tani et al. |
| 4,559,527 A | 12/1985 | Kirby |
| 4,567,557 A | 1/1986 | Burns |
| 4,574,305 A | 3/1986 | Campbell et al. |
| 4,581,606 A | 4/1986 | Mallory |
| 4,591,834 A | 5/1986 | Kyle |
| D284,084 S | 6/1986 | Ferrara, Jr. |
| 4,641,127 A | 2/1987 | Hogan et al. |
| 4,652,859 A | 3/1987 | Van Wienen |
| 4,670,739 A | 6/1987 | Kelly, Jr. |
| 4,683,460 A | 7/1987 | Nakatsugawa |
| 4,694,282 A | 9/1987 | Tamura et al. |
| 4,716,973 A | 1/1988 | Cobern |
| 4,730,184 A | 3/1988 | Bach |
| 4,754,261 A | 6/1988 | Marino |
| 4,755,792 A | 7/1988 | Pezzolo et al. |
| 4,779,007 A | 10/1988 | Schlanger et al. |
| 4,785,289 A | 11/1988 | Chen |
| 4,801,924 A | 1/1989 | Burgmann et al. |
| 4,812,820 A | 3/1989 | Chatwin |
| 4,818,970 A | 4/1989 | Natale et al. |
| 4,833,339 A | 5/1989 | Luchaco et al. |
| 4,833,449 A | 5/1989 | Gaffigan |
| 4,855,713 A | 8/1989 | Brunius |
| 4,860,185 A | 8/1989 | Brewer et al. |
| 4,887,064 A | 12/1989 | Drori et al. |
| 4,897,630 A | 1/1990 | Nykerk |
| 4,918,623 A | 4/1990 | Lockitt et al. |
| 4,918,717 A | 4/1990 | Bissonnette et al. |
| 4,951,029 A | 8/1990 | Severson |
| 4,959,713 A | 9/1990 | Morotomi et al. |
| 4,962,473 A | 10/1990 | Crain |
| 4,980,666 A | 12/1990 | Hwang |
| 4,993,059 A | 2/1991 | Smith et al. |
| 4,994,787 A | 2/1991 | Kratt et al. |
| 4,996,646 A | 2/1991 | Farrington |
| 5,023,901 A | 6/1991 | Sloan et al. |
| 5,061,916 A | 10/1991 | French et al. |
| 5,083,106 A | 1/1992 | Kostusiak et al. |
| 5,086,385 A | 2/1992 | Launey et al. |
| 5,091,780 A | 2/1992 | Pomerleau |
| 5,109,278 A | 4/1992 | Erickson et al. |
| 5,132,968 A | 7/1992 | Cephus |
| 5,134,644 A * | 7/1992 | Garton .............. H04M 11/002 |
| | | 379/39 |
| 5,159,315 A | 10/1992 | Schultz et al. |
| 5,160,879 A | 11/1992 | Tortola et al. |
| 5,164,703 A | 11/1992 | Rickman |
| 5,164,979 A | 11/1992 | Choi |
| D337,569 S | 7/1993 | Kando |

| | | | |
|---|---|---|---|
| 5,227,776 A | 7/1993 | Starefoss |
| 5,237,305 A | 8/1993 | Ishikuro et al. |
| 5,245,694 A | 9/1993 | Zwern |
| 5,247,232 A | 9/1993 | Lin |
| 5,280,527 A | 1/1994 | Gullman et al. |
| 5,283,816 A | 2/1994 | Gomez Diaz |
| 5,299,971 A | 4/1994 | Hart |
| 5,319,394 A | 6/1994 | Dukek |
| 5,319,698 A | 6/1994 | Glidewell et al. |
| 5,334,974 A | 8/1994 | Simms et al. |
| 5,400,011 A | 3/1995 | Sutton |
| 5,400,246 A | 3/1995 | Wilson et al. |
| 5,406,260 A | 4/1995 | Cummings et al. |
| 5,410,343 A | 4/1995 | Coddington et al. |
| 5,412,708 A | 5/1995 | Katz |
| 5,414,409 A | 5/1995 | Voosen et al. |
| 5,414,833 A | 5/1995 | Hershey et al. |
| 5,428,293 A | 6/1995 | Sinclair et al. |
| 5,438,607 A | 8/1995 | Przygoda et al. |
| 5,446,445 A | 8/1995 | Bloomfield et al. |
| 5,448,290 A | 9/1995 | Vanzeeland |
| 5,452,344 A | 9/1995 | Larson |
| 5,465,081 A | 11/1995 | Todd |
| 5,471,194 A | 11/1995 | Guscott |
| 5,481,312 A | 1/1996 | Cash et al. |
| 5,483,224 A | 1/1996 | Rankin et al. |
| 5,486,812 A | 1/1996 | Todd |
| 5,499,014 A | 3/1996 | Greenwaldt |
| 5,499,196 A | 3/1996 | Pacheco |
| 5,510,975 A | 4/1996 | Ziegler, Jr. |
| 5,519,878 A | 5/1996 | Dolin, Jr. |
| RE35,268 E | 6/1996 | Frolov et al. |
| 5,525,966 A | 6/1996 | Parish |
| 5,526,428 A | 6/1996 | Arnold |
| 5,534,845 A | 7/1996 | Issa et al. |
| 5,541,585 A | 7/1996 | Duhame et al. |
| 5,543,778 A | 8/1996 | Stouffer |
| 5,546,072 A | 8/1996 | Creuseremee et al. |
| 5,546,074 A | 8/1996 | Bernal et al. |
| 5,546,447 A | 8/1996 | Skarbo et al. |
| 5,548,646 A | 8/1996 | Aziz et al. |
| 5,550,984 A | 8/1996 | Gelb |
| 5,557,254 A | 9/1996 | Johnson et al. |
| 5,565,843 A | 10/1996 | Meyvis |
| 5,570,079 A | 10/1996 | Dockery |
| 5,572,438 A | 11/1996 | Ehlers et al. |
| 5,578,989 A | 11/1996 | Pedtke |
| 5,579,197 A | 11/1996 | Mengelt et al. |
| 5,579,221 A | 11/1996 | Mun |
| D377,034 S | 12/1996 | Matsushita |
| 5,586,254 A | 12/1996 | Kondo et al. |
| 5,587,705 A | 12/1996 | Morris |
| 5,598,086 A | 1/1997 | Somerville |
| 5,602,918 A | 2/1997 | Chen et al. |
| 5,604,493 A | 2/1997 | Behlke |
| 5,606,615 A | 2/1997 | Lapointe et al. |
| 5,621,662 A | 4/1997 | Humphries et al. |
| 5,623,601 A | 4/1997 | Vu |
| 5,625,338 A | 4/1997 | Pildner et al. |
| 5,625,410 A | 4/1997 | Washino et al. |
| 5,629,687 A | 5/1997 | Sutton et al. |
| 5,630,216 A | 5/1997 | Mcewan |
| 5,631,630 A | 5/1997 | Mcsweeney |
| 5,638,046 A | 6/1997 | Malinowski |
| 5,650,773 A | 7/1997 | Chiarello |
| 5,651,070 A | 7/1997 | Blunt |
| 5,652,567 A | 7/1997 | Traxler |
| 5,654,694 A | 8/1997 | Newham |
| 5,675,321 A | 10/1997 | McBride |
| 5,680,131 A | 10/1997 | Utz |
| 5,682,133 A | 10/1997 | Johnson et al. |
| 5,686,885 A | 11/1997 | Bergman |
| 5,686,896 A | 11/1997 | Bergman |
| 5,689,235 A | 11/1997 | Sugimoto et al. |
| 5,689,708 A | 11/1997 | Regnier et al. |
| 5,691,697 A | 11/1997 | Carvalho et al. |
| 5,694,335 A | 12/1997 | Hollenberg |
| 5,694,595 A | 12/1997 | Jacobs et al. |
| 5,696,486 A | 12/1997 | Poliquin et al. |

(56)            References Cited

U.S. PATENT DOCUMENTS

| | | | |
|---|---|---|---|
| 5,696,898 A | 12/1997 | Baker et al. |
| D389,501 S | 1/1998 | Mascarenas et al. |
| 5,706,191 A | 1/1998 | Bassett et al. |
| 5,712,679 A | 1/1998 | Coles |
| 5,714,933 A | 2/1998 | Le Van Suu |
| 5,715,394 A | 2/1998 | Jabs |
| 5,717,378 A | 2/1998 | Malvaso et al. |
| 5,717,379 A | 2/1998 | Peters |
| 5,717,578 A | 2/1998 | Afzal |
| 5,719,551 A | 2/1998 | Flick |
| 5,726,912 A | 3/1998 | Krall et al. |
| 5,731,756 A | 3/1998 | Roddy |
| 5,736,927 A | 4/1998 | Stebbins et al. |
| 5,737,391 A | 4/1998 | Dame et al. |
| 5,748,084 A | 5/1998 | Isikoff |
| 5,748,089 A | 5/1998 | Sizemore |
| 5,757,616 A | 5/1998 | May et al. |
| 5,761,206 A | 6/1998 | Kackman |
| 5,774,051 A | 6/1998 | Kostusiak |
| 5,777,551 A | 7/1998 | Hess |
| 5,777,837 A | 7/1998 | Eckel et al. |
| 5,784,461 A | 7/1998 | Shaffer et al. |
| 5,784,463 A | 7/1998 | Chen et al. |
| 5,790,531 A | 8/1998 | Ellebracht et al. |
| 5,793,028 A | 8/1998 | Wagener et al. |
| 5,793,763 A | 8/1998 | Mayes et al. |
| 5,794,128 A | 8/1998 | Brockel et al. |
| 5,796,401 A | 8/1998 | Winer |
| 5,798,701 A | 8/1998 | Bernal et al. |
| 5,801,618 A | 9/1998 | Jenkins |
| 5,805,056 A | 9/1998 | Mueller et al. |
| 5,805,064 A | 9/1998 | Yorkey |
| 5,808,547 A | 9/1998 | Carney |
| 5,809,013 A | 9/1998 | Kackman |
| 5,809,265 A | 9/1998 | Blair et al. |
| 5,812,054 A | 9/1998 | Cohen |
| 5,819,124 A | 10/1998 | Somner et al. |
| 5,821,937 A | 10/1998 | Tonelli et al. |
| 5,825,865 A | 10/1998 | Oberlander et al. |
| 5,838,226 A | 11/1998 | Houggy et al. |
| 5,844,599 A | 12/1998 | Hildin |
| 5,845,070 A | 12/1998 | Ikudome |
| 5,845,081 A | 12/1998 | Rangarajan et al. |
| 5,854,588 A | 12/1998 | Dockery |
| 5,859,966 A | 1/1999 | Hayman et al. |
| 5,861,804 A | 1/1999 | Fansa et al. |
| 5,864,614 A | 1/1999 | Farris et al. |
| 5,867,484 A | 2/1999 | Shaunfield |
| 5,867,495 A | 2/1999 | Elliott et al. |
| 5,874,952 A | 2/1999 | Morgan |
| 5,875,395 A | 2/1999 | Holmes |
| 5,877,696 A | 3/1999 | Powell |
| 5,877,957 A | 3/1999 | Bennett |
| 5,880,775 A | 3/1999 | Ross |
| 5,881,226 A | 3/1999 | Veneklase |
| 5,886,697 A | 3/1999 | Naughton et al. |
| 5,886,894 A | 3/1999 | Rakoff |
| 5,892,442 A | 4/1999 | Ozery |
| 5,898,831 A | 4/1999 | Hall et al. |
| 5,905,438 A | 5/1999 | Weiss et al. |
| 5,907,279 A | 5/1999 | Bruins et al. |
| 5,909,183 A | 6/1999 | Borgstahl et al. |
| 5,914,655 A | 6/1999 | Clifton et al. |
| 5,923,731 A | 7/1999 | McClure |
| 5,924,069 A | 7/1999 | Kowalkowski et al. |
| 5,926,209 A | 7/1999 | Glatt |
| 5,933,098 A | 8/1999 | Haxton |
| 5,940,387 A | 8/1999 | Humpleman |
| 5,943,394 A | 8/1999 | Ader et al. |
| 5,952,815 A | 9/1999 | Rouillard et al. |
| 5,955,946 A | 9/1999 | Beheshti et al. |
| 5,958,053 A | 9/1999 | Denker |
| 5,959,528 A | 9/1999 | Right et al. |
| 5,959,529 A | 9/1999 | Kail, IV |
| 5,963,916 A | 10/1999 | Kaplan |
| 5,967,975 A | 10/1999 | Ridgeway |
| 5,974,547 A | 10/1999 | Klimenko |
| D416,910 S | 11/1999 | Vasquez |
| 5,982,418 A | 11/1999 | Ely |
| 5,986,548 A | 11/1999 | McGregor |
| 5,991,795 A | 11/1999 | Howard et al. |
| 5,995,838 A | 11/1999 | Oda et al. |
| 5,999,525 A | 12/1999 | Krishnaswamy et al. |
| 6,002,430 A | 12/1999 | McCall et al. |
| 6,009,320 A | 12/1999 | Dudley |
| 6,011,321 A | 1/2000 | Stancu et al. |
| 6,011,921 A | 1/2000 | Takahashi et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Lee et al. |
| 6,049,273 A | 4/2000 | Hess |
| 6,049,598 A | 4/2000 | Peters et al. |
| 6,052,052 A | 4/2000 | Delmonaco |
| 6,052,594 A * | 4/2000 | Chuang ............... H04W 72/542 |
| | | 455/452.2 |
| 6,058,115 A | 5/2000 | Sawyer et al. |
| 6,060,994 A | 5/2000 | Chen |
| 6,067,346 A | 5/2000 | Akhteruzzaman |
| 6,067,440 A | 5/2000 | Diefes |
| 6,069,655 A | 5/2000 | Seeley et al. |
| 6,078,253 A | 6/2000 | Fowler |
| 6,078,257 A | 6/2000 | Ferraro |
| 6,078,649 A | 6/2000 | Small et al. |
| 6,085,030 A | 7/2000 | Whitehead et al. |
| 6,085,238 A | 7/2000 | Yuasa et al. |
| 6,091,771 A | 7/2000 | Seeley et al. |
| 6,094,134 A | 7/2000 | Cohen |
| 6,097,429 A * | 8/2000 | Seeley ............. G08B 13/19645 |
| | | 348/E7.086 |
| 6,104,785 A | 8/2000 | Chen |
| 6,107,918 A | 8/2000 | Klein et al. |
| 6,107,930 A | 8/2000 | Behlke et al. |
| 6,108,034 A | 8/2000 | Kim |
| 6,112,015 A | 8/2000 | Planas et al. |
| 6,112,237 A | 8/2000 | Donaldson et al. |
| 6,117,182 A | 9/2000 | Alpert et al. |
| 6,124,882 A | 9/2000 | Voois et al. |
| 6,128,653 A | 10/2000 | Del et al. |
| 6,134,303 A | 10/2000 | Chen |
| 6,134,591 A | 10/2000 | Nickles |
| 6,138,249 A | 10/2000 | Nolet |
| 6,139,177 A | 10/2000 | Venkatraman et al. |
| 6,140,987 A | 10/2000 | Stein et al. |
| 6,144,993 A | 11/2000 | Fukunaga et al. |
| 6,154,133 A | 11/2000 | Ross et al. |
| 6,157,649 A | 12/2000 | Peirce et al. |
| 6,157,943 A | 12/2000 | Meyer |
| 6,161,182 A | 12/2000 | Nadooshan |
| 6,163,680 A * | 12/2000 | Bridle ................... H04W 84/08 |
| | | 455/515 |
| 6,167,186 A | 12/2000 | Kawasaki et al. |
| 6,167,253 A | 12/2000 | Farris et al. |
| 6,181,341 B1 | 1/2001 | Shinagawa |
| 6,192,282 B1 | 2/2001 | Smith et al. |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 | 3/2001 | Agre et al. |
| 6,208,379 B1 | 3/2001 | Oya et al. |
| 6,208,952 B1 | 3/2001 | Goertzel et al. |
| 6,209,011 B1 | 3/2001 | Vong et al. |
| 6,211,783 B1 | 4/2001 | Wang |
| 6,215,404 B1 | 4/2001 | Morales |
| 6,218,938 B1 | 4/2001 | Lin |
| 6,219,677 B1 | 4/2001 | Howard |
| 6,226,031 B1 | 5/2001 | Barraclough et al. |
| 6,229,429 B1 | 5/2001 | Horon |
| 6,230,271 B1 | 5/2001 | Wadlow et al. |
| 6,239,892 B1 | 5/2001 | Davidson |
| 6,243,683 B1 | 6/2001 | Peters |
| 6,246,320 B1 | 6/2001 | Monroe |
| 6,252,883 B1 | 6/2001 | Schweickart et al. |

(56) References Cited

U.S. PATENT DOCUMENTS

| | | | |
|---|---|---|---|
| 6,259,440 B1 | 7/2001 | Vaughan et al. | |
| 6,263,260 B1 | 7/2001 | Bodmer et al. | |
| 6,268,789 B1 | 7/2001 | Diamant et al. | |
| 6,271,752 B1 | 8/2001 | Vaios | |
| 6,275,227 B1 | 8/2001 | DeStefano | |
| 6,281,790 B1 | 8/2001 | Kimmel et al. | |
| 6,282,569 B1 | 8/2001 | Wallis et al. | |
| 6,286,038 B1 | 9/2001 | Reichmeyer et al. | |
| 6,288,716 B1 | 9/2001 | Humpleman et al. | |
| 6,289,382 B1 | 9/2001 | Bowman-Amuah | |
| 6,292,766 B1 | 9/2001 | Mattos et al. | |
| 6,292,827 B1 | 9/2001 | Raz | |
| 6,295,346 B1 | 9/2001 | Markowitz et al. | |
| 6,295,558 B1 | 9/2001 | Davis et al. | |
| 6,314,425 B1 | 11/2001 | Serbinis et al. | |
| 6,320,506 B1 | 11/2001 | Ferraro | |
| 6,323,897 B1 | 11/2001 | Kogane et al. | |
| D451,529 S | 12/2001 | Vasquez | |
| 6,327,044 B1 | 12/2001 | Shima | |
| 6,331,122 B1 | 12/2001 | Wu | |
| 6,332,193 B1 | 12/2001 | Glass et al. | |
| 6,341,274 B1 | 1/2002 | Leon | |
| 6,347,393 B1 | 2/2002 | Alpert et al. | |
| 6,351,213 B1 | 2/2002 | Hirsch et al. | |
| 6,351,271 B1 | 2/2002 | Mainwaring et al. | |
| 6,351,595 B1 | 2/2002 | Kim | |
| 6,351,829 B1 | 2/2002 | Dupont et al. | |
| 6,353,853 B1 | 3/2002 | Gravlin | |
| 6,353,891 B1 | 3/2002 | Borella et al. | |
| 6,359,560 B1 | 3/2002 | Budge et al. | |
| 6,363,417 B1 | 3/2002 | Howard et al. | |
| 6,363,422 B1 | 3/2002 | Hunter et al. | |
| 6,366,211 B1 | 4/2002 | Parker | |
| 6,366,648 B1 | 4/2002 | Carney | |
| 6,369,695 B2 | 4/2002 | Horon | |
| 6,369,705 B1 | 4/2002 | Kennedy | |
| 6,370,436 B1 | 4/2002 | Howard et al. | |
| 6,374,079 B1 | 4/2002 | Hsu | |
| 6,377,861 B1 | 4/2002 | York | |
| 6,378,109 B1 | 4/2002 | Young et al. | |
| 6,385,772 B1 | 5/2002 | Courtney | |
| 6,392,538 B1 | 5/2002 | Shere | |
| 6,396,531 B1 | 5/2002 | Gerszberg et al. | |
| 6,400,265 B1 | 6/2002 | Saylor et al. | |
| 6,405,348 B1 | 6/2002 | Fallah-Tehrani et al. | |
| 6,411,802 B1 | 6/2002 | Cardina et al. | |
| D460,472 S | 7/2002 | Wang | |
| 6,418,037 B1 | 7/2002 | Zhang | |
| 6,421,080 B1 | 7/2002 | Lambert | |
| 6,430,629 B1 | 8/2002 | Smyers | |
| 6,433,683 B1 | 8/2002 | Robinson | |
| 6,434,604 B1 | 8/2002 | Harada et al. | |
| 6,434,700 B1 | 8/2002 | Alonso et al. | |
| 6,437,692 B1 | 8/2002 | Petite et al. | |
| 6,441,723 B1 | 8/2002 | Mansfield et al. | |
| 6,441,731 B1 | 8/2002 | Hess | |
| 6,442,241 B1 * | 8/2002 | Tsumpes | H04L 12/66 |
| | | | 379/37 |
| 6,445,291 B2 | 9/2002 | Addy et al. | |
| 6,446,111 B1 | 9/2002 | Lowery | |
| 6,446,192 B1 | 9/2002 | Narasimhan et al. | |
| 6,452,490 B1 | 9/2002 | Garland et al. | |
| 6,452,923 B1 | 9/2002 | Gerszberg et al. | |
| 6,452,924 B1 | 9/2002 | Golden et al. | |
| 6,453,687 B2 | 9/2002 | Sharood et al. | |
| D464,328 S | 10/2002 | Vasquez et al. | |
| D464,948 S | 10/2002 | Vasquez et al. | |
| 6,462,507 B2 | 10/2002 | Fisher, Jr. | |
| 6,462,663 B1 | 10/2002 | Wilson et al. | |
| 6,467,084 B1 | 10/2002 | Howard et al. | |
| 6,473,407 B1 | 10/2002 | Ditmer et al. | |
| 6,476,858 B1 | 11/2002 | Ramirez et al. | |
| 6,480,901 B1 | 11/2002 | Weber et al. | |
| 6,484,261 B1 | 11/2002 | Wiegel | |
| 6,486,896 B1 | 11/2002 | Ubillos | |
| 6,493,020 B1 | 12/2002 | Stevenson et al. | |
| 6,496,927 B1 | 12/2002 | McGrane et al. | |
| 6,499,131 B1 | 12/2002 | Savithri et al. | |
| 6,504,479 B1 | 1/2003 | Lemons et al. | |
| 6,507,589 B1 | 1/2003 | Ramasubramani et al. | |
| 6,508,709 B1 | 1/2003 | Karmarkar | |
| 6,515,968 B1 | 2/2003 | Combar et al. | |
| 6,526,581 B1 | 2/2003 | Edson | |
| 6,529,230 B1 | 3/2003 | Chong | |
| 6,529,589 B1 | 3/2003 | Nelson et al. | |
| 6,529,723 B1 | 3/2003 | Bentley | |
| 6,535,110 B1 | 3/2003 | Arora et al. | |
| 6,542,075 B2 | 4/2003 | Barker et al. | |
| 6,542,992 B1 | 4/2003 | Peirce et al. | |
| 6,549,130 B1 | 4/2003 | Joao | |
| 6,552,647 B1 | 4/2003 | Thiessen et al. | |
| 6,553,336 B1 | 4/2003 | Johnson et al. | |
| 6,559,769 B2 | 5/2003 | Anthony et al. | |
| 6,563,800 B1 | 5/2003 | Salo et al. | |
| 6,563,910 B2 | 5/2003 | Menard et al. | |
| 6,567,122 B1 | 5/2003 | Anderson et al. | |
| 6,567,502 B2 | 5/2003 | Zellner et al. | |
| 6,574,234 B1 | 6/2003 | Myer et al. | |
| 6,580,424 B1 | 6/2003 | Krumm | |
| 6,580,950 B1 | 6/2003 | Johnson et al. | |
| 6,587,046 B2 | 7/2003 | Joao | |
| 6,587,235 B1 | 7/2003 | Chaudhuri et al. | |
| 6,587,455 B1 | 7/2003 | Ray et al. | |
| 6,587,736 B2 | 7/2003 | Howard et al. | |
| 6,587,739 B1 | 7/2003 | Abrams et al. | |
| 6,591,094 B1 | 7/2003 | Bentley | |
| 6,593,856 B1 | 7/2003 | Madau | |
| 6,597,703 B1 | 7/2003 | Li et al. | |
| 6,601,086 B1 | 7/2003 | Howard et al. | |
| 6,603,488 B2 | 8/2003 | Humpleman et al. | |
| 6,609,127 B1 | 8/2003 | Lee et al. | |
| 6,611,206 B2 | 8/2003 | Eshelman et al. | |
| 6,615,088 B1 | 9/2003 | Myer et al. | |
| 6,621,827 B1 | 9/2003 | Rezvani et al. | |
| 6,624,750 B1 | 9/2003 | Marman et al. | |
| 6,631,416 B2 | 10/2003 | Bendinelli et al. | |
| 6,636,893 B1 | 10/2003 | Fong | |
| 6,643,355 B1 | 11/2003 | Tsumpes | |
| 6,643,652 B2 | 11/2003 | Helgeson et al. | |
| 6,643,669 B1 | 11/2003 | Novak et al. | |
| 6,643,795 B1 | 11/2003 | Sicola et al. | |
| 6,648,682 B1 | 11/2003 | Wu | |
| 6,658,091 B1 | 12/2003 | Naidoo et al. | |
| 6,661,340 B1 | 12/2003 | Saylor et al. | |
| 6,662,340 B2 | 12/2003 | Rawat et al. | |
| 6,665,004 B1 | 12/2003 | Paff | |
| 6,667,688 B1 | 12/2003 | Menard et al. | |
| 6,674,767 B1 | 1/2004 | Kadyk et al. | |
| 6,675,365 B2 | 1/2004 | Elzinga | |
| 6,680,730 B1 | 1/2004 | Shields et al. | |
| 6,680,935 B1 | 1/2004 | Kung et al. | |
| 6,686,838 B1 | 2/2004 | Rezvani et al. | |
| 6,690,411 B2 | 2/2004 | Naidoo et al. | |
| 6,690,719 B1 | 2/2004 | Raphaeli et al. | |
| 6,693,530 B1 | 2/2004 | Dowens et al. | |
| 6,693,545 B2 | 2/2004 | Brown et al. | |
| 6,697,103 B1 | 2/2004 | Fernandez et al. | |
| 6,704,786 B1 | 3/2004 | Gupta et al. | |
| 6,716,101 B1 | 4/2004 | Meadows et al. | |
| 6,720,990 B1 | 4/2004 | Walker et al. | |
| 6,721,689 B2 | 4/2004 | Markle et al. | |
| 6,721,740 B1 | 4/2004 | Skinner et al. | |
| 6,721,747 B2 | 4/2004 | Lipkin | |
| 6,721,802 B1 | 4/2004 | Wright et al. | |
| 6,727,811 B1 | 4/2004 | Fendis | |
| 6,728,233 B1 | 4/2004 | Park et al. | |
| 6,728,688 B1 | 4/2004 | Hirsch et al. | |
| 6,738,824 B1 | 5/2004 | Blair | |
| 6,741,171 B2 | 5/2004 | Palka et al. | |
| 6,741,977 B1 | 5/2004 | Nagaya et al. | |
| 6,754,181 B1 | 6/2004 | Elliott et al. | |
| 6,754,717 B1 | 6/2004 | Day et al. | |
| 6,756,896 B2 | 6/2004 | Ford | |
| 6,756,988 B1 | 6/2004 | Wang et al. | |

(56) References Cited

U.S. PATENT DOCUMENTS

| | | | |
|---|---|---|---|
| 6,756,998 B1 | 6/2004 | Bilger | |
| 6,759,956 B2 | 7/2004 | Menard et al. | |
| 6,762,686 B1 | 7/2004 | Tabe | |
| 6,763,377 B1 | 7/2004 | Belknap et al. | |
| 6,766,353 B1 | 7/2004 | Lin et al. | |
| 6,771,181 B1 | 8/2004 | Hughen, Jr. | |
| 6,778,085 B2 | 8/2004 | Faulkner et al. | |
| 6,779,019 B1 | 8/2004 | Mousseau et al. | |
| 6,781,509 B1 | 8/2004 | Oppedahl et al. | |
| 6,785,542 B1 | 8/2004 | Blight et al. | |
| 6,789,147 B1 | 9/2004 | Kessler et al. | |
| 6,795,322 B2 | 9/2004 | Aihara et al. | |
| 6,795,863 B1 | 9/2004 | Doty, Jr. | |
| 6,798,344 B2 | 9/2004 | Faulkner et al. | |
| 6,804,638 B2 | 10/2004 | Fiedler | |
| 6,810,409 B1 | 10/2004 | Fry et al. | |
| 6,810,420 B1 | 10/2004 | Buse et al. | |
| 6,823,223 B2 | 11/2004 | Gonzales et al. | |
| 6,826,173 B1 | 11/2004 | Kung et al. | |
| 6,826,233 B1 | 11/2004 | Oosawa | |
| 6,829,478 B1 | 12/2004 | Layton et al. | |
| 6,834,208 B2 | 12/2004 | Gonzales et al. | |
| 6,836,214 B2 | 12/2004 | Choi | |
| 6,850,252 B1 | 2/2005 | Hoffberg | |
| 6,856,236 B2 | 2/2005 | Christensen et al. | |
| 6,857,026 B1 | 2/2005 | Cain | |
| 6,859,831 B1 | 2/2005 | Gelvin et al. | |
| 6,865,690 B2 | 3/2005 | Kocin | |
| 6,871,193 B1 | 3/2005 | Campbell et al. | |
| 6,873,256 B2 | 3/2005 | Lemelson et al. | |
| 6,885,362 B2 | 4/2005 | Suomela | |
| D504,889 S | 5/2005 | Andre et al. | |
| 6,891,838 B1 | 5/2005 | Petite et al. | |
| 6,912,429 B1 | 6/2005 | Bilger | |
| 6,914,533 B2 | 7/2005 | Petite | |
| 6,918,112 B2 | 7/2005 | Bourke-Dunphy et al. | |
| 6,920,502 B2 | 7/2005 | Araujo et al. | |
| 6,920,615 B1 | 7/2005 | Campbell et al. | |
| 6,922,701 B1 | 7/2005 | Ananian et al. | |
| 6,925,054 B1 * | 8/2005 | Atterton | H04L 45/28 |
| | | | 370/244 |
| 6,928,148 B2 | 8/2005 | Simon et al. | |
| 6,930,598 B2 | 8/2005 | Weiss | |
| 6,930,599 B2 | 8/2005 | Naidoo et al. | |
| 6,930,730 B2 | 8/2005 | Maxson et al. | |
| 6,931,445 B2 | 8/2005 | Davis | |
| 6,941,258 B2 | 9/2005 | Van et al. | |
| 6,943,681 B2 | 9/2005 | Rezvani et al. | |
| 6,956,477 B2 | 10/2005 | Chun | |
| 6,957,075 B1 | 10/2005 | Iverson | |
| 6,957,186 B1 | 10/2005 | Guheen et al. | |
| 6,957,275 B1 | 10/2005 | Sekiguchi | |
| 6,959,341 B1 | 10/2005 | Leung | |
| 6,959,393 B2 | 10/2005 | Hollis et al. | |
| 6,963,908 B1 | 11/2005 | Lynch et al. | |
| 6,963,981 B1 | 11/2005 | Bailey et al. | |
| 6,965,294 B1 | 11/2005 | Elliott et al. | |
| 6,965,313 B1 | 11/2005 | Saylor et al. | |
| 6,970,183 B1 | 11/2005 | Monroe | |
| 6,971,063 B1 | 11/2005 | Rappaport et al. | |
| 6,971,076 B2 | 11/2005 | Chen | |
| 6,972,676 B1 | 12/2005 | Kimmel et al. | |
| 6,975,220 B1 | 12/2005 | Foodman et al. | |
| 6,977,485 B1 | 12/2005 | Wei | |
| 6,983,432 B2 | 1/2006 | Hayes | |
| 6,990,591 B1 | 1/2006 | Pearson | |
| 6,993,658 B1 | 1/2006 | Engberg et al. | |
| 6,999,562 B2 | 2/2006 | Winick | |
| 6,999,992 B1 | 2/2006 | Deen et al. | |
| 7,015,806 B2 | 3/2006 | Naidoo et al. | |
| 7,016,970 B2 | 3/2006 | Harumoto et al. | |
| 7,019,639 B2 | 3/2006 | Stilp | |
| 7,020,697 B1 | 3/2006 | Goodman et al. | |
| 7,020,701 B1 | 3/2006 | Gelvin et al. | |
| 7,023,913 B1 | 4/2006 | Monroe | |
| 7,023,914 B2 | 4/2006 | Furukawa et al. | |
| 7,023,975 B2 | 4/2006 | Mansfield et al. | |
| 7,024,676 B1 | 4/2006 | Klopfenstein | |
| 7,028,328 B2 | 4/2006 | Kogane et al. | |
| 7,030,752 B2 | 4/2006 | Tyroler | |
| 7,032,002 B1 | 4/2006 | Rezvani et al. | |
| 7,034,681 B2 | 4/2006 | Yamamoto et al. | |
| 7,035,907 B1 | 4/2006 | Decasper et al. | |
| 7,039,391 B2 | 5/2006 | Rezvani et al. | |
| 7,042,880 B1 | 5/2006 | Voit et al. | |
| 7,043,537 B1 | 5/2006 | Pratt | |
| 7,047,088 B2 | 5/2006 | Nakamura et al. | |
| 7,047,092 B2 | 5/2006 | Wimsatt | |
| 7,047,180 B1 | 5/2006 | Mathews et al. | |
| 7,050,388 B2 | 5/2006 | Kim et al. | |
| 7,053,764 B2 | 5/2006 | Stilp | |
| 7,053,765 B1 | 5/2006 | Clark | |
| 7,068,164 B1 | 6/2006 | Duncan et al. | |
| 7,072,934 B2 | 7/2006 | Helgeson et al. | |
| 7,073,140 B1 | 7/2006 | Li et al. | |
| 7,075,429 B2 | 7/2006 | Marshall | |
| 7,079,020 B2 | 7/2006 | Stilp | |
| 7,080,046 B1 | 7/2006 | Rezvani et al. | |
| 7,081,813 B2 | 7/2006 | Winick et al. | |
| 7,082,460 B2 | 7/2006 | Hansen et al. | |
| 7,084,756 B2 | 8/2006 | Stilp | |
| 7,085,814 B1 | 8/2006 | Gandhi et al. | |
| 7,085,937 B1 | 8/2006 | Rezvani et al. | |
| 7,086,018 B2 | 8/2006 | Ito | |
| 7,099,944 B1 | 8/2006 | Anschutz et al. | |
| 7,099,994 B2 | 8/2006 | Thayer et al. | |
| 7,103,152 B2 | 9/2006 | Naidoo et al. | |
| 7,106,176 B2 | 9/2006 | La et al. | |
| 7,107,322 B1 | 9/2006 | Freeny, Jr. | |
| 7,110,774 B1 | 9/2006 | Davis et al. | |
| 7,111,072 B1 | 9/2006 | Matthews et al. | |
| 7,113,090 B1 | 9/2006 | Saylor et al. | |
| 7,113,099 B2 | 9/2006 | Tyroler et al. | |
| 7,114,554 B2 | 10/2006 | Bergman et al. | |
| 7,119,609 B2 | 10/2006 | Naidoo et al. | |
| 7,119,674 B2 | 10/2006 | Sefton | |
| 7,120,139 B1 | 10/2006 | Kung et al. | |
| 7,120,232 B2 | 10/2006 | Naidoo et al. | |
| 7,120,233 B2 | 10/2006 | Naidoo et al. | |
| 7,126,473 B1 | 10/2006 | Powell | |
| 7,130,383 B2 | 10/2006 | Naidoo et al. | |
| 7,130,585 B1 | 10/2006 | Ollis et al. | |
| 7,133,380 B1 * | 11/2006 | Winters | H04W 72/54 |
| | | | 370/347 |
| 7,134,138 B2 | 11/2006 | Scherr | |
| 7,136,711 B1 | 11/2006 | Duncan et al. | |
| 7,142,503 B1 | 11/2006 | Grant et al. | |
| 7,145,898 B1 | 12/2006 | Elliott | |
| 7,147,147 B1 | 12/2006 | Enright et al. | |
| 7,148,810 B2 | 12/2006 | Bhat | |
| 7,149,798 B2 | 12/2006 | Rezvani et al. | |
| 7,149,814 B2 | 12/2006 | Neufeld et al. | |
| 7,158,026 B2 | 1/2007 | Feldkamp et al. | |
| 7,158,776 B1 | 1/2007 | Estes et al. | |
| 7,158,920 B2 | 1/2007 | Ishikawa | |
| 7,164,883 B2 | 1/2007 | Rappaport et al. | |
| 7,164,907 B2 | 1/2007 | Cochran et al. | |
| 7,166,987 B2 | 1/2007 | Lee et al. | |
| 7,171,466 B2 | 1/2007 | Van Der Meulen | |
| 7,171,686 B1 | 1/2007 | Jansen et al. | |
| 7,174,018 B1 | 2/2007 | Patil et al. | |
| 7,174,564 B1 | 2/2007 | Weatherspoon et al. | |
| 7,180,889 B1 | 2/2007 | Kung et al. | |
| 7,181,207 B1 | 2/2007 | Chow et al. | |
| 7,181,517 B1 | 2/2007 | Iavergne et al. | |
| 7,181,571 B2 | 2/2007 | Jiang et al. | |
| 7,181,716 B1 | 2/2007 | Dahroug | |
| 7,183,907 B2 | 2/2007 | Simon et al. | |
| 7,184,428 B1 | 2/2007 | Gerszberg et al. | |
| 7,184,848 B2 | 2/2007 | Krzyzanowski et al. | |
| 7,187,279 B2 | 3/2007 | Chung | |
| 7,187,986 B2 | 3/2007 | Johnson et al. | |
| 7,194,003 B2 | 3/2007 | Danner et al. | |
| 7,194,446 B1 | 3/2007 | Bromley et al. | |

(56)     References Cited

U.S. PATENT DOCUMENTS

| | | | |
|---|---|---|---|
| 7,197,125 B1 | 3/2007 | Prasad et al. | |
| 7,203,486 B2 | 4/2007 | Patel | |
| 7,209,945 B2 | 4/2007 | Hicks et al. | |
| 7,212,570 B2 | 5/2007 | Akiyama et al. | |
| 7,213,061 B1 | 5/2007 | Hite et al. | |
| 7,218,217 B2 | 5/2007 | Adonailo et al. | |
| 7,222,359 B2 | 5/2007 | Freund et al. | |
| 7,229,012 B1 | 6/2007 | Enright et al. | |
| 7,237,267 B2 | 6/2007 | Rayes et al. | |
| 7,240,327 B2 | 7/2007 | Singh et al. | |
| 7,246,044 B2 | 7/2007 | Imamura et al. | |
| 7,248,150 B2 | 7/2007 | Mackjust et al. | |
| 7,248,161 B2 | 7/2007 | Spoltore et al. | |
| 7,249,177 B1 | 7/2007 | Miller | |
| 7,249,317 B1 | 7/2007 | Nakagawa et al. | |
| 7,250,854 B2 | 7/2007 | Rezvani et al. | |
| 7,250,859 B2 | 7/2007 | Martin et al. | |
| 7,254,779 B1 | 8/2007 | Rezvani et al. | |
| 7,254,833 B1 | 8/2007 | Cornelius et al. | |
| 7,262,690 B2 | 8/2007 | Heaton et al. | |
| 7,277,010 B2 | 10/2007 | Joao | |
| 7,292,142 B2 | 11/2007 | Simon et al. | |
| 7,293,083 B1 | 11/2007 | Ranous et al. | |
| 7,298,253 B2 | 11/2007 | Petricoin et al. | |
| 7,305,461 B2 | 12/2007 | Ullman | |
| 7,310,115 B2 | 12/2007 | Tanimoto | |
| 7,310,344 B1 | 12/2007 | Sue | |
| 7,313,102 B2 | 12/2007 | Stephenson et al. | |
| 7,313,231 B2 | 12/2007 | Reid | |
| D558,460 S | 1/2008 | Yu et al. | |
| D558,756 S | 1/2008 | Andre et al. | |
| 7,315,886 B1 | 1/2008 | Meenan et al. | |
| 7,337,217 B2 | 2/2008 | Wang | |
| 7,337,473 B2 | 2/2008 | Chang et al. | |
| 7,339,895 B2 | 3/2008 | Ozaki et al. | |
| 7,340,314 B1 | 3/2008 | Duncan et al. | |
| 7,343,619 B2 | 3/2008 | Ofek et al. | |
| 7,345,580 B2 | 3/2008 | Akamatsu et al. | |
| 7,346,338 B1 | 3/2008 | Calhoun et al. | |
| 7,349,682 B1 | 3/2008 | Bennett et al. | |
| 7,349,761 B1 | 3/2008 | Cruse | |
| 7,349,967 B2 | 3/2008 | Wang | |
| 7,356,372 B1 | 4/2008 | Duncan et al. | |
| 7,359,843 B1 | 4/2008 | Keller et al. | |
| 7,362,221 B2 | 4/2008 | Katz | |
| 7,367,045 B2 | 4/2008 | Ofek et al. | |
| 7,370,115 B2 | 5/2008 | Bae et al. | |
| 7,383,339 B1 | 6/2008 | Meenan et al. | |
| 7,383,522 B2 | 6/2008 | Murgai et al. | |
| 7,389,109 B2 * | 6/2008 | Hind | H04W 48/18 |
| | | | 455/435.2 |
| 7,391,298 B1 | 6/2008 | Campbell et al. | |
| 7,403,838 B2 | 7/2008 | Deen et al. | |
| 7,409,045 B2 | 8/2008 | Naidoo et al. | |
| 7,409,451 B1 | 8/2008 | Meenan et al. | |
| 7,412,447 B2 | 8/2008 | Hilbert et al. | |
| 7,425,101 B2 | 9/2008 | Cheng | |
| 7,428,585 B1 | 9/2008 | Owens et al. | |
| 7,430,614 B2 | 9/2008 | Shen et al. | |
| 7,437,753 B2 | 10/2008 | Nahum | |
| 7,440,434 B2 | 10/2008 | Chaskar et al. | |
| 7,440,767 B2 | 10/2008 | Ballay et al. | |
| 7,447,775 B1 | 11/2008 | Zhu et al. | |
| 7,454,731 B2 | 11/2008 | Oh et al. | |
| 7,457,869 B2 | 11/2008 | Kernan | |
| 7,466,223 B2 | 12/2008 | Sefton | |
| 7,466,710 B1 | 12/2008 | Clemm et al. | |
| 7,469,139 B2 | 12/2008 | Van De Groenendaal | |
| 7,469,294 B1 | 12/2008 | Luo et al. | |
| 7,469,381 B2 | 12/2008 | Ording | |
| 7,469,391 B2 | 12/2008 | Carrere et al. | |
| D584,738 S | 1/2009 | Kim et al. | |
| D585,399 S | 1/2009 | Hwang | |
| 7,477,629 B2 | 1/2009 | Tsirtsis et al. | |
| 7,479,949 B2 | 1/2009 | Jobs et al. | |
| 7,480,713 B2 | 1/2009 | Ullman | |
| 7,480,724 B2 | 1/2009 | Zimler et al. | |
| 7,483,958 B1 | 1/2009 | Elabbady et al. | |
| 7,490,350 B1 | 2/2009 | Murotake et al. | |
| 7,493,651 B2 | 2/2009 | Vaenskae et al. | |
| 7,498,695 B2 | 3/2009 | Gaudreau et al. | |
| 7,502,672 B1 | 3/2009 | Kolls | |
| 7,506,052 B2 | 3/2009 | Qian et al. | |
| 7,509,687 B2 | 3/2009 | Ofek et al. | |
| 7,511,614 B2 | 3/2009 | Stilp et al. | |
| 7,512,965 B1 | 3/2009 | Amdur et al. | |
| 7,526,539 B1 | 4/2009 | Hsu | |
| 7,526,762 B1 | 4/2009 | Astala et al. | |
| 7,528,723 B2 | 5/2009 | Fast et al. | |
| 7,535,880 B1 | 5/2009 | Hinman et al. | |
| 7,542,721 B1 | 6/2009 | Bonner et al. | |
| 7,549,134 B1 | 6/2009 | Li et al. | |
| 7,551,071 B2 | 6/2009 | Bennett et al. | |
| 7,554,934 B2 | 6/2009 | Abraham et al. | |
| 7,558,379 B2 | 7/2009 | Winick | |
| 7,558,862 B1 | 7/2009 | Tyukasz et al. | |
| 7,558,903 B2 | 7/2009 | Kinstler | |
| 7,562,323 B1 | 7/2009 | Bai et al. | |
| 7,564,855 B1 | 7/2009 | Georgiou | |
| 7,568,018 B1 | 7/2009 | Hove et al. | |
| 7,571,459 B2 | 8/2009 | Ganesh et al. | |
| 7,577,420 B2 | 8/2009 | Srinivasan et al. | |
| 7,583,191 B2 | 9/2009 | Zinser | |
| 7,584,263 B1 | 9/2009 | Hicks et al. | |
| 7,587,464 B2 | 9/2009 | Moorer et al. | |
| 7,590,953 B2 | 9/2009 | Chang | |
| 7,595,816 B1 | 9/2009 | Enright et al. | |
| 7,596,622 B2 | 9/2009 | Owen et al. | |
| D602,014 S | 10/2009 | Andre et al. | |
| D602,015 S | 10/2009 | Andre et al. | |
| D602,017 S | 10/2009 | Andre et al. | |
| D602,486 S | 10/2009 | Andre et al. | |
| D602,487 S | 10/2009 | Maskatia | |
| 7,606,767 B1 | 10/2009 | Couper et al. | |
| 7,610,555 B2 | 10/2009 | Klein et al. | |
| 7,610,559 B1 | 10/2009 | Humpleman et al. | |
| 7,619,512 B2 | 11/2009 | Trundle et al. | |
| 7,620,427 B2 | 11/2009 | Shanahan | |
| 7,627,665 B2 | 12/2009 | Barker et al. | |
| 7,633,385 B2 | 12/2009 | Cohn et al. | |
| 7,634,519 B2 | 12/2009 | Creamer et al. | |
| 7,639,157 B1 | 12/2009 | Whitley et al. | |
| 7,651,530 B2 | 1/2010 | Winick | |
| 7,653,911 B2 | 1/2010 | Doshi et al. | |
| 7,671,729 B2 | 3/2010 | Hershkovitz et al. | |
| 7,679,503 B2 | 3/2010 | Mason et al. | |
| 7,681,201 B2 | 3/2010 | Dale et al. | |
| 7,684,418 B2 | 3/2010 | Scott et al. | |
| 7,696,873 B2 | 4/2010 | Sharma et al. | |
| 7,697,028 B1 | 4/2010 | Johnson | |
| 7,701,970 B2 | 4/2010 | Krits et al. | |
| 7,702,421 B2 | 4/2010 | Sullivan et al. | |
| 7,702,782 B1 | 4/2010 | Pai | |
| D615,083 S | 5/2010 | Andre et al. | |
| 7,711,796 B2 | 5/2010 | Gutt et al. | |
| 7,720,654 B2 | 5/2010 | Hollis | |
| 7,730,223 B1 | 6/2010 | Bavor et al. | |
| 7,733,371 B1 | 6/2010 | Monroe | |
| 7,734,020 B2 | 6/2010 | Elliot et al. | |
| 7,734,286 B2 | 6/2010 | Almeda et al. | |
| 7,734,906 B2 | 6/2010 | Orlando et al. | |
| 7,739,596 B2 | 6/2010 | Clarke-Martin et al. | |
| 7,739,658 B2 | 6/2010 | Watson et al. | |
| 7,747,975 B2 | 6/2010 | Dinter et al. | |
| 7,751,409 B1 | 7/2010 | Carolan | |
| 7,755,472 B2 | 7/2010 | Grossman | |
| 7,755,506 B1 | 7/2010 | Clegg et al. | |
| 7,756,928 B1 | 7/2010 | Meenan et al. | |
| 7,761,275 B2 | 7/2010 | Chopra et al. | |
| 7,787,863 B2 | 8/2010 | Van De Groenendaal | |
| 7,804,760 B2 | 9/2010 | Schmukler et al. | |
| D624,896 S | 10/2010 | Park et al. | |
| D626,437 S | 11/2010 | Lee et al. | |
| 7,825,793 B1 | 11/2010 | Spillman et al. | |

(56)           References Cited

U.S. PATENT DOCUMENTS

| | | | |
|---|---|---|---|
| 7,827,252 | B2 | 11/2010 | Hopmann et al. |
| 7,844,699 | B1 | 11/2010 | Horrocks et al. |
| 7,847,675 | B1 | 12/2010 | Thyen et al. |
| 7,855,635 | B2 | 12/2010 | Cohn et al. |
| 7,859,404 | B2 | 12/2010 | Chul et al. |
| 7,882,466 | B2 | 2/2011 | Ishikawa |
| 7,882,537 | B2 | 2/2011 | Okajo et al. |
| 7,884,855 | B2 | 2/2011 | Ortiz |
| 7,890,612 | B2 | 2/2011 | Todd et al. |
| 7,890,915 | B2 | 2/2011 | Celik et al. |
| 7,899,732 | B2 | 3/2011 | Van et al. |
| 7,904,074 | B2 | 3/2011 | Karaoguz et al. |
| 7,904,187 | B2 | 3/2011 | Hoffberg et al. |
| 7,911,341 | B2 | 3/2011 | Raji et al. |
| 7,912,447 | B2 | 3/2011 | Bennett et al. |
| 7,917,624 | B2 | 3/2011 | Gidwani |
| D636,769 | S | 4/2011 | Wood et al. |
| 7,921,686 | B2 | 4/2011 | Bagepalli et al. |
| 7,928,840 | B2 | 4/2011 | Kim et al. |
| 7,930,365 | B2 | 4/2011 | Dixit et al. |
| D637,596 | S | 5/2011 | Akana et al. |
| 7,949,960 | B2 | 5/2011 | Roessler et al. |
| D639,805 | S | 6/2011 | Song et al. |
| D640,663 | S | 6/2011 | Arnholt et al. |
| 7,956,736 | B2 | 6/2011 | Cohn et al. |
| 7,957,326 | B1 | 6/2011 | Christie, IV |
| 7,970,863 | B1 | 6/2011 | Fontaine |
| D641,018 | S | 7/2011 | Lee et al. |
| 7,974,235 | B2 | 7/2011 | Ghozati et al. |
| D642,563 | S | 8/2011 | Akana et al. |
| 8,001,219 | B2 | 8/2011 | Moorer et al. |
| D645,015 | S | 9/2011 | Lee et al. |
| D645,435 | S | 9/2011 | Kim et al. |
| D645,833 | S | 9/2011 | Seflic et al. |
| 8,022,833 | B2 | 9/2011 | Cho |
| 8,028,041 | B2 | 9/2011 | Olliphant et al. |
| 8,032,881 | B2 | 10/2011 | Holmberg et al. |
| 8,042,049 | B2 | 10/2011 | Killian et al. |
| 8,046,411 | B2 | 10/2011 | Hayashi et al. |
| 8,046,721 | B2 | 10/2011 | Chaudhri et al. |
| 8,069,194 | B1 | 11/2011 | Manber et al. |
| D650,381 | S | 12/2011 | Park et al. |
| 8,073,931 | B2 | 12/2011 | Dawes et al. |
| 8,086,702 | B2 | 12/2011 | Baum et al. |
| 8,086,703 | B2 | 12/2011 | Baum et al. |
| D654,460 | S | 2/2012 | Kim et al. |
| D654,497 | S | 2/2012 | Lee |
| 8,122,131 | B2 | 2/2012 | Baum et al. |
| 8,125,184 | B2 | 2/2012 | Raji et al. |
| D656,137 | S | 3/2012 | Chung et al. |
| 8,140,658 | B1 | 3/2012 | Gelvin et al. |
| 8,144,836 | B2 | 3/2012 | Naidoo et al. |
| 8,149,849 | B2 | 4/2012 | Osborn et al. |
| 8,159,519 | B2 | 4/2012 | Kurtz et al. |
| 8,159,945 | B2 | 4/2012 | Muro et al. |
| 8,160,425 | B2 | 4/2012 | Kisliakov |
| 8,196,064 | B2 | 6/2012 | Krzyzanowski et al. |
| 8,200,827 | B1 | 6/2012 | Hunyady et al. |
| 8,205,181 | B1 | 6/2012 | Singla et al. |
| 8,209,400 | B2 | 6/2012 | Baum et al. |
| D663,298 | S | 7/2012 | Song et al. |
| D664,540 | S | 7/2012 | Kim et al. |
| 8,214,494 | B1 | 7/2012 | Slavin |
| 8,214,496 | B2 | 7/2012 | Gutt et al. |
| 8,219,254 | B2 | 7/2012 | O'Connor |
| 8,229,812 | B2 | 7/2012 | Raleigh |
| 8,230,466 | B2 | 7/2012 | Cockrell et al. |
| D664,954 | S | 8/2012 | Kim et al. |
| D666,198 | S | 8/2012 | Van et al. |
| 8,239,477 | B2 | 8/2012 | Sharma et al. |
| 8,244,550 | B2 | 8/2012 | Sim et al. |
| D667,395 | S | 9/2012 | Lee |
| D667,396 | S | 9/2012 | Koh |
| D667,397 | S | 9/2012 | Koh |
| D667,398 | S | 9/2012 | Koh |
| D667,399 | S | 9/2012 | Koh |
| 8,269,376 | B1 | 9/2012 | Elberbaum |
| 8,269,623 | B2 | 9/2012 | Addy |
| 8,271,629 | B1 | 9/2012 | Winters et al. |
| 8,271,881 | B2 | 9/2012 | Moorer et al. |
| 8,272,053 | B2 | 9/2012 | Markham et al. |
| 8,275,830 | B2 | 9/2012 | Raleigh |
| D668,650 | S | 10/2012 | Han |
| D668,651 | S | 10/2012 | Kim et al. |
| D668,652 | S | 10/2012 | Kim et al. |
| D669,469 | S | 10/2012 | Kang |
| D670,692 | S | 11/2012 | Akana et al. |
| D671,514 | S | 11/2012 | Kim et al. |
| 8,305,172 | B2 | 11/2012 | Mehraban et al. |
| 8,311,526 | B2 | 11/2012 | Forstall et al. |
| D671,938 | S | 12/2012 | Hsu et al. |
| D672,344 | S | 12/2012 | Li |
| D672,345 | S | 12/2012 | Li |
| D672,739 | S | 12/2012 | Sin |
| D672,768 | S | 12/2012 | Huang et al. |
| 8,335,842 | B2 | 12/2012 | Raji et al. |
| 8,335,854 | B2 | 12/2012 | Eldering |
| 8,336,010 | B1 | 12/2012 | Chang et al. |
| D673,561 | S | 1/2013 | Hyun et al. |
| D673,948 | S | 1/2013 | Andre et al. |
| D673,950 | S | 1/2013 | Li et al. |
| D674,369 | S | 1/2013 | Jaewoong |
| D675,203 | S | 1/2013 | Yang |
| 8,350,694 | B1 | 1/2013 | Trundle et al. |
| 8,363,791 | B2 | 1/2013 | Gupta et al. |
| D675,588 | S | 2/2013 | Park |
| D675,612 | S | 2/2013 | Andre et al. |
| D676,443 | S | 2/2013 | Canizares et al. |
| D676,819 | S | 2/2013 | Choi |
| 8,373,313 | B2 | 2/2013 | Garcia et al. |
| D677,255 | S | 3/2013 | McManigal et al. |
| D677,640 | S | 3/2013 | Kim et al. |
| D677,659 | S | 3/2013 | Akana et al. |
| D677,660 | S | 3/2013 | Groene et al. |
| D678,271 | S | 3/2013 | Chiu |
| D678,272 | S | 3/2013 | Groene et al. |
| D678,877 | S | 3/2013 | Groene et al. |
| 8,396,766 | B1 | 3/2013 | Enright et al. |
| 8,400,767 | B2 | 3/2013 | Yeom et al. |
| D679,706 | S | 4/2013 | Tang et al. |
| D680,151 | S | 4/2013 | Katori |
| D680,524 | S | 4/2013 | Feng et al. |
| D681,032 | S | 4/2013 | Akana et al. |
| 8,412,922 | B2 | 4/2013 | Nesse et al. |
| 8,413,204 | B2 | 4/2013 | White et al. |
| D681,583 | S | 5/2013 | Park |
| D681,591 | S | 5/2013 | Sung |
| D681,632 | S | 5/2013 | Akana et al. |
| D682,239 | S | 5/2013 | Yeh et al. |
| 8,451,986 | B2 | 5/2013 | Cohn et al. |
| D684,553 | S | 6/2013 | Kim et al. |
| D684,968 | S | 6/2013 | Smith et al. |
| 8,456,293 | B1 | 6/2013 | Trundle et al. |
| 8,473,619 | B2 | 6/2013 | Baum et al. |
| D685,778 | S | 7/2013 | Fahrendorff et al. |
| D685,783 | S | 7/2013 | Bryan et al. |
| 8,478,450 | B2 | 7/2013 | Lu et al. |
| 8,478,844 | B2 | 7/2013 | Baum et al. |
| 8,478,871 | B2 | 7/2013 | Gutt et al. |
| 8,483,853 | B1 | 7/2013 | Lambourne |
| 8,493,202 | B1 | 7/2013 | Trundle et al. |
| 8,499,038 | B1 | 7/2013 | Vucurevich |
| 8,520,068 | B2 | 8/2013 | Naidoo et al. |
| 8,520,072 | B1 | 8/2013 | Slavin et al. |
| 8,525,664 | B2 | 9/2013 | Hadizad et al. |
| 8,543,665 | B2 | 9/2013 | Ansari et al. |
| D692,042 | S | 10/2013 | Dawes et al. |
| 8,554,478 | B2 | 10/2013 | Hartman |
| 8,560,041 | B2 | 10/2013 | Flaherty et al. |
| 8,570,993 | B2 | 10/2013 | Austin et al. |
| 8,584,199 | B1 | 11/2013 | Chen et al. |
| 8,595,377 | B1 | 11/2013 | Apgar et al. |
| D695,735 | S | 12/2013 | Kitchen et al. |
| 8,599,018 | B2 | 12/2013 | Kellen et al. |

(56)　　References Cited

U.S. PATENT DOCUMENTS

| | | |
|---|---|---|
| 8,612,591 B2 | 12/2013 | Dawes et al. |
| 8,619,136 B2 | 12/2013 | Howarter et al. |
| 8,634,533 B2 | 1/2014 | Strasters |
| 8,635,350 B2 | 1/2014 | Gutt et al. |
| 8,635,499 B2 | 1/2014 | Cohn et al. |
| 8,638,211 B2 | 1/2014 | Cohn et al. |
| 8,649,386 B2 | 2/2014 | Ansari et al. |
| 8,650,320 B1 | 2/2014 | Merrick et al. |
| 8,666,560 B2 | 3/2014 | Lu et al. |
| 8,675,071 B1 | 3/2014 | Slavin et al. |
| 8,700,769 B2 | 4/2014 | Alexander et al. |
| 8,704,821 B2 | 4/2014 | Kulkarni et al. |
| 8,713,132 B2 | 4/2014 | Baum et al. |
| 8,723,671 B2 | 5/2014 | Foisy et al. |
| 8,730,834 B2 | 5/2014 | Marusca et al. |
| 8,738,765 B2 | 5/2014 | Wyatt et al. |
| 8,812,654 B2 | 8/2014 | Gelvin et al. |
| 8,817,809 B2 | 8/2014 | Gage |
| 8,819,178 B2 | 8/2014 | Baum et al. |
| 8,825,871 B2 | 9/2014 | Baum et al. |
| 8,832,244 B2 | 9/2014 | Gelvin et al. |
| 8,836,467 B1 | 9/2014 | Cohn et al. |
| 8,868,678 B2 | 10/2014 | Hildreth et al. |
| 8,885,552 B2 | 11/2014 | Bedingfield et al. |
| 8,902,740 B2 | 12/2014 | Hicks, III |
| 8,914,526 B1 | 12/2014 | Lindquist et al. |
| 8,914,837 B2 | 12/2014 | Ahmed et al. |
| 8,935,236 B2 | 1/2015 | Morita et al. |
| 8,937,539 B2 | 1/2015 | Sharma et al. |
| 8,937,658 B2 | 1/2015 | Hicks et al. |
| 8,953,479 B2 | 2/2015 | Hall et al. |
| 8,953,749 B2 | 2/2015 | Naidoo et al. |
| 8,963,713 B2 | 2/2015 | Dawes et al. |
| 8,976,763 B2 | 3/2015 | Shrestha et al. |
| 8,983,534 B2 | 3/2015 | Patel |
| 8,988,217 B2 | 3/2015 | Piccolo, III |
| 8,988,221 B2 | 3/2015 | Raji et al. |
| 8,989,922 B2 | 3/2015 | Jones et al. |
| 8,996,665 B2 | 3/2015 | Baum et al. |
| 9,047,753 B2 | 6/2015 | Dawes et al. |
| 9,059,863 B2 | 6/2015 | Baum et al. |
| 9,064,394 B1 | 6/2015 | Trundle |
| 9,094,407 B1 | 7/2015 | Matthieu et al. |
| 9,100,446 B2 | 8/2015 | Cohn et al. |
| 9,141,276 B2 | 9/2015 | Dawes et al. |
| 9,144,143 B2 | 9/2015 | Raji et al. |
| 9,146,548 B2 | 9/2015 | Chambers et al. |
| 9,147,337 B2 | 9/2015 | Cohn et al. |
| 9,160,784 B2 | 10/2015 | Jeong et al. |
| 9,164,669 B1 | 10/2015 | Yaksick et al. |
| 9,170,707 B1 | 10/2015 | Laska et al. |
| 9,172,532 B1 | 10/2015 | Fuller et al. |
| 9,172,533 B2 | 10/2015 | Fielder |
| 9,172,553 B2 | 10/2015 | Dawes et al. |
| 9,172,605 B2 | 10/2015 | Hardy et al. |
| 9,189,934 B2 | 11/2015 | Jentoft et al. |
| 9,191,228 B2 | 11/2015 | Fulker et al. |
| 9,202,362 B2 | 12/2015 | Hyland et al. |
| 9,246,921 B1 | 1/2016 | Vlaminck et al. |
| 9,286,772 B2 | 3/2016 | Shapiro et al. |
| 9,287,727 B1 | 3/2016 | Egan |
| 9,300,921 B2 | 3/2016 | Naidoo et al. |
| 9,306,809 B2 | 4/2016 | Dawes et al. |
| 9,310,864 B1 | 4/2016 | Klein et al. |
| 9,373,014 B1 | 6/2016 | Mehranfar |
| 9,412,248 B1 | 8/2016 | Cohn et al. |
| 9,426,720 B2 | 8/2016 | Cohn et al. |
| 9,450,776 B2 | 9/2016 | Baum et al. |
| 9,462,041 B1 | 10/2016 | Hagins et al. |
| 9,510,065 B2 | 11/2016 | Cohn et al. |
| 9,529,344 B1 | 12/2016 | Hagins et al. |
| 9,531,593 B2 | 12/2016 | Baum et al. |
| 9,553,738 B2 | 1/2017 | Meenan et al. |
| 9,600,945 B2 | 3/2017 | Naidoo et al. |
| 9,609,003 B1 | 3/2017 | Chmielewski et al. |
| 9,613,524 B1 | 4/2017 | Lamb et al. |
| 9,621,408 B2 | 4/2017 | Gutt et al. |
| 9,674,199 B2 | 6/2017 | Vlaminck et al. |
| 9,721,461 B2 | 8/2017 | Zeng et al. |
| 9,729,342 B2 | 8/2017 | Cohn et al. |
| 9,761,123 B2 | 9/2017 | Ramasubbu et al. |
| 9,779,595 B2 | 10/2017 | Thibault |
| 9,805,587 B2 | 10/2017 | Lamb |
| 9,819,911 B2 | 11/2017 | K V et al. |
| 9,824,234 B2 | 11/2017 | Cho et al. |
| 9,843,458 B2 | 12/2017 | Cronin |
| 9,876,651 B2 | 1/2018 | Cho et al. |
| 9,882,985 B1 | 1/2018 | Esam et al. |
| 9,978,238 B2 | 5/2018 | Fadell et al. |
| 9,979,625 B2 | 5/2018 | McLaughlin et al. |
| 10,002,507 B2 | 6/2018 | Wilson et al. |
| 10,025,473 B2 | 7/2018 | Sarao et al. |
| 10,051,078 B2 | 8/2018 | Burd et al. |
| 10,062,245 B2 | 8/2018 | Fulker et al. |
| 10,062,273 B2 | 8/2018 | Raji et al. |
| 10,078,958 B2 | 9/2018 | Cohn et al. |
| 10,079,839 B1 | 9/2018 | Bryan et al. |
| 10,108,272 B1 | 10/2018 | Debates et al. |
| 10,120,354 B1 | 11/2018 | Rolston et al. |
| 10,237,757 B2 | 3/2019 | Raleigh et al. |
| 10,257,474 B2 | 4/2019 | Nadathur et al. |
| 10,264,138 B2 | 4/2019 | Raleigh et al. |
| 10,354,517 B1 | 7/2019 | King |
| 10,380,873 B1 | 8/2019 | Halverson |
| 10,430,887 B1 | 10/2019 | Parker et al. |
| 10,609,325 B2 | 3/2020 | Legris et al. |
| 10,687,270 B2 | 6/2020 | Ishii |
| 10,782,681 B1 | 9/2020 | Slavin |
| 10,796,557 B2 | 10/2020 | Sundermeyer et al. |
| 10,868,712 B1 | 12/2020 | Hutz |
| 11,037,433 B2 | 6/2021 | Baum et al. |
| 11,132,888 B2 | 9/2021 | Cohn et al. |
| 11,175,793 B2 | 11/2021 | Fulker et al. |
| 11,184,322 B2 | 11/2021 | Dawes et al. |
| 11,194,320 B2 | 12/2021 | Cohn et al. |
| 11,223,998 B2 | 1/2022 | Cohn et al. |
| 11,341,825 B1 | 5/2022 | Palmer |
| 11,417,159 B2 | 8/2022 | Li et al. |
| 11,831,662 B1 | 11/2023 | Johnson |
| 2001/0012775 A1 | 8/2001 | Modzelesky et al. |
| 2001/0016501 A1 | 8/2001 | King |
| 2001/0022836 A1 | 9/2001 | Bremer et al. |
| 2001/0025349 A1 | 9/2001 | Sharood et al. |
| 2001/0029585 A1 | 10/2001 | Simon et al. |
| 2001/0030597 A1 | 10/2001 | Inoue et al. |
| 2001/0034209 A1 | 10/2001 | Tong et al. |
| 2001/0034754 A1 | 10/2001 | Elwahab et al. |
| 2001/0034759 A1 | 10/2001 | Chiles et al. |
| 2001/0036192 A1 | 11/2001 | Chiles et al. |
| 2001/0042137 A1 | 11/2001 | Ota et al. |
| 2001/0044835 A1 | 11/2001 | Schober et al. |
| 2001/0046366 A1 | 11/2001 | Susskind |
| 2001/0047474 A1 | 11/2001 | Takagi et al. |
| 2001/0048030 A1 | 12/2001 | Sharood et al. |
| 2001/0053207 A1 | 12/2001 | Jeon et al. |
| 2001/0054115 A1 | 12/2001 | Ferguson et al. |
| 2002/0000913 A1 | 1/2002 | Hamamoto et al. |
| 2002/0003575 A1 | 1/2002 | Marchese |
| 2002/0004828 A1 | 1/2002 | Davis et al. |
| 2002/0005894 A1 | 1/2002 | Foodman et al. |
| 2002/0016639 A1 | 2/2002 | Smith et al. |
| 2002/0018057 A1 | 2/2002 | Sano |
| 2002/0018478 A1 | 2/2002 | Takeyama et al. |
| 2002/0019751 A1 | 2/2002 | Rothschild et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0028696 A1 | 3/2002 | Hirayama et al. |
| 2002/0031120 A1 | 3/2002 | Rakib |
| 2002/0032853 A1 | 3/2002 | Preston et al. |
| 2002/0035633 A1 | 3/2002 | Bose et al. |
| 2002/0037004 A1 | 3/2002 | Bossemeyer et al. |
| 2002/0038380 A1 | 3/2002 | Brawn et al. |
| 2002/0046280 A1 | 4/2002 | Fujita |

(56)        References Cited

U.S. PATENT DOCUMENTS

| | | |
|---|---|---|
| 2002/0046301 A1 | 4/2002 | Shannon et al. |
| 2002/0052719 A1 | 5/2002 | Alexander et al. |
| 2002/0052913 A1 | 5/2002 | Yamada et al. |
| 2002/0055977 A1 | 5/2002 | Nishi |
| 2002/0059078 A1 | 5/2002 | Valdes et al. |
| 2002/0059148 A1 | 5/2002 | Rosenhaft et al. |
| 2002/0059637 A1 | 5/2002 | Rakib |
| 2002/0065828 A1 | 5/2002 | Goodspeed |
| 2002/0068558 A1 | 6/2002 | Janik |
| 2002/0068984 A1 | 6/2002 | Alexander et al. |
| 2002/0072868 A1 | 6/2002 | Bartone et al. |
| 2002/0075153 A1 | 6/2002 | Dahl |
| 2002/0080771 A1 | 6/2002 | Krumel |
| 2002/0083342 A1 | 6/2002 | Webb et al. |
| 2002/0085488 A1 | 7/2002 | Kobayashi |
| 2002/0091815 A1 | 7/2002 | Anderson et al. |
| 2002/0099809 A1 | 7/2002 | Lee |
| 2002/0099829 A1 | 7/2002 | Richards et al. |
| 2002/0099854 A1 | 7/2002 | Jorgensen |
| 2002/0101858 A1 | 8/2002 | Stuart et al. |
| 2002/0103898 A1 | 8/2002 | Moyer et al. |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1 | 8/2002 | Graziano et al. |
| 2002/0114439 A1 | 8/2002 | Dunlap |
| 2002/0116117 A1 | 8/2002 | Martens et al. |
| 2002/0119800 A1 | 8/2002 | Jaggers et al. |
| 2002/0120696 A1 | 8/2002 | Mousseau et al. |
| 2002/0120698 A1 | 8/2002 | Tamargo |
| 2002/0120790 A1 | 8/2002 | Schwalb |
| 2002/0126009 A1 | 9/2002 | Oyagi et al. |
| 2002/0128728 A1 | 9/2002 | Murakami et al. |
| 2002/0131404 A1 | 9/2002 | Mehta et al. |
| 2002/0133539 A1 | 9/2002 | Monday |
| 2002/0133578 A1 | 9/2002 | Wu |
| 2002/0136167 A1 | 9/2002 | Steele et al. |
| 2002/0143805 A1 | 10/2002 | Hayes et al. |
| 2002/0143923 A1 | 10/2002 | Alexander |
| 2002/0150086 A1 | 10/2002 | Bailey et al. |
| 2002/0152298 A1 | 10/2002 | Kikta et al. |
| 2002/0152432 A1 | 10/2002 | Fleming |
| 2002/0156564 A1 | 10/2002 | Preston et al. |
| 2002/0156899 A1 | 10/2002 | Sekiguchi |
| 2002/0161885 A1 | 10/2002 | Childers et al. |
| 2002/0163534 A1 | 11/2002 | Choi et al. |
| 2002/0163997 A1 | 11/2002 | Bergman et al. |
| 2002/0164953 A1 | 11/2002 | Curtis |
| 2002/0164997 A1 | 11/2002 | Parry |
| 2002/0165006 A1 | 11/2002 | Haller et al. |
| 2002/0166125 A1 | 11/2002 | Fulmer |
| 2002/0174367 A1 | 11/2002 | Kimmel et al. |
| 2002/0174434 A1 | 11/2002 | Lee et al. |
| 2002/0177428 A1 | 11/2002 | Menard et al. |
| 2002/0177482 A1 | 11/2002 | Cheong et al. |
| 2002/0178100 A1 | 11/2002 | Koveos |
| 2002/0178211 A1 | 11/2002 | Singhal et al. |
| 2002/0180579 A1 | 12/2002 | Nagaoka et al. |
| 2002/0184301 A1 | 12/2002 | Parent |
| 2002/0184527 A1 | 12/2002 | Chun et al. |
| 2002/0186683 A1 | 12/2002 | Buck et al. |
| 2002/0188723 A1 | 12/2002 | Choi et al. |
| 2002/0191636 A1 | 12/2002 | Hallenbeck |
| 2003/0004088 A1 | 1/2003 | Ushio et al. |
| 2003/0005030 A1 | 1/2003 | Sutton et al. |
| 2003/0006879 A1 | 1/2003 | Kang et al. |
| 2003/0009552 A1 | 1/2003 | Benfield et al. |
| 2003/0009553 A1 | 1/2003 | Benfield et al. |
| 2003/0010243 A1 | 1/2003 | Roller |
| 2003/0023839 A1 | 1/2003 | Burkhardt et al. |
| 2003/0025599 A1 | 2/2003 | Monroe |
| 2003/0028294 A1 | 2/2003 | Yanagi |
| 2003/0028398 A1 | 2/2003 | Yamashita et al. |
| 2003/0030548 A1 | 2/2003 | Kovacs et al. |
| 2003/0031165 A1 | 2/2003 | James |
| 2003/0038730 A1 | 2/2003 | Imafuku et al. |
| 2003/0038849 A1 | 2/2003 | Craven et al. |
| 2003/0039242 A1 | 2/2003 | Moore |
| 2003/0040813 A1 | 2/2003 | Gonzales et al. |
| 2003/0041137 A1 | 2/2003 | Horie et al. |
| 2003/0041167 A1 | 2/2003 | French et al. |
| 2003/0046557 A1 | 3/2003 | Miller et al. |
| 2003/0050731 A1 | 3/2003 | Rosenblum |
| 2003/0050737 A1 | 3/2003 | Osann |
| 2003/0051009 A1 | 3/2003 | Shah et al. |
| 2003/0051026 A1 | 3/2003 | Carter et al. |
| 2003/0052905 A1 | 3/2003 | Gordon et al. |
| 2003/0052923 A1 | 3/2003 | Porter |
| 2003/0056012 A1 | 3/2003 | Modeste et al. |
| 2003/0056014 A1 | 3/2003 | Verberkt et al. |
| 2003/0059005 A1 | 3/2003 | Meyerson et al. |
| 2003/0060900 A1 | 3/2003 | Lo et al. |
| 2003/0061344 A1 | 3/2003 | Monroe |
| 2003/0061621 A1 | 3/2003 | Petty et al. |
| 2003/0065757 A1 | 4/2003 | Mentze et al. |
| 2003/0065784 A1 | 4/2003 | Herrod |
| 2003/0065791 A1 | 4/2003 | Garg et al. |
| 2003/0067923 A1 | 4/2003 | Ju et al. |
| 2003/0069854 A1 | 4/2003 | Hsu et al. |
| 2003/0069948 A1 | 4/2003 | Ma et al. |
| 2003/0071724 A1 | 4/2003 | D'Amico |
| 2003/0071840 A1 | 4/2003 | Huang et al. |
| 2003/0073406 A1 | 4/2003 | Benjamin et al. |
| 2003/0074090 A1 | 4/2003 | Becka et al. |
| 2003/0076852 A1* | 4/2003 | Fukui ..................... H04L 12/14 370/431 |
| 2003/0081768 A1 | 5/2003 | Caminschi |
| 2003/0084165 A1 | 5/2003 | Kjellberg et al. |
| 2003/0090473 A1 | 5/2003 | Joshi |
| 2003/0096590 A1 | 5/2003 | Satoh |
| 2003/0101243 A1 | 5/2003 | Donahue et al. |
| 2003/0101459 A1 | 5/2003 | Edson |
| 2003/0103088 A1 | 6/2003 | Dresti et al. |
| 2003/0105850 A1 | 6/2003 | Lean et al. |
| 2003/0110262 A1 | 6/2003 | Hasan et al. |
| 2003/0110302 A1 | 6/2003 | Hodges et al. |
| 2003/0112866 A1 | 6/2003 | Yu et al. |
| 2003/0113100 A1 | 6/2003 | Hecht et al. |
| 2003/0115345 A1 | 6/2003 | Chien et al. |
| 2003/0120593 A1 | 6/2003 | Bansal et al. |
| 2003/0123419 A1 | 7/2003 | Rangnekar et al. |
| 2003/0123634 A1 | 7/2003 | Chee |
| 2003/0126236 A1 | 7/2003 | Marl et al. |
| 2003/0128114 A1 | 7/2003 | Quigley |
| 2003/0128115 A1 | 7/2003 | Giacopelli et al. |
| 2003/0132018 A1 | 7/2003 | Okita et al. |
| 2003/0134590 A1 | 7/2003 | Suda et al. |
| 2003/0137426 A1 | 7/2003 | Anthony et al. |
| 2003/0137991 A1 | 7/2003 | Doshi et al. |
| 2003/0147534 A1 | 8/2003 | Ablay et al. |
| 2003/0149671 A1 | 8/2003 | Yamamoto et al. |
| 2003/0153325 A1 | 8/2003 | Veerepalli et al. |
| 2003/0155757 A1 | 8/2003 | Larsen et al. |
| 2003/0158609 A1 | 8/2003 | Chiu |
| 2003/0158635 A1 | 8/2003 | Pillar et al. |
| 2003/0159135 A1 | 8/2003 | Hiller et al. |
| 2003/0163514 A1 | 8/2003 | Waldschmidt |
| 2003/0169728 A1 | 9/2003 | Choi |
| 2003/0172145 A1 | 9/2003 | Nguyen |
| 2003/0174051 A1 | 9/2003 | Naitou |
| 2003/0174154 A1 | 9/2003 | Yukie et al. |
| 2003/0174648 A1 | 9/2003 | Wang et al. |
| 2003/0174717 A1 | 9/2003 | Zabarski et al. |
| 2003/0177236 A1 | 9/2003 | Goto et al. |
| 2003/0182396 A1 | 9/2003 | Reich et al. |
| 2003/0182640 A1 | 9/2003 | Alani et al. |
| 2003/0184436 A1 | 10/2003 | Seales et al. |
| 2003/0187920 A1 | 10/2003 | Redkar |
| 2003/0187938 A1 | 10/2003 | Mousseau et al. |
| 2003/0189509 A1 | 10/2003 | Hayes et al. |
| 2003/0193991 A1 | 10/2003 | Lansford |
| 2003/0196115 A1 | 10/2003 | Karp |
| 2003/0197847 A1 | 10/2003 | Shinoda |
| 2003/0198938 A1 | 10/2003 | Murray et al. |

(56) References Cited

U.S. PATENT DOCUMENTS

| | | |
|---|---|---|
| 2003/0200325 A1 | 10/2003 | Krishnaswamy et al. |
| 2003/0201889 A1 | 10/2003 | Zulkowski |
| 2003/0208610 A1 | 11/2003 | Rochetti et al. |
| 2003/0210126 A1 | 11/2003 | Kanazawa |
| 2003/0214775 A1 | 11/2003 | Fukuta et al. |
| 2003/0216143 A1 | 11/2003 | Roese et al. |
| 2003/0217136 A1 | 11/2003 | Cho et al. |
| 2003/0225883 A1 | 12/2003 | Greaves et al. |
| 2003/0227382 A1 | 12/2003 | Breed |
| 2003/0227439 A1 | 12/2003 | Lee et al. |
| 2003/0229779 A1 | 12/2003 | Morais et al. |
| 2003/0230934 A1 | 12/2003 | Cordelli et al. |
| 2003/0233155 A1 | 12/2003 | Slemmer et al. |
| 2003/0233332 A1 | 12/2003 | Keeler et al. |
| 2003/0233429 A1 | 12/2003 | Matte et al. |
| 2003/0233549 A1 | 12/2003 | Hatakeyama et al. |
| 2003/0233583 A1 | 12/2003 | Carley |
| 2003/0233594 A1 | 12/2003 | Earl |
| 2003/0236841 A1 | 12/2003 | Epshteyn |
| 2004/0003051 A1 | 1/2004 | Krzyzanowski et al. |
| 2004/0003241 A1 | 1/2004 | Sengodan et al. |
| 2004/0005039 A1 | 1/2004 | White et al. |
| 2004/0008724 A1 | 1/2004 | Devine et al. |
| 2004/0015572 A1 | 1/2004 | Kang |
| 2004/0019489 A1 | 1/2004 | Funk et al. |
| 2004/0034697 A1 | 2/2004 | Fairhurst et al. |
| 2004/0034798 A1 | 2/2004 | Yamada et al. |
| 2004/0036615 A1 | 2/2004 | Candela |
| 2004/0037295 A1 | 2/2004 | Tanaka et al. |
| 2004/0039459 A1 | 2/2004 | Daugherty et al. |
| 2004/0049321 A1 | 3/2004 | Lehr et al. |
| 2004/0054789 A1 | 3/2004 | Breh et al. |
| 2004/0056665 A1 | 3/2004 | Iwanaga et al. |
| 2004/0064351 A1 | 4/2004 | Mikurak |
| 2004/0068583 A1 | 4/2004 | Monroe et al. |
| 2004/0068657 A1 | 4/2004 | Alexander et al. |
| 2004/0068668 A1 | 4/2004 | Lor et al. |
| 2004/0075738 A1 | 4/2004 | Burke et al. |
| 2004/0078825 A1 | 4/2004 | Murphy |
| 2004/0083015 A1 | 4/2004 | Patwari |
| 2004/0086093 A1 | 5/2004 | Schranz |
| 2004/0093492 A1 | 5/2004 | Daude et al. |
| 2004/0095943 A1 | 5/2004 | Korotin |
| 2004/0102859 A1 | 5/2004 | Bennett |
| 2004/0103308 A1 | 5/2004 | Paller |
| 2004/0107027 A1 | 6/2004 | Boudrieau |
| 2004/0107299 A1 | 6/2004 | Lee et al. |
| 2004/0111294 A1 | 6/2004 | McNally et al. |
| 2004/0113770 A1 | 6/2004 | Falk et al. |
| 2004/0113778 A1 | 6/2004 | Script et al. |
| 2004/0113937 A1 | 6/2004 | Sawdey et al. |
| 2004/0117068 A1 | 6/2004 | Lee |
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0125146 A1 | 7/2004 | Gerlach et al. |
| 2004/0125782 A1 | 7/2004 | Chang |
| 2004/0125931 A1 | 7/2004 | Archer |
| 2004/0133689 A1 | 7/2004 | Vasisht |
| 2004/0136386 A1 | 7/2004 | Miller et al. |
| 2004/0137915 A1 | 7/2004 | Diener et al. |
| 2004/0139227 A1 | 7/2004 | Takeda |
| 2004/0143428 A1 | 7/2004 | Rappaport et al. |
| 2004/0143602 A1 | 7/2004 | Ruiz et al. |
| 2004/0143749 A1 | 7/2004 | Tajalli et al. |
| 2004/0153171 A1 | 8/2004 | Brandt et al. |
| 2004/0155757 A1 | 8/2004 | Litwin et al. |
| 2004/0160309 A1 | 8/2004 | Stilp |
| 2004/0163073 A1 | 8/2004 | Krzyzanowski et al. |
| 2004/0163118 A1 | 8/2004 | Mottur |
| 2004/0163705 A1 | 8/2004 | Uhler |
| 2004/0169288 A1 | 9/2004 | Hsieh et al. |
| 2004/0170120 A1 | 9/2004 | Reunamaki et al. |
| 2004/0170155 A1 | 9/2004 | Omar et al. |
| 2004/0172657 A1 | 9/2004 | Phillips et al. |
| 2004/0177163 A1 | 9/2004 | Casey et al. |
| 2004/0181693 A1 | 9/2004 | Milliot et al. |
| 2004/0183756 A1 | 9/2004 | Freitas et al. |
| 2004/0189471 A1 | 9/2004 | Ciarcia et al. |
| 2004/0189871 A1 | 9/2004 | Kurosawa et al. |
| 2004/0196844 A1 | 10/2004 | Hagino |
| 2004/0198386 A1 | 10/2004 | Dupray |
| 2004/0199645 A1 | 10/2004 | Rouhi |
| 2004/0201472 A1 | 10/2004 | McGunn et al. |
| 2004/0202351 A1 | 10/2004 | Park et al. |
| 2004/0204806 A1 | 10/2004 | Chen et al. |
| 2004/0212494 A1 | 10/2004 | Stilp |
| 2004/0212687 A1 | 10/2004 | Patwari |
| 2004/0213150 A1 | 10/2004 | Krause et al. |
| 2004/0215694 A1 | 10/2004 | Podolsky |
| 2004/0215700 A1 | 10/2004 | Shenfield et al. |
| 2004/0215750 A1 | 10/2004 | Stilp |
| 2004/0215955 A1 | 10/2004 | Tamai et al. |
| 2004/0218591 A1 | 11/2004 | Ogawa et al. |
| 2004/0220830 A1 | 11/2004 | Moreton et al. |
| 2004/0223605 A1 | 11/2004 | Donnelly |
| 2004/0225516 A1 | 11/2004 | Bruskotter et al. |
| 2004/0225719 A1 | 11/2004 | Kisley et al. |
| 2004/0225878 A1 | 11/2004 | Costa-Requena et al. |
| 2004/0229569 A1 | 11/2004 | Franz |
| 2004/0243714 A1 | 12/2004 | Wynn et al. |
| 2004/0243835 A1 | 12/2004 | Terzis et al. |
| 2004/0243996 A1 | 12/2004 | Sheehy et al. |
| 2004/0246339 A1 | 12/2004 | Ooshima et al. |
| 2004/0249613 A1 | 12/2004 | Sprogis et al. |
| 2004/0249922 A1 | 12/2004 | Hackman et al. |
| 2004/0253926 A1 | 12/2004 | Gross |
| 2004/0257433 A1 | 12/2004 | Lia et al. |
| 2004/0258032 A1 | 12/2004 | Kawamura |
| 2004/0260407 A1 | 12/2004 | Wimsatt |
| 2004/0260527 A1 | 12/2004 | Stanculescu |
| 2004/0263314 A1 | 12/2004 | Dorai et al. |
| 2004/0263625 A1 | 12/2004 | Ishigami et al. |
| 2004/0263626 A1 | 12/2004 | Piccionelli |
| 2004/0266493 A1 | 12/2004 | Bahl et al. |
| 2004/0267385 A1 | 12/2004 | Lingemann |
| 2004/0267937 A1 | 12/2004 | Klemets |
| 2004/0268298 A1 | 12/2004 | Miller et al. |
| 2005/0002335 A1 | 1/2005 | Adamczyk et al. |
| 2005/0002408 A1 | 1/2005 | Lee |
| 2005/0002417 A1 | 1/2005 | Kelly et al. |
| 2005/0007967 A1 | 1/2005 | Keskar et al. |
| 2005/0010866 A1 | 1/2005 | Humpleman et al. |
| 2005/0015458 A1 | 1/2005 | La |
| 2005/0015805 A1 | 1/2005 | Iwamura |
| 2005/0021309 A1 | 1/2005 | Alexander et al. |
| 2005/0021626 A1 | 1/2005 | Prajapat et al. |
| 2005/0021710 A1 | 1/2005 | Johnson et al. |
| 2005/0021826 A1 | 1/2005 | Kumar |
| 2005/0022210 A1 | 1/2005 | Zintel et al. |
| 2005/0023858 A1 | 2/2005 | Bingle et al. |
| 2005/0024203 A1 | 2/2005 | Wolfe |
| 2005/0027881 A1 | 2/2005 | Figueira et al. |
| 2005/0030928 A1 | 2/2005 | Virtanen et al. |
| 2005/0031108 A1 | 2/2005 | Eshun et al. |
| 2005/0033513 A1 | 2/2005 | Gasbarro |
| 2005/0038325 A1 | 2/2005 | Moll |
| 2005/0038326 A1 | 2/2005 | Mathur |
| 2005/0044061 A1 | 2/2005 | Klemow |
| 2005/0048957 A1 | 3/2005 | Casey et al. |
| 2005/0049746 A1 | 3/2005 | Rosenblum |
| 2005/0050214 A1 | 3/2005 | Nishiyama et al. |
| 2005/0052831 A1 | 3/2005 | Chen |
| 2005/0055575 A1 | 3/2005 | Evans et al. |
| 2005/0055716 A1 | 3/2005 | Louie et al. |
| 2005/0057361 A1 | 3/2005 | Giraldo et al. |
| 2005/0060163 A1 | 3/2005 | Barsness et al. |
| 2005/0060411 A1 | 3/2005 | Coulombe et al. |
| 2005/0063336 A1* | 3/2005 | Kim ............... H04W 72/54 |
| | | 370/329 |
| 2005/0066045 A1 | 3/2005 | Johnson et al. |
| 2005/0066912 A1 | 3/2005 | Korbitz et al. |
| 2005/0069098 A1 | 3/2005 | Kalervo et al. |
| 2005/0071483 A1 | 3/2005 | Motoyama |

(56)     References Cited

U.S. PATENT DOCUMENTS

| 2005/0075764 | A1 | 4/2005 | Horst et al. |
| 2005/0079855 | A1 | 4/2005 | Jethi et al. |
| 2005/0079863 | A1 | 4/2005 | Macaluso |
| 2005/0081161 | A1 | 4/2005 | Macinnes et al. |
| 2005/0086093 | A1 | 4/2005 | Hammad et al. |
| 2005/0086126 | A1 | 4/2005 | Patterson |
| 2005/0086211 | A1 | 4/2005 | Mayer |
| 2005/0086366 | A1 | 4/2005 | Luebke et al. |
| 2005/0088983 | A1 | 4/2005 | Wesslen et al. |
| 2005/0089023 | A1 | 4/2005 | Barkley et al. |
| 2005/0090915 | A1 | 4/2005 | Geiwitz |
| 2005/0091435 | A1 | 4/2005 | Han et al. |
| 2005/0091696 | A1 | 4/2005 | Wolfe et al. |
| 2005/0096753 | A1 | 5/2005 | Arling et al. |
| 2005/0101314 | A1 | 5/2005 | Levi |
| 2005/0102152 | A1 | 5/2005 | Hodges |
| 2005/0102497 | A1 | 5/2005 | Buer |
| 2005/0105530 | A1 | 5/2005 | Kono |
| 2005/0108091 | A1 | 5/2005 | Sotak et al. |
| 2005/0108369 | A1 | 5/2005 | Sather et al. |
| 2005/0111660 | A1 | 5/2005 | Hosoda |
| 2005/0114432 | A1 | 5/2005 | Hodges et al. |
| 2005/0114528 | A1 | 5/2005 | Suito |
| 2005/0114900 | A1 | 5/2005 | Ladd et al. |
| 2005/0117602 | A1 | 6/2005 | Carrigan et al. |
| 2005/0117732 | A1 | 6/2005 | Arpin |
| 2005/0119767 | A1 | 6/2005 | Kiwimagi et al. |
| 2005/0119913 | A1 | 6/2005 | Hornreich et al. |
| 2005/0120082 | A1 | 6/2005 | Hesselink et al. |
| 2005/0125083 | A1 | 6/2005 | Kiko |
| 2005/0128083 | A1 | 6/2005 | Puzio et al. |
| 2005/0128093 | A1 | 6/2005 | Genova et al. |
| 2005/0128314 | A1 | 6/2005 | Ishino |
| 2005/0144044 | A1 | 6/2005 | Godschall et al. |
| 2005/0144312 | A1 | 6/2005 | Kadyk et al. |
| 2005/0144645 | A1 | 6/2005 | Casey et al. |
| 2005/0148356 | A1 | 7/2005 | Ferguson et al. |
| 2005/0149639 | A1 | 7/2005 | Vrielink et al. |
| 2005/0149746 | A1 | 7/2005 | Lu et al. |
| 2005/0154494 | A1 | 7/2005 | Ahmed |
| 2005/0154774 | A1 | 7/2005 | Giaffreda et al. |
| 2005/0155757 | A1 | 7/2005 | Paton |
| 2005/0156568 | A1 | 7/2005 | Yueh |
| 2005/0156737 | A1 | 7/2005 | Al-Khateeb |
| 2005/0159823 | A1 | 7/2005 | Hayes et al. |
| 2005/0159911 | A1 | 7/2005 | Funk et al. |
| 2005/0169288 | A1 | 8/2005 | Kamiwada et al. |
| 2005/0177515 | A1 | 8/2005 | Kalavade et al. |
| 2005/0179531 | A1 | 8/2005 | Tabe |
| 2005/0181196 | A1 | 8/2005 | Aylward et al. |
| 2005/0182681 | A1 | 8/2005 | Bruskotter et al. |
| 2005/0184865 | A1 | 8/2005 | Han |
| 2005/0185618 | A1 | 8/2005 | Friday et al. |
| 2005/0187677 | A1 | 8/2005 | Walker |
| 2005/0188315 | A1 | 8/2005 | Campbell et al. |
| 2005/0197847 | A1 | 9/2005 | Smith |
| 2005/0198216 | A1 | 9/2005 | Behera et al. |
| 2005/0200474 | A1 | 9/2005 | Behnke |
| 2005/0204076 | A1 | 9/2005 | Cumpson et al. |
| 2005/0207429 | A1 | 9/2005 | Akita et al. |
| 2005/0216302 | A1 | 9/2005 | Raji et al. |
| 2005/0220123 | A1 | 10/2005 | Wybenga et al. |
| 2005/0222933 | A1 | 10/2005 | Wesby |
| 2005/0229016 | A1 | 10/2005 | Addy |
| 2005/0232242 | A1 | 10/2005 | Karaoguz et al. |
| 2005/0232284 | A1 | 10/2005 | Karaoguz et al. |
| 2005/0234568 | A1 | 10/2005 | Chung et al. |
| 2005/0237182 | A1 | 10/2005 | Wang |
| 2005/0246119 | A1 | 11/2005 | Koodali |
| 2005/0246408 | A1 | 11/2005 | Chung |
| 2005/0249199 | A1 | 11/2005 | Albert et al. |
| 2005/0253709 | A1 | 11/2005 | Baker |
| 2005/0256608 | A1 | 11/2005 | King et al. |
| 2005/0257013 | A1 | 11/2005 | Ma |
| 2005/0257260 | A1 | 11/2005 | Lenoir et al. |
| 2005/0259673 | A1 | 11/2005 | Lu et al. |
| 2005/0262241 | A1 | 11/2005 | Gubbi et al. |
| 2005/0266826 | A1 | 12/2005 | Vlad |
| 2005/0267605 | A1 | 12/2005 | Lee et al. |
| 2005/0270151 | A1 | 12/2005 | Winick |
| 2005/0273831 | A1 | 12/2005 | Slomovich et al. |
| 2005/0276389 | A1 | 12/2005 | Hinkson et al. |
| 2005/0277434 | A1 | 12/2005 | Tuomi et al. |
| 2005/0280964 | A1 | 12/2005 | Richmond et al. |
| 2005/0281196 | A1 | 12/2005 | Tornetta et al. |
| 2005/0282557 | A1 | 12/2005 | Mikko et al. |
| 2005/0285934 | A1 | 12/2005 | Carter |
| 2005/0285941 | A1 | 12/2005 | Haigh et al. |
| 2005/0286518 | A1 | 12/2005 | Park et al. |
| 2006/0007005 | A1 | 1/2006 | Yui et al. |
| 2006/0009863 | A1 | 1/2006 | Lingemann |
| 2006/0015943 | A1 | 1/2006 | Mahieu |
| 2006/0018328 | A1 | 1/2006 | Mody et al. |
| 2006/0018479 | A1 | 1/2006 | Chen |
| 2006/0022816 | A1 | 2/2006 | Yukawa |
| 2006/0023847 | A1 | 2/2006 | Tyroler et al. |
| 2006/0026017 | A1 | 2/2006 | Walker |
| 2006/0026301 | A1 | 2/2006 | Maeda et al. |
| 2006/0028997 | A1 | 2/2006 | McFarland |
| 2006/0031426 | A1 | 2/2006 | Mesarina et al. |
| 2006/0031436 | A1 | 2/2006 | Sakata et al. |
| 2006/0031852 | A1 | 2/2006 | Chu et al. |
| 2006/0036750 | A1 | 2/2006 | Ladd et al. |
| 2006/0041655 | A1 | 2/2006 | Holloway et al. |
| 2006/0045074 | A1 | 3/2006 | Lee |
| 2006/0050692 | A1 | 3/2006 | Petrescu et al. |
| 2006/0050862 | A1 | 3/2006 | Shen et al. |
| 2006/0051122 | A1 | 3/2006 | Kawazu et al. |
| 2006/0052884 | A1 | 3/2006 | Staples et al. |
| 2006/0053447 | A1 | 3/2006 | Krzyzanowski et al. |
| 2006/0053459 | A1 | 3/2006 | Simerly et al. |
| 2006/0053491 | A1 | 3/2006 | Khuti et al. |
| 2006/0058923 | A1 | 3/2006 | Kruk et al. |
| 2006/0063534 | A1 | 3/2006 | Kokkonen et al. |
| 2006/0064305 | A1 | 3/2006 | Alonso |
| 2006/0064478 | A1 | 3/2006 | Sirkin |
| 2006/0067344 | A1 | 3/2006 | Sakurai |
| 2006/0067356 | A1 | 3/2006 | Kim et al. |
| 2006/0067484 | A1 | 3/2006 | Elliot et al. |
| 2006/0071773 | A1 | 4/2006 | Ahmed et al. |
| 2006/0072470 | A1 | 4/2006 | Moore et al. |
| 2006/0075235 | A1 | 4/2006 | Renkis |
| 2006/0077254 | A1 | 4/2006 | Shu et al. |
| 2006/0078344 | A1 | 4/2006 | Kawazu et al. |
| 2006/0080380 | A1 | 4/2006 | Aizu et al. |
| 2006/0080465 | A1 | 4/2006 | Conzola et al. |
| 2006/0082651 | A1 | 4/2006 | Hirafuji et al. |
| 2006/0085831 | A1 | 4/2006 | Jones et al. |
| 2006/0088092 | A1 | 4/2006 | Chen et al. |
| 2006/0092955 | A1 | 5/2006 | Durbin et al. |
| 2006/0093365 | A1 | 5/2006 | Dybsetter et al. |
| 2006/0094400 | A1 | 5/2006 | Beachem et al. |
| 2006/0101062 | A1 | 5/2006 | Godman et al. |
| 2006/0103510 | A1 | 5/2006 | Chen et al. |
| 2006/0104312 | A1 | 5/2006 | Friar |
| 2006/0105713 | A1 | 5/2006 | Zheng et al. |
| 2006/0106933 | A1 | 5/2006 | Huang et al. |
| 2006/0109113 | A1 | 5/2006 | Reyes et al. |
| 2006/0109860 | A1 | 5/2006 | Matsunaga et al. |
| 2006/0109966 | A1 | 5/2006 | Sasakura et al. |
| 2006/0111095 | A1 | 5/2006 | Weigand |
| 2006/0114842 | A1 | 6/2006 | Miyamoto et al. |
| 2006/0121924 | A1 | 6/2006 | Rengaraju et al. |
| 2006/0122774 | A1 | 6/2006 | Nou |
| 2006/0123212 | A1 | 6/2006 | Yagawa |
| 2006/0129837 | A1 | 6/2006 | Im et al. |
| 2006/0130004 | A1 | 6/2006 | Hughes et al. |
| 2006/0132302 | A1 | 6/2006 | Stilp |
| 2006/0133412 | A1 | 6/2006 | Callaghan |
| 2006/0136558 | A1 | 6/2006 | Sheehan et al. |
| 2006/0142968 | A1 | 6/2006 | Han et al. |
| 2006/0142978 | A1 | 6/2006 | Suenbuel et al. |
| 2006/0143268 | A1 | 6/2006 | Chatani |
| 2006/0145842 | A1 | 7/2006 | Stilp |

(56) References Cited

U.S. PATENT DOCUMENTS

| | | |
|---|---|---|
| 2006/0153122 A1 | 7/2006 | Hinman et al. |
| 2006/0154642 A1 | 7/2006 | Scannell |
| 2006/0155851 A1 | 7/2006 | Ma et al. |
| 2006/0159032 A1 | 7/2006 | Ukrainetz et al. |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0167919 A1 | 7/2006 | Hsieh |
| 2006/0168013 A1 | 7/2006 | Wilson et al. |
| 2006/0168095 A1 | 7/2006 | Sharma et al. |
| 2006/0168178 A1 | 7/2006 | Hwang et al. |
| 2006/0168190 A1 | 7/2006 | Johan et al. |
| 2006/0171307 A1 | 8/2006 | Gopalakrishnan et al. |
| 2006/0176146 A1 | 8/2006 | Krishan et al. |
| 2006/0176167 A1 | 8/2006 | Dohrmann |
| 2006/0181406 A1 | 8/2006 | Petite et al. |
| 2006/0182100 A1 | 8/2006 | Li et al. |
| 2006/0187900 A1 | 8/2006 | Akbar |
| 2006/0189311 A1 | 8/2006 | Cromer et al. |
| 2006/0190458 A1 | 8/2006 | Mishina et al. |
| 2006/0190529 A1 | 8/2006 | Morozumi et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0206246 A1 | 9/2006 | Walker |
| 2006/0208872 A1 | 9/2006 | Yu et al. |
| 2006/0208880 A1 | 9/2006 | Funk et al. |
| 2006/0209857 A1 | 9/2006 | Hicks |
| 2006/0215650 A1 | 9/2006 | Wollmershauser et al. |
| 2006/0217115 A1 | 9/2006 | Cassett et al. |
| 2006/0218244 A1 | 9/2006 | Rasmussen et al. |
| 2006/0218593 A1 | 9/2006 | Afshary et al. |
| 2006/0221184 A1 | 10/2006 | Vallone et al. |
| 2006/0222153 A1 | 10/2006 | Tarkoff et al. |
| 2006/0226972 A1 | 10/2006 | Smith |
| 2006/0229746 A1 | 10/2006 | Ollis et al. |
| 2006/0230270 A1 | 10/2006 | Goffin |
| 2006/0233372 A1 | 10/2006 | Shaheen et al. |
| 2006/0235963 A1 | 10/2006 | Wetherly et al. |
| 2006/0236050 A1 | 10/2006 | Sugimoto et al. |
| 2006/0238372 A1 | 10/2006 | Jung et al. |
| 2006/0238617 A1 | 10/2006 | Tamir |
| 2006/0242395 A1 | 10/2006 | Fausak |
| 2006/0244589 A1 | 11/2006 | Schranz |
| 2006/0245369 A1 | 11/2006 | Schimmelpfeng et al. |
| 2006/0246886 A1 | 11/2006 | Benco et al. |
| 2006/0246919 A1 | 11/2006 | Park et al. |
| 2006/0250235 A1 | 11/2006 | Astrin |
| 2006/0250578 A1 | 11/2006 | Pohl et al. |
| 2006/0251255 A1 | 11/2006 | Batta |
| 2006/0258342 A1 | 11/2006 | Fok et al. |
| 2006/0259951 A1 | 11/2006 | Forssell et al. |
| 2006/0265489 A1 | 11/2006 | Moore |
| 2006/0271695 A1 | 11/2006 | Lavian |
| 2006/0274764 A1 | 12/2006 | Mah et al. |
| 2006/0281435 A1 | 12/2006 | Shearer et al. |
| 2006/0282886 A1 | 12/2006 | Gaug |
| 2006/0288288 A1 | 12/2006 | Girgensohn et al. |
| 2006/0291507 A1 | 12/2006 | Sarosi et al. |
| 2006/0293100 A1 | 12/2006 | Walter |
| 2006/0294565 A1 | 12/2006 | Walter |
| 2007/0001818 A1 | 1/2007 | Small et al. |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0008099 A1 | 1/2007 | Kimmel et al. |
| 2007/0014248 A1 | 1/2007 | Fowlow |
| 2007/0027987 A1 | 2/2007 | Tripp et al. |
| 2007/0043478 A1 | 2/2007 | Ehlers et al. |
| 2007/0043766 A1 | 2/2007 | Nicholas et al. |
| 2007/0043954 A1 | 2/2007 | Fox |
| 2007/0046462 A1 | 3/2007 | Fancella |
| 2007/0047585 A1 | 3/2007 | Gillespie et al. |
| 2007/0052675 A1 | 3/2007 | Chang |
| 2007/0055759 A1 | 3/2007 | McCoy et al. |
| 2007/0055770 A1 | 3/2007 | Karmakar et al. |
| 2007/0058627 A1 | 3/2007 | Smith et al. |
| 2007/0058634 A1 | 3/2007 | Gupta et al. |
| 2007/0061018 A1 | 3/2007 | Callaghan et al. |
| 2007/0061020 A1 | 3/2007 | Bovee et al. |
| 2007/0061266 A1 | 3/2007 | Moore et al. |
| 2007/0061430 A1 | 3/2007 | Kim |
| 2007/0061878 A1 | 3/2007 | Hagiu et al. |
| 2007/0063836 A1 | 3/2007 | Hayden et al. |
| 2007/0063866 A1 | 3/2007 | Webb |
| 2007/0064714 A1 | 3/2007 | Bi et al. |
| 2007/0067780 A1 | 3/2007 | Kumar et al. |
| 2007/0079012 A1 | 4/2007 | Walker |
| 2007/0079151 A1 | 4/2007 | Connor et al. |
| 2007/0079385 A1 | 4/2007 | Williams et al. |
| 2007/0083668 A1 | 4/2007 | Kelsey et al. |
| 2007/0090944 A1 | 4/2007 | Du Breuil |
| 2007/0094716 A1 | 4/2007 | Farino et al. |
| 2007/0096981 A1 | 5/2007 | Abraham |
| 2007/0101345 A1 | 5/2007 | Takagi |
| 2007/0105072 A1 | 5/2007 | Koljonen |
| 2007/0106124 A1 | 5/2007 | Kuriyama et al. |
| 2007/0106536 A1 | 5/2007 | Moore |
| 2007/0106547 A1 | 5/2007 | Agrawal |
| 2007/0109975 A1 | 5/2007 | Reckamp et al. |
| 2007/0116020 A1 | 5/2007 | Cheever et al. |
| 2007/0117464 A1 | 5/2007 | Freeman |
| 2007/0118609 A1 | 5/2007 | Mullan et al. |
| 2007/0126875 A1 | 6/2007 | Miyamaki |
| 2007/0127510 A1 | 6/2007 | Bossemeyer et al. |
| 2007/0130457 A1 | 6/2007 | Kamat et al. |
| 2007/0132576 A1 | 6/2007 | Kolavennu et al. |
| 2007/0136759 A1 | 6/2007 | Zhang et al. |
| 2007/0140267 A1 | 6/2007 | Yang |
| 2007/0142022 A1 | 6/2007 | Madonna et al. |
| 2007/0142044 A1 | 6/2007 | Fitzgerald et al. |
| 2007/0143400 A1 | 6/2007 | Kelley et al. |
| 2007/0143440 A1 | 6/2007 | Reckamp et al. |
| 2007/0146127 A1 | 6/2007 | Stilp et al. |
| 2007/0146484 A1 | 6/2007 | Horton et al. |
| 2007/0147419 A1 | 6/2007 | Tsujimoto et al. |
| 2007/0150616 A1 | 6/2007 | Baek et al. |
| 2007/0154010 A1 | 7/2007 | Wong |
| 2007/0155325 A1 | 7/2007 | Bambic et al. |
| 2007/0155423 A1 | 7/2007 | Carmody et al. |
| 2007/0156689 A1 | 7/2007 | Meek et al. |
| 2007/0160017 A1 | 7/2007 | Meier et al. |
| 2007/0161372 A1 | 7/2007 | Rogalski et al. |
| 2007/0162228 A1 | 7/2007 | Mitchell |
| 2007/0162680 A1 | 7/2007 | Mitchell |
| 2007/0164779 A1 | 7/2007 | Weston et al. |
| 2007/0168860 A1 | 7/2007 | Takayama et al. |
| 2007/0176760 A1 | 8/2007 | Reeves et al. |
| 2007/0176766 A1 | 8/2007 | Cheng |
| 2007/0182543 A1 | 8/2007 | Luo |
| 2007/0182819 A1 | 8/2007 | Monroe |
| 2007/0183345 A1 | 8/2007 | Fahim et al. |
| 2007/0185989 A1 | 8/2007 | Corbett et al. |
| 2007/0192486 A1 | 8/2007 | Wilson et al. |
| 2007/0192863 A1 | 8/2007 | Kapoor et al. |
| 2007/0197236 A1 | 8/2007 | Ahn et al. |
| 2007/0198698 A1 | 8/2007 | Boyd et al. |
| 2007/0200658 A1 | 8/2007 | Yang |
| 2007/0208521 A1 | 9/2007 | Petite et al. |
| 2007/0214262 A1 | 9/2007 | Buchbinder et al. |
| 2007/0214264 A1 | 9/2007 | Koister |
| 2007/0216764 A1 | 9/2007 | Kwak |
| 2007/0216783 A1 | 9/2007 | Ortiz et al. |
| 2007/0218895 A1 | 9/2007 | Saito et al. |
| 2007/0223465 A1 | 9/2007 | Wang et al. |
| 2007/0223500 A1 | 9/2007 | Lee et al. |
| 2007/0226182 A1 | 9/2007 | Sobotka et al. |
| 2007/0230415 A1 | 10/2007 | Malik |
| 2007/0230744 A1 | 10/2007 | Dronge |
| 2007/0245223 A1 | 10/2007 | Siedzik et al. |
| 2007/0249323 A1 | 10/2007 | Lee et al. |
| 2007/0253361 A1 | 11/2007 | Pristas et al. |

(56)                References Cited

U.S. PATENT DOCUMENTS

| | | | |
|---|---|---|---|
| 2007/0255856 | A1 | 11/2007 | Reckamp et al. |
| 2007/0256105 | A1 | 11/2007 | Tabe |
| 2007/0257986 | A1 | 11/2007 | Ivanov et al. |
| 2007/0260713 | A1 | 11/2007 | Moorer et al. |
| 2007/0262857 | A1 | 11/2007 | Jackson |
| 2007/0263782 | A1 | 11/2007 | Stock et al. |
| 2007/0265866 | A1 | 11/2007 | Fehling et al. |
| 2007/0271398 | A1 | 11/2007 | Manchester et al. |
| 2007/0275703 | A1 | 11/2007 | Lim et al. |
| 2007/0277111 | A1 | 11/2007 | Bennett et al. |
| 2007/0282665 | A1 | 12/2007 | Buehler et al. |
| 2007/0283001 | A1 | 12/2007 | Spiess et al. |
| 2007/0283004 | A1 | 12/2007 | Buehler |
| 2007/0287405 | A1 | 12/2007 | Radtke |
| 2007/0288858 | A1 | 12/2007 | Pereira |
| 2007/0290830 | A1 | 12/2007 | Gurley |
| 2007/0291118 | A1 | 12/2007 | Shu et al. |
| 2007/0296814 | A1 | 12/2007 | Cooper et al. |
| 2007/0298772 | A1 | 12/2007 | Owens et al. |
| 2008/0008150 | A1 | 1/2008 | Chow et al. |
| 2008/0013531 | A1 | 1/2008 | Elliott et al. |
| 2008/0013957 | A1 | 1/2008 | Akers et al. |
| 2008/0025487 | A1 | 1/2008 | Johan et al. |
| 2008/0027587 | A1 | 1/2008 | Nickerson et al. |
| 2008/0040272 | A1 | 2/2008 | Eskin |
| 2008/0042826 | A1 | 2/2008 | Hevia et al. |
| 2008/0043107 | A1 | 2/2008 | Coogan et al. |
| 2008/0046593 | A1 | 2/2008 | Ando et al. |
| 2008/0048975 | A1 | 2/2008 | Leibow |
| 2008/0052348 | A1 | 2/2008 | Adler et al. |
| 2008/0056212 | A1 | 3/2008 | Karaoguz et al. |
| 2008/0059533 | A1 | 3/2008 | Krikorian |
| 2008/0059622 | A1 | 3/2008 | Hite et al. |
| 2008/0065681 | A1 | 3/2008 | Fontijn et al. |
| 2008/0065685 | A1 | 3/2008 | Frank |
| 2008/0069121 | A1 | 3/2008 | Adamson et al. |
| 2008/0072244 | A1 | 3/2008 | Eker et al. |
| 2008/0074993 | A1 | 3/2008 | Vainola |
| 2008/0082186 | A1 | 4/2008 | Hood et al. |
| 2008/0084294 | A1 | 4/2008 | Zhiying et al. |
| 2008/0084296 | A1 | 4/2008 | Kutzik et al. |
| 2008/0086564 | A1 | 4/2008 | Putman et al. |
| 2008/0091793 | A1 | 4/2008 | Diroo et al. |
| 2008/0094204 | A1 | 4/2008 | Kogan et al. |
| 2008/0095339 | A1 | 4/2008 | Elliott et al. |
| 2008/0097871 | A1 | 4/2008 | Williams et al. |
| 2008/0100705 | A1 | 5/2008 | Kister et al. |
| 2008/0102845 | A1 | 5/2008 | Zhao |
| 2008/0103608 | A1 | 5/2008 | Gough et al. |
| 2008/0104215 | A1 | 5/2008 | Excoffier et al. |
| 2008/0104516 | A1 | 5/2008 | Lee |
| 2008/0109302 | A1 | 5/2008 | Salokannel et al. |
| 2008/0109650 | A1 | 5/2008 | Shim et al. |
| 2008/0112340 | A1 | 5/2008 | Luebke |
| 2008/0112405 | A1 | 5/2008 | Cholas et al. |
| 2008/0117029 | A1 | 5/2008 | Dohrmann et al. |
| 2008/0117201 | A1 | 5/2008 | Martinez et al. |
| 2008/0120405 | A1 | 5/2008 | Son et al. |
| 2008/0122575 | A1 | 5/2008 | Lavian et al. |
| 2008/0126535 | A1 | 5/2008 | Zhu et al. |
| 2008/0128444 | A1 | 6/2008 | Schininger et al. |
| 2008/0129484 | A1 | 6/2008 | Dahl et al. |
| 2008/0130949 | A1 | 6/2008 | Ivanov et al. |
| 2008/0133725 | A1 | 6/2008 | Shaouy |
| 2008/0134165 | A1 | 6/2008 | Anderson et al. |
| 2008/0134343 | A1 | 6/2008 | Pennington et al. |
| 2008/0137572 | A1 | 6/2008 | Park et al. |
| 2008/0140868 | A1 | 6/2008 | Kalayjian et al. |
| 2008/0141303 | A1 | 6/2008 | Walker et al. |
| 2008/0141341 | A1 | 6/2008 | Mnogradov et al. |
| 2008/0144884 | A1 | 6/2008 | Habibi |
| 2008/0147834 | A1 | 6/2008 | Quinn et al. |
| 2008/0151037 | A1 | 6/2008 | Kumarasamy et al. |
| 2008/0155080 | A1 | 6/2008 | Marlow et al. |
| 2008/0155470 | A1 | 6/2008 | Khedouri et al. |
| 2008/0162637 | A1 | 7/2008 | Adamczyk et al. |
| 2008/0163355 | A1 | 7/2008 | Chu |
| 2008/0165787 | A1 | 7/2008 | Xu et al. |
| 2008/0170511 | A1 | 7/2008 | Shorty et al. |
| 2008/0181239 | A1 | 7/2008 | Wood et al. |
| 2008/0183483 | A1 | 7/2008 | Hart |
| 2008/0189609 | A1 | 8/2008 | Larson et al. |
| 2008/0189774 | A1 | 8/2008 | Ansari et al. |
| 2008/0201468 | A1 | 8/2008 | Titus |
| 2008/0201723 | A1 | 8/2008 | Bottaro et al. |
| 2008/0208399 | A1 | 8/2008 | Pham |
| 2008/0209505 | A1 | 8/2008 | Ghai et al. |
| 2008/0209506 | A1 | 8/2008 | Ghai et al. |
| 2008/0215450 | A1 | 9/2008 | Gates et al. |
| 2008/0215613 | A1 | 9/2008 | Grasso |
| 2008/0219239 | A1 | 9/2008 | Bell et al. |
| 2008/0221715 | A1 | 9/2008 | Krzyzanowski et al. |
| 2008/0227460 | A1 | 9/2008 | David et al. |
| 2008/0229415 | A1 | 9/2008 | Kapoor et al. |
| 2008/0235326 | A1 | 9/2008 | Parsi et al. |
| 2008/0235600 | A1 | 9/2008 | Harper et al. |
| 2008/0239075 | A1 | 10/2008 | Mehrotra et al. |
| 2008/0240372 | A1 | 10/2008 | Frenette |
| 2008/0240696 | A1 | 10/2008 | Kucharyson |
| 2008/0259818 | A1 | 10/2008 | Balassanian |
| 2008/0261540 | A1 | 10/2008 | Rohani et al. |
| 2008/0262990 | A1 | 10/2008 | Kapoor et al. |
| 2008/0262991 | A1 | 10/2008 | Kapoor et al. |
| 2008/0263150 | A1 | 10/2008 | Childers et al. |
| 2008/0266080 | A1 | 10/2008 | Leung et al. |
| 2008/0266257 | A1 | 10/2008 | Chiang |
| 2008/0271150 | A1 | 10/2008 | Boerger et al. |
| 2008/0284580 | A1 | 11/2008 | Babich et al. |
| 2008/0284587 | A1 | 11/2008 | Saigh et al. |
| 2008/0284592 | A1 | 11/2008 | Collins et al. |
| 2008/0288639 | A1 | 11/2008 | Ruppert et al. |
| 2008/0294588 | A1 | 11/2008 | Morris et al. |
| 2008/0295172 | A1 | 11/2008 | Bohacek |
| 2008/0297599 | A1 | 12/2008 | Donovan et al. |
| 2008/0303903 | A1 | 12/2008 | Bentley et al. |
| 2008/0313316 | A1 | 12/2008 | Hite et al. |
| 2008/0316024 | A1 | 12/2008 | Chantelou et al. |
| 2009/0003172 | A1 | 1/2009 | Yahata et al. |
| 2009/0003252 | A1 | 1/2009 | Salomone et al. |
| 2009/0003820 | A1 | 1/2009 | Law et al. |
| 2009/0007596 | A1 | 1/2009 | Goldstein et al. |
| 2009/0013210 | A1 | 1/2009 | Mcintosh et al. |
| 2009/0018850 | A1 | 1/2009 | Abhyanker |
| 2009/0019141 | A1 | 1/2009 | Bush et al. |
| 2009/0022362 | A1 | 1/2009 | Gagvani et al. |
| 2009/0024493 | A1 | 1/2009 | Huang et al. |
| 2009/0036142 | A1 | 2/2009 | Yan |
| 2009/0036159 | A1 | 2/2009 | Chen |
| 2009/0041467 | A1 | 2/2009 | Carleton et al. |
| 2009/0042649 | A1 | 2/2009 | Hsieh et al. |
| 2009/0046664 | A1 | 2/2009 | Aso |
| 2009/0049094 | A1 | 2/2009 | Howell et al. |
| 2009/0049488 | A1 | 2/2009 | Stransky |
| 2009/0051769 | A1 | 2/2009 | Kuo et al. |
| 2009/0055760 | A1 | 2/2009 | Whatcott et al. |
| 2009/0057427 | A1 | 3/2009 | Geadelmann et al. |
| 2009/0063582 | A1 | 3/2009 | Anna et al. |
| 2009/0066534 | A1 | 3/2009 | Sivakkolundhu |
| 2009/0067395 | A1 | 3/2009 | Curtis et al. |
| 2009/0070692 | A1 | 3/2009 | Dawes et al. |
| 2009/0072988 | A1 | 3/2009 | Haywood |
| 2009/0076211 | A1 | 3/2009 | Yang et al. |
| 2009/0076879 | A1 | 3/2009 | Sparks et al. |
| 2009/0077623 | A1 | 3/2009 | Baum et al. |
| 2009/0079547 | A1 | 3/2009 | Oksanen et al. |
| 2009/0083167 | A1 | 3/2009 | Subbloie |
| 2009/0086660 | A1 | 4/2009 | Sood et al. |
| 2009/0086740 | A1 | 4/2009 | Al-Bakri et al. |
| 2009/0089822 | A1 | 4/2009 | Wada |
| 2009/0092283 | A1 | 4/2009 | Whillock et al. |
| 2009/0094671 | A1 | 4/2009 | Kurapati et al. |
| 2009/0100176 | A1 | 4/2009 | Hicks et al. |
| 2009/0100329 | A1 | 4/2009 | Espinoza |
| 2009/0100460 | A1 | 4/2009 | Hicks et al. |

(56)           References Cited

U.S. PATENT DOCUMENTS

| | | |
|---|---|---|
| 2009/0100492 A1 | 4/2009 | Hicks et al. |
| 2009/0109959 A1 | 4/2009 | Elliott et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0144237 A1 | 6/2009 | Branam et al. |
| 2009/0158189 A1 | 6/2009 | Itani |
| 2009/0158292 A1 | 6/2009 | Rattner et al. |
| 2009/0160856 A1 | 6/2009 | Hoguet |
| 2009/0161609 A1 | 6/2009 | Bergstrom |
| 2009/0172443 A1 | 7/2009 | Rothman et al. |
| 2009/0177298 A1 | 7/2009 | McFarland et al. |
| 2009/0177906 A1 | 7/2009 | Paniagua et al. |
| 2009/0180430 A1 | 7/2009 | Fadell |
| 2009/0182868 A1 | 7/2009 | McFate et al. |
| 2009/0187297 A1 | 7/2009 | Kish et al. |
| 2009/0189981 A1 | 7/2009 | Siann et al. |
| 2009/0193373 A1 | 7/2009 | Abbaspour et al. |
| 2009/0197539 A1 | 8/2009 | Shiba |
| 2009/0202250 A1 | 8/2009 | Dizechi et al. |
| 2009/0204693 A1 | 8/2009 | Andreev et al. |
| 2009/0221368 A1 | 9/2009 | Yen et al. |
| 2009/0224875 A1 | 9/2009 | Rabinowitz et al. |
| 2009/0228445 A1 | 9/2009 | Gangal |
| 2009/0240353 A1 | 9/2009 | Songkakul et al. |
| 2009/0240730 A1 | 9/2009 | Wood |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0254960 A1 | 10/2009 | Yarom et al. |
| 2009/0256708 A1 | 10/2009 | Hsiao et al. |
| 2009/0259515 A1 | 10/2009 | Belimpasakis et al. |
| 2009/0260052 A1 | 10/2009 | Bathula et al. |
| 2009/0260083 A1 | 10/2009 | Szeto et al. |
| 2009/0260430 A1 | 10/2009 | Zamfes |
| 2009/0261943 A1 | 10/2009 | Jana et al. |
| 2009/0265042 A1 | 10/2009 | Mollenkopf et al. |
| 2009/0265193 A1 | 10/2009 | Collins et al. |
| 2009/0270090 A1 | 10/2009 | Kawamura |
| 2009/0271042 A1 | 10/2009 | Voysey |
| 2009/0276728 A1 | 11/2009 | Doan et al. |
| 2009/0289787 A1 | 11/2009 | Dawson et al. |
| 2009/0289788 A1 | 11/2009 | Leblond |
| 2009/0292909 A1 | 11/2009 | Feder et al. |
| 2009/0303100 A1 | 12/2009 | Zemany |
| 2009/0307255 A1 | 12/2009 | Park |
| 2009/0307307 A1 | 12/2009 | Igarashi |
| 2009/0311995 A1 | 12/2009 | Himmelstein |
| 2009/0313693 A1 | 12/2009 | Rogers |
| 2009/0316671 A1 | 12/2009 | Rolf et al. |
| 2009/0319361 A1 | 12/2009 | Conrady |
| 2009/0322510 A1 | 12/2009 | Berger et al. |
| 2009/0324010 A1 | 12/2009 | Hou |
| 2009/0327483 A1 | 12/2009 | Thompson et al. |
| 2009/0327510 A1 | 12/2009 | Edelman et al. |
| 2010/0000791 A1 | 1/2010 | Alberty |
| 2010/0001812 A1 | 1/2010 | Kausch |
| 2010/0004949 A1 | 1/2010 | O'Brien |
| 2010/0008274 A1 | 1/2010 | Kneckt et al. |
| 2010/0009758 A1 | 1/2010 | Twitchell, Jr. |
| 2010/0011298 A1 | 1/2010 | Campbell et al. |
| 2010/0013917 A1 | 1/2010 | Hanna et al. |
| 2010/0026481 A1 | 2/2010 | Oh et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0039958 A1 | 2/2010 | Ge et al. |
| 2010/0041380 A1 | 2/2010 | Hewes et al. |
| 2010/0042954 A1 | 2/2010 | Rosenblatt et al. |
| 2010/0045461 A1 | 2/2010 | Caler et al. |
| 2010/0067371 A1 | 3/2010 | Gogic et al. |
| 2010/0070618 A1 | 3/2010 | Kim et al. |
| 2010/0071053 A1 | 3/2010 | Ansari et al. |
| 2010/0074112 A1 | 3/2010 | Derr et al. |
| 2010/0077111 A1 | 3/2010 | Holmes et al. |
| 2010/0077347 A1 | 3/2010 | Kirtane et al. |
| 2010/0100269 A1 | 4/2010 | Ekhaguere et al. |
| 2010/0102951 A1 | 4/2010 | Rutledge |
| 2010/0121521 A1 | 5/2010 | Kiribayashi |
| 2010/0122091 A1 | 5/2010 | Huang et al. |
| 2010/0138758 A1 | 6/2010 | Mizumori et al. |
| 2010/0138764 A1 | 6/2010 | Hatambeiki et al. |
| 2010/0141762 A1 | 6/2010 | Siann et al. |
| 2010/0145485 A1 | 6/2010 | Duchene et al. |
| 2010/0150170 A1 | 6/2010 | Lee et al. |
| 2010/0159898 A1 | 6/2010 | Krzyzanowski et al. |
| 2010/0159967 A1 | 6/2010 | Pounds et al. |
| 2010/0164736 A1 | 7/2010 | Byers et al. |
| 2010/0165897 A1 | 7/2010 | Sood |
| 2010/0174643 A1 | 7/2010 | Schaefer et al. |
| 2010/0177749 A1 | 7/2010 | Essinger et al. |
| 2010/0177750 A1 | 7/2010 | Essinger et al. |
| 2010/0185857 A1 | 7/2010 | Neitzel et al. |
| 2010/0191352 A1 | 7/2010 | Quail |
| 2010/0197219 A1 | 8/2010 | Issa et al. |
| 2010/0204839 A1 | 8/2010 | Behm et al. |
| 2010/0210240 A1 | 8/2010 | Mahaffey et al. |
| 2010/0211192 A1 | 8/2010 | Stluka et al. |
| 2010/0212012 A1 | 8/2010 | Touboul et al. |
| 2010/0218104 A1 | 8/2010 | Lewis |
| 2010/0219948 A1 | 9/2010 | Egawa |
| 2010/0222069 A1 | 9/2010 | Abraham et al. |
| 2010/0238286 A1 | 9/2010 | Boghossian et al. |
| 2010/0241711 A1 | 9/2010 | Ansari et al. |
| 2010/0241748 A1 | 9/2010 | Ansari et al. |
| 2010/0248681 A1 | 9/2010 | Phills |
| 2010/0267390 A1 | 10/2010 | Lin et al. |
| 2010/0274366 A1 | 10/2010 | Fata et al. |
| 2010/0275018 A1 | 10/2010 | Pedersen |
| 2010/0277302 A1 | 11/2010 | Cohn et al. |
| 2010/0279649 A1 | 11/2010 | Thomas |
| 2010/0281135 A1 | 11/2010 | Cohn et al. |
| 2010/0281161 A1 | 11/2010 | Cohn et al. |
| 2010/0298024 A1 | 11/2010 | Choi |
| 2010/0299556 A1 | 11/2010 | Taylor et al. |
| 2010/0305779 A1 | 12/2010 | Hassan et al. |
| 2010/0308990 A1 | 12/2010 | Simon et al. |
| 2010/0321151 A1 | 12/2010 | Matsuura et al. |
| 2010/0325107 A1 | 12/2010 | Kenton et al. |
| 2010/0332164 A1 | 12/2010 | Aisa et al. |
| 2011/0000521 A1 | 1/2011 | Tachibana |
| 2011/0001898 A1 | 1/2011 | Mikubo et al. |
| 2011/0018998 A1 | 1/2011 | Guzik |
| 2011/0029875 A1 | 2/2011 | Milch |
| 2011/0030056 A1 | 2/2011 | Tokunaga |
| 2011/0037593 A1 | 2/2011 | Foisy et al. |
| 2011/0040415 A1 | 2/2011 | Nickerson et al. |
| 2011/0040877 A1 | 2/2011 | Foisy |
| 2011/0046792 A1 | 2/2011 | Imes et al. |
| 2011/0051638 A1 | 3/2011 | Jeon et al. |
| 2011/0058034 A1 | 3/2011 | Grass |
| 2011/0061011 A1 | 3/2011 | Hoguet |
| 2011/0068921 A1 | 3/2011 | Shafer |
| 2011/0080267 A1 | 4/2011 | Clare et al. |
| 2011/0087988 A1 | 4/2011 | Ray et al. |
| 2011/0093799 A1 | 4/2011 | Hatambeiki et al. |
| 2011/0096678 A1 | 4/2011 | Ketonen |
| 2011/0102588 A1 | 5/2011 | Trundle et al. |
| 2011/0107436 A1 | 5/2011 | Cholas et al. |
| 2011/0125333 A1 | 5/2011 | Gray |
| 2011/0125846 A1 | 5/2011 | Ham et al. |
| 2011/0128378 A1 | 6/2011 | Raji |
| 2011/0130112 A1 | 6/2011 | Saigh et al. |
| 2011/0131226 A1 | 6/2011 | Chandra et al. |
| 2011/0148572 A1 | 6/2011 | Ku |
| 2011/0156914 A1 | 6/2011 | Sheharri et al. |
| 2011/0169637 A1 | 7/2011 | Siegler et al. |
| 2011/0187497 A1 | 8/2011 | Chin |
| 2011/0199327 A1 | 8/2011 | Mcelroy et al. |
| 2011/0200052 A1 | 8/2011 | Mungo et al. |
| 2011/0208359 A1 | 8/2011 | Duchene et al. |
| 2011/0212706 A1 | 9/2011 | Uusilehto |
| 2011/0213869 A1 | 9/2011 | Korsunsky et al. |

(56) References Cited

U.S. PATENT DOCUMENTS

| | | |
|---|---|---|
| 2011/0214157 A1 | 9/2011 | Korsunsky et al. |
| 2011/0218777 A1 | 9/2011 | Chen et al. |
| 2011/0219035 A1 | 9/2011 | Korsunsky et al. |
| 2011/0230139 A1 | 9/2011 | Nakahara |
| 2011/0230160 A1 | 9/2011 | Felgate |
| 2011/0231510 A1 | 9/2011 | Korsunsky et al. |
| 2011/0231564 A1 | 9/2011 | Korsunsky et al. |
| 2011/0234392 A1 | 9/2011 | Cohn et al. |
| 2011/0238660 A1 | 9/2011 | Riggs |
| 2011/0238855 A1 | 9/2011 | Korsunsky et al. |
| 2011/0246762 A1 | 10/2011 | Adams et al. |
| 2011/0257953 A1 | 10/2011 | Li et al. |
| 2011/0261195 A1 | 10/2011 | Martin et al. |
| 2011/0276699 A1 | 11/2011 | Pedersen |
| 2011/0283006 A1 | 11/2011 | Ramamurthy |
| 2011/0289517 A1 | 11/2011 | Sather et al. |
| 2011/0299546 A1 | 12/2011 | Prodan et al. |
| 2011/0302497 A1 | 12/2011 | Garrett et al. |
| 2011/0309929 A1 | 12/2011 | Myers |
| 2011/0314515 A1 | 12/2011 | Hernoud et al. |
| 2012/0001436 A1 | 1/2012 | Sami et al. |
| 2012/0005276 A1 | 1/2012 | Guo et al. |
| 2012/0014363 A1 | 1/2012 | Hassan et al. |
| 2012/0016607 A1 | 1/2012 | Cottrell et al. |
| 2012/0017268 A9 | 1/2012 | Dispensa |
| 2012/0020060 A1 | 1/2012 | Myer et al. |
| 2012/0023151 A1 | 1/2012 | Bennett et al. |
| 2012/0030130 A1 | 2/2012 | Smith et al. |
| 2012/0062370 A1 | 3/2012 | Feldstein et al. |
| 2012/0066608 A1 | 3/2012 | Sundermeyer et al. |
| 2012/0075469 A1 | 3/2012 | Oskin et al. |
| 2012/0081842 A1 | 4/2012 | Ewing et al. |
| 2012/0084184 A1 | 4/2012 | Raleigh et al. |
| 2012/0086552 A1 | 4/2012 | Fast et al. |
| 2012/0143383 A1 | 6/2012 | Cooperrider et al. |
| 2012/0150966 A1 | 6/2012 | Fan et al. |
| 2012/0154126 A1 | 6/2012 | Cohn et al. |
| 2012/0172027 A1 | 7/2012 | Partheesh et al. |
| 2012/0182245 A1 | 7/2012 | Hutton |
| 2012/0209951 A1 | 8/2012 | Enns et al. |
| 2012/0214502 A1 | 8/2012 | Qiang |
| 2012/0232788 A1 | 9/2012 | Diao |
| 2012/0240185 A1 | 9/2012 | Kapoor et al. |
| 2012/0242788 A1 | 9/2012 | Chuang et al. |
| 2012/0257061 A1 | 10/2012 | Edwards et al. |
| 2012/0259722 A1 | 10/2012 | Mikurak |
| 2012/0265892 A1 | 10/2012 | Ma et al. |
| 2012/0269199 A1 | 10/2012 | Chan et al. |
| 2012/0280790 A1 | 11/2012 | Gerhardt et al. |
| 2012/0286951 A1 | 11/2012 | Hess et al. |
| 2012/0290740 A1 | 11/2012 | Tewari et al. |
| 2012/0293686 A1 | 11/2012 | Karn et al. |
| 2012/0296486 A1 | 11/2012 | Marriam et al. |
| 2012/0307646 A1 | 12/2012 | Xia et al. |
| 2012/0309354 A1 | 12/2012 | Du |
| 2012/0313781 A1 | 12/2012 | Barker et al. |
| 2012/0314901 A1 | 12/2012 | Hanson et al. |
| 2012/0315848 A1 | 12/2012 | Smith et al. |
| 2012/0324566 A1 | 12/2012 | Baum et al. |
| 2012/0327242 A1 | 12/2012 | Barley et al. |
| 2012/0331109 A1 | 12/2012 | Baum et al. |
| 2013/0002880 A1 | 1/2013 | Levinson et al. |
| 2013/0038730 A1 | 2/2013 | Peterson et al. |
| 2013/0038800 A1 | 2/2013 | Yoo |
| 2013/0047123 A1 | 2/2013 | May et al. |
| 2013/0057384 A1 | 3/2013 | Morris et al. |
| 2013/0057695 A1 | 3/2013 | Huisking |
| 2013/0062951 A1 | 3/2013 | Raji et al. |
| 2013/0073746 A1 | 3/2013 | Singh et al. |
| 2013/0082835 A1 | 4/2013 | Shapiro et al. |
| 2013/0082836 A1 | 4/2013 | Watts |
| 2013/0085615 A1 | 4/2013 | Barker |
| 2013/0086618 A1 | 4/2013 | Klein et al. |
| 2013/0091209 A1 | 4/2013 | Bennett et al. |
| 2013/0091213 A1 | 4/2013 | Diab et al. |
| 2013/0094538 A1 | 4/2013 | Wang |
| 2013/0103207 A1 | 4/2013 | Ruff et al. |
| 2013/0111576 A1 | 5/2013 | Devine et al. |
| 2013/0115972 A1 | 5/2013 | Ziskind et al. |
| 2013/0120131 A1 | 5/2013 | Hicks, III |
| 2013/0125157 A1 | 5/2013 | Sharif-Ahmadi et al. |
| 2013/0136102 A1 | 5/2013 | Macwan et al. |
| 2013/0147799 A1 | 6/2013 | Hoguet |
| 2013/0154822 A1 | 6/2013 | Kumar et al. |
| 2013/0155229 A1 | 6/2013 | Thornton et al. |
| 2013/0157612 A1 | 6/2013 | Cordero et al. |
| 2013/0162571 A1 | 6/2013 | Tamegai |
| 2013/0163491 A1 | 6/2013 | Singh et al. |
| 2013/0163757 A1 | 6/2013 | Bellovin et al. |
| 2013/0173797 A1 | 7/2013 | Poirer et al. |
| 2013/0174239 A1 | 7/2013 | Kim et al. |
| 2013/0183924 A1 | 7/2013 | Saigh et al. |
| 2013/0184874 A1 | 7/2013 | Frader-Thompson et al. |
| 2013/0185026 A1 | 7/2013 | Vanker et al. |
| 2013/0191755 A1 | 7/2013 | Balog et al. |
| 2013/0205016 A1 | 8/2013 | Dupre et al. |
| 2013/0218959 A1 | 8/2013 | Sa et al. |
| 2013/0222133 A1 | 8/2013 | Schultz et al. |
| 2013/0223279 A1 | 8/2013 | Tinnakornsrisuphap et al. |
| 2013/0245837 A1 | 9/2013 | Grohman |
| 2013/0246576 A1 | 9/2013 | Wogsberg et al. |
| 2013/0257611 A1 | 10/2013 | Lamb et al. |
| 2013/0258119 A1 | 10/2013 | Kim et al. |
| 2013/0261821 A1 | 10/2013 | Lu et al. |
| 2013/0266193 A1 | 10/2013 | Tiwari et al. |
| 2013/0271270 A1 | 10/2013 | Jamadagni et al. |
| 2013/0286942 A1 | 10/2013 | Bonar et al. |
| 2013/0311146 A1 | 11/2013 | Miller et al. |
| 2013/0314542 A1 | 11/2013 | Jackson |
| 2013/0318443 A1 | 11/2013 | Bachman et al. |
| 2013/0325935 A1 | 12/2013 | Kiley et al. |
| 2013/0331109 A1 | 12/2013 | Dhillon et al. |
| 2013/0344875 A1 | 12/2013 | Chowdhury |
| 2013/0346921 A1 | 12/2013 | Shiplacoff et al. |
| 2014/0006660 A1 | 1/2014 | Frei et al. |
| 2014/0024361 A1 | 1/2014 | Poon et al. |
| 2014/0032034 A1 | 1/2014 | Raptopoulos et al. |
| 2014/0033136 A1 | 1/2014 | St. Clair |
| 2014/0035726 A1 | 2/2014 | Schoner et al. |
| 2014/0053246 A1 | 2/2014 | Huang et al. |
| 2014/0068486 A1 | 3/2014 | Sellers et al. |
| 2014/0075464 A1 | 3/2014 | McCrea |
| 2014/0095630 A1 | 4/2014 | Wohlert et al. |
| 2014/0098247 A1 | 4/2014 | Rao et al. |
| 2014/0108151 A1 | 4/2014 | Bookstaff |
| 2014/0109130 A1 | 4/2014 | Sugimoto et al. |
| 2014/0112405 A1 | 4/2014 | Jafarian et al. |
| 2014/0136242 A1 | 5/2014 | Weekes et al. |
| 2014/0136847 A1 | 5/2014 | Huang |
| 2014/0136936 A1 | 5/2014 | Patel et al. |
| 2014/0140575 A1 | 5/2014 | Wolf |
| 2014/0143854 A1 | 5/2014 | Lopez et al. |
| 2014/0146170 A1 | 5/2014 | Tofighbakhsh |
| 2014/0146171 A1 | 5/2014 | Brady et al. |
| 2014/0153695 A1 | 6/2014 | Yanagisawa et al. |
| 2014/0167928 A1 | 6/2014 | Burd |
| 2014/0176797 A1 | 6/2014 | Silva et al. |
| 2014/0180968 A1 | 6/2014 | Song et al. |
| 2014/0188290 A1 | 7/2014 | Steinberg et al. |
| 2014/0188729 A1 | 7/2014 | Hong |
| 2014/0201291 A1 | 7/2014 | Russell |
| 2014/0208214 A1 | 7/2014 | Stern |
| 2014/0218517 A1 | 8/2014 | Kim et al. |
| 2014/0233951 A1 | 8/2014 | Cook |
| 2014/0236325 A1 | 8/2014 | Sasaki et al. |
| 2014/0245014 A1 | 8/2014 | Tuck et al. |
| 2014/0245160 A1 | 8/2014 | Bauer et al. |
| 2014/0254896 A1 | 9/2014 | Zhou et al. |
| 2014/0265359 A1 | 9/2014 | Cheng et al. |
| 2014/0266678 A1 | 9/2014 | Shapiro et al. |
| 2014/0266736 A1 | 9/2014 | Cretu-Petra |
| 2014/0278281 A1 | 9/2014 | Vaynriber et al. |
| 2014/0282048 A1 | 9/2014 | Shapiro et al. |
| 2014/0282934 A1 | 9/2014 | Miasnik et al. |

(56)         References Cited

U.S. PATENT DOCUMENTS

| | | |
|---|---|---|
| 2014/0289384 A1 | 9/2014 | Kao et al. |
| 2014/0289388 A1 | 9/2014 | Ghosh et al. |
| 2014/0293046 A1 | 10/2014 | Ni |
| 2014/0298467 A1 | 10/2014 | Bhagwat et al. |
| 2014/0316616 A1 | 10/2014 | Kugelmass |
| 2014/0317660 A1 | 10/2014 | Cheung et al. |
| 2014/0319232 A1 | 10/2014 | Gourlay et al. |
| 2014/0328161 A1 | 11/2014 | Haddad et al. |
| 2014/0340216 A1 | 11/2014 | Puskarich |
| 2014/0359524 A1 | 12/2014 | Sasaki et al. |
| 2014/0368331 A1 | 12/2014 | Cohn et al. |
| 2014/0369584 A1 | 12/2014 | Fan et al. |
| 2014/0372599 A1 | 12/2014 | Gutt et al. |
| 2014/0378110 A1 | 12/2014 | Chingon et al. |
| 2015/0009325 A1 | 1/2015 | Kardashov |
| 2015/0019714 A1 | 1/2015 | Shaashua et al. |
| 2015/0022666 A1 | 1/2015 | Kay et al. |
| 2015/0026796 A1 | 1/2015 | Alan et al. |
| 2015/0054947 A1 | 2/2015 | Dawes |
| 2015/0058250 A1 | 2/2015 | Stanzione et al. |
| 2015/0074206 A1 | 3/2015 | Baldwin |
| 2015/0074259 A1 | 3/2015 | Ansari et al. |
| 2015/0077553 A1 | 3/2015 | Dawes |
| 2015/0082414 A1 | 3/2015 | Dawes |
| 2015/0088982 A1 | 3/2015 | Johnson et al. |
| 2015/0097680 A1 | 4/2015 | Fadell et al. |
| 2015/0097949 A1 | 4/2015 | Ure et al. |
| 2015/0097961 A1 | 4/2015 | Ure et al. |
| 2015/0100167 A1 | 4/2015 | Sloo et al. |
| 2015/0104147 A1 | 4/2015 | Kosaka et al. |
| 2015/0106721 A1 | 4/2015 | Cha et al. |
| 2015/0130625 A1 | 5/2015 | Tuovinen |
| 2015/0140954 A1 | 5/2015 | Maier et al. |
| 2015/0142991 A1 | 5/2015 | Zaloom |
| 2015/0143395 A1 | 5/2015 | Reisman |
| 2015/0161875 A1 | 6/2015 | Cohn et al. |
| 2015/0170447 A1 | 6/2015 | Buzhardt |
| 2015/0192940 A1 | 7/2015 | Silva et al. |
| 2015/0193127 A1 | 7/2015 | Chai et al. |
| 2015/0205297 A1 | 7/2015 | Stevens et al. |
| 2015/0205465 A1 | 7/2015 | Robison et al. |
| 2015/0222601 A1 | 8/2015 | Metz et al. |
| 2015/0227118 A1 | 8/2015 | Wong |
| 2015/0256355 A1 | 9/2015 | Pera et al. |
| 2015/0261427 A1 | 9/2015 | Sasaki |
| 2015/0266577 A1 | 9/2015 | Jones et al. |
| 2015/0287310 A1 | 10/2015 | Deiiuliis et al. |
| 2015/0304804 A1 | 10/2015 | Lotito |
| 2015/0319006 A1 | 11/2015 | Plummer et al. |
| 2015/0319046 A1 | 11/2015 | Plummer et al. |
| 2015/0325106 A1 | 11/2015 | Dawes et al. |
| 2015/0331662 A1 | 11/2015 | Lambourne |
| 2015/0334087 A1 | 11/2015 | Dawes |
| 2015/0348554 A1 | 12/2015 | Orr et al. |
| 2015/0350031 A1 | 12/2015 | Burks et al. |
| 2015/0350735 A1 | 12/2015 | Crone |
| 2015/0358359 A1 | 12/2015 | Ghai et al. |
| 2015/0365217 A1 | 12/2015 | Scholten et al. |
| 2015/0365933 A1 | 12/2015 | Lee et al. |
| 2015/0371512 A1 | 12/2015 | Bennett et al. |
| 2015/0373149 A1 | 12/2015 | Lyons |
| 2015/0379355 A1 | 12/2015 | Kanga et al. |
| 2016/0004820 A1 | 1/2016 | Moore |
| 2016/0023475 A1 | 1/2016 | Bevier et al. |
| 2016/0027290 A1 | 1/2016 | English |
| 2016/0027295 A1 | 1/2016 | Raji et al. |
| 2016/0036944 A1 | 2/2016 | Kitchen |
| 2016/0037389 A1 | 2/2016 | Tagg et al. |
| 2016/0042637 A1 | 2/2016 | Cahill |
| 2016/0055573 A1 | 2/2016 | Chen et al. |
| 2016/0062624 A1 | 3/2016 | Sundermeyer et al. |
| 2016/0063642 A1 | 3/2016 | Luciani et al. |
| 2016/0065414 A1 | 3/2016 | Sundermeyer et al. |
| 2016/0065653 A1 | 3/2016 | Chen et al. |
| 2016/0068264 A1 | 3/2016 | Ganesh et al. |
| 2016/0077935 A1 | 3/2016 | Zheng et al. |
| 2016/0080365 A1 | 3/2016 | Baker et al. |
| 2016/0087933 A1 | 3/2016 | Johnson et al. |
| 2016/0094421 A1 | 3/2016 | Bali et al. |
| 2016/0100348 A1 | 4/2016 | Cohn et al. |
| 2016/0107749 A1 | 4/2016 | Mucci |
| 2016/0116914 A1 | 4/2016 | Mucci |
| 2016/0127641 A1 | 5/2016 | Gove |
| 2016/0147919 A1 | 5/2016 | Yabe et al. |
| 2016/0150433 A1 | 5/2016 | Bergquist et al. |
| 2016/0156941 A9 | 6/2016 | Alao et al. |
| 2016/0161277 A1 | 6/2016 | Park et al. |
| 2016/0164923 A1 | 6/2016 | Dawes |
| 2016/0171853 A1 | 6/2016 | Naidoo et al. |
| 2016/0180719 A1 | 6/2016 | Wouhaybi et al. |
| 2016/0183073 A1 | 6/2016 | Saito et al. |
| 2016/0187995 A1 | 6/2016 | Rosewall |
| 2016/0189509 A1 | 6/2016 | Malhotra et al. |
| 2016/0189524 A1 | 6/2016 | Poder et al. |
| 2016/0189527 A1 | 6/2016 | Peterson et al. |
| 2016/0189549 A1 | 6/2016 | Marcus |
| 2016/0191621 A1 | 6/2016 | Oh et al. |
| 2016/0192461 A1 | 6/2016 | Minsky |
| 2016/0196734 A1 | 7/2016 | Hicks, III |
| 2016/0202695 A1 | 7/2016 | Deroos et al. |
| 2016/0209072 A1 | 7/2016 | Golden et al. |
| 2016/0225240 A1 | 8/2016 | Voddhi et al. |
| 2016/0226732 A1 | 8/2016 | Kim et al. |
| 2016/0231916 A1 | 8/2016 | Dawes |
| 2016/0234075 A1 | 8/2016 | Sirpal et al. |
| 2016/0241633 A1 | 8/2016 | Overby et al. |
| 2016/0260135 A1 | 9/2016 | Zomet et al. |
| 2016/0261932 A1 | 9/2016 | Fadell et al. |
| 2016/0266579 A1 | 9/2016 | Chen et al. |
| 2016/0308628 A1 | 10/2016 | Herickhoff et al. |
| 2016/0323731 A1 | 11/2016 | Mohammed et al. |
| 2016/0363337 A1 | 12/2016 | Steinberg et al. |
| 2016/0364089 A1 | 12/2016 | Blackman et al. |
| 2016/0371961 A1 | 12/2016 | Narang et al. |
| 2016/0371967 A1 | 12/2016 | Narang et al. |
| 2016/0373453 A1 | 12/2016 | Ruffner et al. |
| 2016/0378109 A1 | 12/2016 | Raffa et al. |
| 2017/0004714 A1 | 1/2017 | Rhee |
| 2017/0005818 A1 | 1/2017 | Gould |
| 2017/0006107 A1 | 1/2017 | Dawes et al. |
| 2017/0026440 A1 | 1/2017 | Cockrell et al. |
| 2017/0039413 A1 | 2/2017 | Nadler |
| 2017/0052513 A1 | 2/2017 | Raji |
| 2017/0054570 A1 | 2/2017 | Hagins et al. |
| 2017/0054594 A1 | 2/2017 | Decenzo et al. |
| 2017/0068419 A1 | 3/2017 | Sundermeyer et al. |
| 2017/0070361 A1 | 3/2017 | Sundermeyer et al. |
| 2017/0070563 A1 | 3/2017 | Sundermeyer et al. |
| 2017/0085436 A1 | 3/2017 | Costa et al. |
| 2017/0085437 A1 | 3/2017 | Condeixa et al. |
| 2017/0085632 A1 | 3/2017 | Cardote |
| 2017/0086230 A1 | 3/2017 | Azevedo et al. |
| 2017/0086241 A1 | 3/2017 | Lopes et al. |
| 2017/0092138 A1 | 3/2017 | Trundle et al. |
| 2017/0109999 A1 | 4/2017 | Cohn et al. |
| 2017/0111227 A1 | 4/2017 | Papageorgiou et al. |
| 2017/0118037 A1 | 4/2017 | Kitchen et al. |
| 2017/0124987 A1 | 5/2017 | Kim et al. |
| 2017/0126535 A1 | 5/2017 | Ameixieira |
| 2017/0127124 A9 | 5/2017 | Wilson et al. |
| 2017/0154507 A1 | 6/2017 | Dawes et al. |
| 2017/0155545 A1 | 6/2017 | Baum et al. |
| 2017/0180198 A1 | 6/2017 | Baum et al. |
| 2017/0180306 A1 | 6/2017 | Gutt |
| 2017/0185277 A1 | 6/2017 | Sundermeyer et al. |
| 2017/0185278 A1 | 6/2017 | Sundermeyer et al. |
| 2017/0185281 A1 | 6/2017 | Park et al. |
| 2017/0187993 A1 | 6/2017 | Martch et al. |
| 2017/0192402 A1 | 7/2017 | Karp et al. |
| 2017/0225336 A1 | 8/2017 | Deyle et al. |
| 2017/0227965 A1 | 8/2017 | Decenzo et al. |
| 2017/0255452 A1 | 9/2017 | Barnes et al. |
| 2017/0257257 A1 | 9/2017 | Dawes |
| 2017/0278407 A1 | 9/2017 | Lemmey et al. |

(56) References Cited

U.S. PATENT DOCUMENTS

| | | |
|---|---|---|
| 2017/0279629 A1 | 9/2017 | Raji |
| 2017/0289323 A1 | 10/2017 | Gelvin et al. |
| 2017/0289360 A1 | 10/2017 | Baum et al. |
| 2017/0289650 A1 | 10/2017 | Schattmaier et al. |
| 2017/0303257 A1 | 10/2017 | Yamada et al. |
| 2017/0310500 A1 | 10/2017 | Dawes |
| 2017/0318520 A1 | 11/2017 | Costa et al. |
| 2017/0324817 A1 | 11/2017 | Oliveira et al. |
| 2017/0330466 A1 | 11/2017 | Demetriades et al. |
| 2017/0331781 A1 | 11/2017 | Gutt |
| 2017/0332055 A1 | 11/2017 | Henderson |
| 2017/0337806 A1 | 11/2017 | Cohn et al. |
| 2017/0367127 A1 | 12/2017 | Lopes et al. |
| 2018/0004377 A1 | 1/2018 | Kitchen et al. |
| 2018/0012460 A1 | 1/2018 | Heitz et al. |
| 2018/0019890 A1 | 1/2018 | Dawes |
| 2018/0027517 A9 | 1/2018 | Noonan |
| 2018/0045159 A1 | 2/2018 | Patel |
| 2018/0063248 A1 | 3/2018 | Dawes et al. |
| 2018/0063259 A1 | 3/2018 | Connelly et al. |
| 2018/0069862 A1 | 3/2018 | Cholas et al. |
| 2018/0069932 A1 | 3/2018 | Tiwari et al. |
| 2018/0082575 A1 | 3/2018 | El-Mankabady |
| 2018/0083831 A1 | 3/2018 | Baum et al. |
| 2018/0092046 A1 | 3/2018 | Egan et al. |
| 2018/0095155 A1 | 4/2018 | Soni et al. |
| 2018/0096568 A1 | 4/2018 | Cohn et al. |
| 2018/0107196 A1 | 4/2018 | Bian et al. |
| 2018/0122237 A1 | 5/2018 | Nascimento et al. |
| 2018/0146171 A1 | 5/2018 | Tofighbakhsh |
| 2018/0152342 A1 | 5/2018 | Karaoguz et al. |
| 2018/0183668 A1 | 6/2018 | Caldwell et al. |
| 2018/0184338 A1 | 6/2018 | Cabral et al. |
| 2018/0191720 A1 | 7/2018 | Dawes |
| 2018/0191741 A1 | 7/2018 | Dawes et al. |
| 2018/0191807 A1 | 7/2018 | Dawes |
| 2018/0192269 A1 | 7/2018 | Cabral |
| 2018/0198688 A1 | 7/2018 | Dawes |
| 2018/0198755 A1 | 7/2018 | Domangue et al. |
| 2018/0198756 A1 | 7/2018 | Dawes |
| 2018/0198788 A1 | 7/2018 | Helen et al. |
| 2018/0198802 A1 | 7/2018 | Dawes |
| 2018/0278701 A1 | 9/2018 | Diem |
| 2018/0302274 A1 | 10/2018 | Cabral et al. |
| 2018/0307223 A1 | 10/2018 | Peeters et al. |
| 2018/0316764 A1 | 11/2018 | Ferreira et al. |
| 2018/0322759 A1 | 11/2018 | Devdas et al. |
| 2018/0332455 A1 | 11/2018 | Neves et al. |
| 2019/0014413 A1 | 1/2019 | Kallai et al. |
| 2019/0026850 A1 | 1/2019 | Orduna et al. |
| 2019/0041547 A1 | 2/2019 | Rolf et al. |
| 2019/0058720 A1 | 2/2019 | Lindquist et al. |
| 2019/0073193 A1 | 3/2019 | Krispin |
| 2019/0073534 A1 | 3/2019 | Dvir et al. |
| 2019/0098089 A1 | 3/2019 | Shim et al. |
| 2019/0103030 A1 | 4/2019 | Banga et al. |
| 2019/0141472 A1 | 5/2019 | Azevedo et al. |
| 2019/0158304 A1 | 5/2019 | Sundermeyer et al. |
| 2019/0176985 A1 | 6/2019 | Mucci |
| 2019/0197256 A1 | 6/2019 | Lehnhardt et al. |
| 2019/0204836 A1 | 7/2019 | Rezvani |
| 2019/0239008 A1 | 8/2019 | Lambourne |
| 2019/0245798 A1 | 8/2019 | Short et al. |
| 2019/0265694 A1 | 8/2019 | Chen et al. |
| 2019/0288929 A1 | 9/2019 | Mota et al. |
| 2019/0347924 A1 | 11/2019 | Trundle et al. |
| 2019/0349244 A1 | 11/2019 | Ameixiera |
| 2019/0385435 A1 | 12/2019 | Farrand et al. |
| 2019/0391545 A1 | 12/2019 | Trundle et al. |
| 2020/0014675 A1 | 1/2020 | Helms et al. |
| 2020/0026285 A1 | 1/2020 | Perrone |
| 2020/0029339 A1 | 1/2020 | Suzuki |
| 2020/0032887 A1 | 1/2020 | McBurney et al. |
| 2020/0036635 A1 | 1/2020 | Ohuchi |
| 2020/0076858 A1 | 3/2020 | Apsangi et al. |
| 2020/0089378 A1 | 3/2020 | Kitchen et al. |
| 2020/0094963 A1 | 3/2020 | Myslinski |
| 2020/0127891 A9 | 4/2020 | Johnson et al. |
| 2020/0137125 A1 | 4/2020 | Patnala et al. |
| 2020/0162890 A1 | 5/2020 | Spencer et al. |
| 2020/0186612 A1 | 6/2020 | Saint Clair |
| 2020/0191193 A1 | 6/2020 | Schulnig et al. |
| 2020/0196213 A1 | 6/2020 | Cheng et al. |
| 2020/0257721 A1 | 8/2020 | McKinnon et al. |
| 2020/0273277 A1 | 8/2020 | Kerning et al. |
| 2020/0279626 A1 | 9/2020 | Ansari et al. |
| 2020/0322577 A1 | 10/2020 | Raffa et al. |
| 2020/0328880 A1 | 10/2020 | Bolotin et al. |
| 2020/0328887 A1 | 10/2020 | Kostiainen et al. |
| 2020/0329136 A1 | 10/2020 | Gerhardt et al. |
| 2020/0333780 A1 | 10/2020 | Kerzner |
| 2020/0344309 A1 | 10/2020 | Gutt et al. |
| 2020/0349786 A1 | 11/2020 | Ho et al. |
| 2020/0366515 A1 | 11/2020 | Dawes et al. |
| 2020/0380851 A1 | 12/2020 | Farrand et al. |
| 2020/0394896 A1 | 12/2020 | Cohn et al. |
| 2020/0394901 A1 | 12/2020 | Tannenbaum et al. |
| 2020/0413320 A1 | 12/2020 | Cohn et al. |
| 2021/0014312 A1 | 1/2021 | Dawes et al. |
| 2021/0021710 A1 | 1/2021 | Stepanian |
| 2021/0029547 A1 | 1/2021 | Beachem et al. |
| 2021/0049895 A1 | 2/2021 | Sundermeyer et al. |
| 2021/0053136 A1 | 2/2021 | Rappl et al. |
| 2021/0068034 A1 | 3/2021 | Juhasz et al. |
| 2021/0081553 A1 | 3/2021 | Lemmey et al. |
| 2021/0084480 A1 | 3/2021 | Maier et al. |
| 2021/0099753 A1 | 4/2021 | Connelly et al. |
| 2021/0149348 A1 | 5/2021 | Raji et al. |
| 2021/0149466 A1 | 5/2021 | Raji et al. |
| 2021/0152517 A1 | 5/2021 | Dawes et al. |
| 2021/0153001 A1 | 5/2021 | Eisner |
| 2021/0180815 A1 | 6/2021 | Shamoon et al. |
| 2021/0191485 A1 | 6/2021 | Raji et al. |
| 2021/0200430 A1 | 7/2021 | Sundermeyer et al. |
| 2021/0233384 A1 | 7/2021 | Baum et al. |
| 2021/0250726 A1 | 8/2021 | Jones |
| 2021/0326451 A1 | 10/2021 | Mariano |
| 2021/0335123 A1 | 10/2021 | Trundle et al. |
| 2021/0377230 A1 | 12/2021 | Baum et al. |
| 2021/0383675 A1 | 12/2021 | Cohn et al. |
| 2021/0407279 A1 | 12/2021 | Baum et al. |
| 2022/0006779 A1 | 1/2022 | Baum et al. |
| 2022/0021552 A1 | 1/2022 | Ansari et al. |
| 2022/0027051 A1 | 1/2022 | Kant et al. |
| 2022/0027464 A1 | 1/2022 | Regner et al. |
| 2022/0029994 A1 | 1/2022 | Choyi et al. |
| 2022/0038440 A1 | 2/2022 | Boynton et al. |
| 2022/0057917 A1 | 2/2022 | Fulker et al. |
| 2022/0057925 A1 | 2/2022 | Dawes |
| 2022/0060969 A1 | 2/2022 | Cohn et al. |
| 2022/0070135 A1 | 3/2022 | Gerald et al. |
| 2022/0070262 A1 | 3/2022 | Kitchen et al. |
| 2022/0073052 A1 | 3/2022 | Zhou et al. |
| 2022/0108593 A1 | 4/2022 | Jackson |
| 2022/0159334 A1 | 5/2022 | Wang et al. |
| 2022/0247624 A1 | 8/2022 | Johnson et al. |
| 2022/0383728 A1 | 12/2022 | Brown |
| 2022/0415104 A1 | 12/2022 | McLachlan et al. |
| 2023/0057193 A1 | 2/2023 | Ansari et al. |
| 2024/0078892 A1 | 3/2024 | Poder et al. |
| 2025/0112820 A1 | 4/2025 | Johnson et al. |

FOREIGN PATENT DOCUMENTS

| | | |
|---|---|---|
| AU | 2011250886 A1 | 1/2013 |
| AU | 2013284428 A1 | 2/2015 |
| AU | 2011305163 B2 | 12/2016 |
| AU | 2017201365 A1 | 3/2017 |
| AU | 2017201585 A1 | 3/2017 |
| BE | 1008939 A6 | 10/1996 |
| CA | 2203813 A1 | 6/1996 |
| CA | 2174482 A1 | 10/1997 |
| CA | 2346638 A1 | 4/2000 |
| CA | 2389958 A1 | 3/2003 |

(56)                References Cited

FOREIGN PATENT DOCUMENTS

| | | | | | |
|---|---|---|---|---|---|
| CA | 2504497 | * | 10/2003 | ........... | H04W 48/18 |
| CA | 2878117 | A1 | 1/2014 | | |
| CA | 2559842 | C | 5/2014 | | |
| CA | 2992429 | A1 | 12/2016 | | |
| CA | 2976682 | A1 | 2/2018 | | |
| CA | 2976802 | A1 | 2/2018 | | |
| CN | 102834818 | A | 12/2012 | | |
| CN | 102985915 | A | 3/2013 | | |
| DE | 102004027893 | A1 | 1/2006 | | |
| EP | 0295146 | A2 | 12/1988 | | |
| EP | 0308046 | A2 | 3/1989 | | |
| EP | 0591585 | A1 | 4/1994 | | |
| EP | 1117214 | A2 | 7/2001 | | |
| EP | 1119837 | A1 | 8/2001 | | |
| EP | 0978111 | B1 | 11/2001 | | |
| EP | 1881716 | A1 | 1/2008 | | |
| EP | 2112784 | A1 | 10/2009 | | |
| EP | 2569712 | A1 | 3/2013 | | |
| EP | 2188794 | A4 | 4/2013 | | |
| EP | 2868039 | A2 | 5/2015 | | |
| EP | 3031206 | A2 | 6/2016 | | |
| EP | 1738540 | B1 | 10/2017 | | |
| EP | 3285238 | A2 | 2/2018 | | |
| EP | 3308222 | A1 | 4/2018 | | |
| FR | 2584217 | A1 | 1/1987 | | |
| FR | 2661023 | A1 | 10/1991 | | |
| FR | 2793334 | A1 | 11/2000 | | |
| GB | 2222288 | A | 2/1990 | | |
| GB | 2273593 | A | 6/1994 | | |
| GB | 2286423 | A | 8/1995 | | |
| GB | 2291554 | A | 1/1996 | | |
| GB | 2319373 | A | 5/1998 | | |
| GB | 2320644 | A | 6/1998 | | |
| GB | 2324630 | A | 10/1998 | | |
| GB | 2325548 | A | 11/1998 | | |
| GB | 2335523 | A | 9/1999 | | |
| GB | 2349293 | A | 10/2000 | | |
| GB | 2370400 | A | 6/2002 | | |
| GB | 2375449 | A | 11/2002 | | |
| GB | 2442628 | A | 4/2008 | | |
| GB | 2442633 | A | 4/2008 | | |
| GB | 2442640 | A | 4/2008 | | |
| GB | 2428821 | B | 6/2008 | | |
| IN | 45/2015 | | 11/2015 | | |
| IN | 04/2016 | | 1/2016 | | |
| JP | 63-033088 | A | 2/1988 | | |
| JP | 05-167712 | A | 7/1993 | | |
| JP | 06-339183 | A | 12/1993 | | |
| JP | 08-227491 | A | 9/1996 | | |
| JP | 10-004451 | A | 1/1998 | | |
| JP | 10-108156 | A | 4/1998 | | |
| JP | 11-234277 | A | 8/1999 | | |
| JP | 2000-006343 | A | 1/2000 | | |
| JP | 2000-023146 | A | 1/2000 | | |
| JP | 2000-278671 | A | 10/2000 | | |
| JP | 2001-006088 | A | 1/2001 | | |
| JP | 2001-006343 | A | 1/2001 | | |
| JP | 2001-069209 | A | 3/2001 | | |
| JP | 2002-055895 | A | 2/2002 | | |
| JP | 2002-185629 | A | 6/2002 | | |
| JP | 2003-085258 | A | 3/2003 | | |
| JP | 2003-141659 | A | 5/2003 | | |
| JP | 2003-281647 | A | 10/2003 | | |
| JP | 2004-192659 | A | 7/2004 | | |
| JP | 4268148 | * | 3/2005 | ........... | Y02D 30/70 |
| JP | 2006-094394 | A | 4/2006 | | |
| JP | 2009-213107 | A | 9/2009 | | |
| JP | 2010-140091 | A | 6/2010 | | |
| KR | 10-2005-0051577 | A | 6/2005 | | |
| KR | 10-2005-0052826 | A | 6/2005 | | |
| KR | 10-2006-0021605 | A | 3/2006 | | |
| KR | 10-0771941 | B1 | 10/2007 | | |
| TW | 340934 | B | 9/1998 | | |
| TW | I239176 | B | 9/2005 | | |
| TW | 201101243 | A | 1/2011 | | |
| TW | 201102976 | A | 1/2011 | | |
| TW | 201102978 | A | 1/2011 | | |
| TW | I340934 | B | 4/2011 | | |
| TW | 201117141 | A | 5/2011 | | |
| TW | I480839 | B | 4/2015 | | |
| TW | I480840 | B | 4/2015 | | |
| TW | I509579 | B | 11/2015 | | |
| TW | I517106 | B | 1/2016 | | |
| WO | 89/07855 | A1 | 8/1989 | | |
| WO | 89/11187 | A1 | 11/1989 | | |
| WO | 94/03881 | A1 | 2/1994 | | |
| WO | 95/13944 | A1 | 5/1995 | | |
| WO | 96/36301 | A1 | 11/1996 | | |
| WO | 97/13230 | A2 | 4/1997 | | |
| WO | 98/25243 | A1 | 6/1998 | | |
| WO | 98/49663 | A1 | 11/1998 | | |
| WO | 98/52343 | A1 | 11/1998 | | |
| WO | 98/59256 | A2 | 12/1998 | | |
| WO | 99/34339 | A2 | 7/1999 | | |
| WO | 00/21053 | A1 | 4/2000 | | |
| WO | 00/36812 | A1 | 6/2000 | | |
| WO | 00/72598 | A1 | 11/2000 | | |
| WO | 01/11586 | A1 | 2/2001 | | |
| WO | 01/50684 | A1 | 7/2001 | | |
| WO | 01/52478 | A2 | 7/2001 | | |
| WO | 01/71489 | A1 | 9/2001 | | |
| WO | 01/86622 | A1 | 11/2001 | | |
| WO | 01/99078 | A2 | 12/2001 | | |
| WO | 02/11444 | A1 | 2/2002 | | |
| WO | 02/21300 | A1 | 3/2002 | | |
| WO | 02/97584 | A2 | 12/2002 | | |
| WO | 2002/100083 | A1 | 12/2002 | | |
| WO | 2003/026305 | A1 | 3/2003 | | |
| WO | 03/40839 | A1 | 5/2003 | | |
| WO | 03/49379 | A1 | 6/2003 | | |
| WO | 2004/004222 | A1 | 1/2004 | | |
| WO | 2004/077307 | A1 | 9/2004 | | |
| WO | 2004/098127 | A1 | 11/2004 | | |
| WO | 2004/107710 | A1 | 12/2004 | | |
| WO | 2005/047990 | A2 | 5/2005 | | |
| WO | WO 2005048630 | * | 5/2005 | ........... | H04W 48/18 |
| WO | 2005/091218 | A2 | 9/2005 | | |
| WO | 2006/122487 | A1 | 11/2006 | | |
| WO | 2007/038872 | A1 | 4/2007 | | |
| WO | 2007/124453 | A2 | 11/2007 | | |
| WO | 2008/056320 | A1 | 5/2008 | | |
| WO | 2009/006670 | A1 | 1/2009 | | |
| WO | 2009/023647 | A1 | 2/2009 | | |
| WO | 2009/029590 | A1 | 3/2009 | | |
| WO | 2009/029597 | A1 | 3/2009 | | |
| WO | 2009/064795 | A1 | 5/2009 | | |
| WO | 2009/145747 | A1 | 12/2009 | | |
| WO | 2010/019624 | A1 | 2/2010 | | |
| WO | 2010/025468 | A1 | 3/2010 | | |
| WO | 2010/127009 | A1 | 11/2010 | | |
| WO | 2010/127194 | A2 | 11/2010 | | |
| WO | 2010/127200 | A1 | 11/2010 | | |
| WO | 2010/127203 | A1 | 11/2010 | | |
| WO | 2011/038409 | A1 | 3/2011 | | |
| WO | 2011/063354 | A1 | 5/2011 | | |
| WO | 2011/143273 | A1 | 11/2011 | | |
| WO | 2012/040653 | A1 | 3/2012 | | |
| WO | 2014/004911 | | 1/2014 | | |
| WO | 2015/021469 | A2 | 2/2015 | | |
| WO | 2015/134520 | A1 | 9/2015 | | |
| WO | 2015/176775 | A1 | 11/2015 | | |
| WO | 2016/201033 | A1 | 12/2016 | | |
| ZA | 201302668 | | 6/2014 | | |

OTHER PUBLICATIONS

US Patent Application filed Mar. 10, 2014, entitled "Communication Protocols in Integrated Systems", U.S. Appl. No. 14/202,627.
US Patent Application filed Mar. 10, 2014, entitled "Communication Protocols in Integrated Systems", U.S. Appl. No. 14/202,685.
US Patent Application filed Mar. 10, 2014, entitled "Communication Protocols in Integrated Systems", U.S. Appl. No. 14/203,077.

(56)          References Cited

OTHER PUBLICATIONS

US Patent Application filed Mar. 10, 2014, entitled "Communication Protocols in Integrated Systems", U.S. Appl. No. 14/203,084.
US Patent Application filed Mar. 10, 2014, entitled "Communication Protocols in Integrated Systems", U.S. Appl. No. 14/203,128.
US Patent Application filed Mar. 10, 2014, entitled "Communication Protocols in Integrated Systems", U.S. Appl. No. 14/203,141.
US Patent Application filed Mar. 10, 2014, entitled "Communication Protocols in Integrated Systems", U.S. Appl. No. 14/203,219.
US Patent Application filed Mar. 10, 2014, entitled "Communication Protocols Over Internet Protocol (IP) Networks", U.S. Appl. No. 14/202,505.
US Patent Application filed Mar. 10, 2014, entitled "Communication Protocols Over Internet Protocol (IP) Networks", U.S. Appl. No. 14/202,579.
US Patent Application filed Mar. 10, 2022, entitled "Virtual Device Systems and Methods", U.S. Appl. No. 17/691,774.
US Patent Application filed Mar. 11, 2020, entitled "Management of a Security System At a Premises", U.S. Appl. No. 16/816,134.
US Patent Application filed Mar. 15, 2021, entitled "Automation System User Interface", U.S. Appl. No. 17/202,279.
US Patent Application filed Mar. 17, 2021, entitled "Communication Protocols Over Internet Protocol (IP) Networks", U.S. Appl. No. 17/204,068.
US Patent Application filed Mar. 18, 2019, entitled "Server-Based Notification of Alarm Event Subsequent To Communication Failure With Armed Security System", U.S. Appl. No. 16/356,742.
US Patent Application filed Mar. 20, 2020, entitled "Security, Monitoring and Automation Controller Access and Use of Legacy Security Control Panel Information", U.S. Appl. No. 16/825,099.
US Patent Application filed Mar. 22, 2021, entitled "Premises Management Configuration and Control", U.S. Appl. No. 17/208,866.
US Patent Application filed Apr. 4, 2022, entitled "Control System User Interface", U.S. Appl. No. 17/712,911.
US Patent Application filed Apr. 6, 2022, entitled "Hardware Configurable Security, Monitoring and Automation Controller Having Modular Communication Protocol Interfaces", U.S. Appl. No. 17/714,499.
US Patent Application filed Apr. 8, 2021, entitled "System For Data Routing In Networks", U.S. Appl. No. 17/301,605.
US Patent Application filed Apr. 12, 2023, entitled "Integrated Security System With Parallel Processing Architecture", U.S. Appl. No. 18/299,394.
US Patent Application filed Apr. 14, 2022, entitled "Premises Management Configuration and Control", U.S. Appl. No. 17/659,259.
US Patent Application filed Apr. 14, 2022, entitled "Premises System Automation", U.S. Appl. No. 17/721,192.
US Patent Application filed Apr. 17, 2020, entitled "Method and System for Providing Alternate Network Access", U.S. Appl. No. 16/852,072.
US Patent Application filed Apr. 17, 2020, entitled "Networked Touchscreen With Integrated Interfaces", U.S. Appl. No. 16/852,058.
US Patent Application filed Apr. 17, 2023, entitled "Integrated Cloud System for Premises Automation", U.S. Appl. No. 18/301,626.
US Patent Application filed Apr. 17, 2023, entitled "Server-Based Notification of Alarm Event Subsequent to Communication Failure With Armed Security System", U.S. Appl. No. 18/301,923.
US Patent Application filed Apr. 18, 2022, entitled "Method and System for Processing Security Event Data", U.S. Appl. No. 17/723,101.
US Patent Application filed Apr. 18, 2023, entitled "Method and System for Providing Alternate Network Access", U.S. Appl. No. 18/302,661, U.S. Appl. No. 18/302,661.
US Patent Application filed Apr. 22, 2022, entitled "Communication Protocols in Integrated Systems", U.S. Appl. No. 17/727,470.
US Patent Application filed Apr. 23, 2019, entitled "Control System User Interface", U.S. Appl. No. 16/391,625.
US Patent Application filed Apr. 26, 2019, entitled "Custom Content for Premises Management", U.S. Appl. No. 16/396,368.

US Patent Application filed Apr. 27, 2023, entitled "Integrated Cloud System With Lightweight Gateway for Premises Automation", U.S. Appl. No. 18/307,985.
US Patent Application filed May 1, 2023, entitled "Premises System Management Using Status Signal", U.S. Appl. No. 18/310,294.
US patent application filed May 2, 2018, entitled "Automation System With Mobile Interface", U.S. Appl. No. 15/969,514.
US Patent Application filed May 4, 2022, entitled "Premises Management Configuration and Control", U.S. Appl. No. 17/736,408.
US Patent Application filed May 8, 2023, entitled "Communication Protocols in Integrated Systems", U.S. Appl. No. 18/314,002.
US Patent Application filed May 8, 2023, entitled "Integrated Cloud System With Lightweight Gateway for Premises Automation", U.S. Appl. No. 18/313,728.
US Patent Application filed May 8, 2023, entitled "Security Network Integrating Security System and Network Devices", U.S. Appl. No. 18/313,817.
US Patent Application filed May 10, 2021, entitled "Management of a Security System At a Premises", U.S. Appl. No. 17/316,402.
US Patent Application filed May 11, 2020, entitled "Control System User Interface", U.S. Appl. No. 16/871,151.
US Patent Application filed May 12, 2020, entitled "IP Device Discovery Systems and Methods", U.S. Appl. No. 15/930,029.
US Patent Application filed May 12, 2023, entitled "Virtual Device Systems and Methods", U.S. Appl. No. 18/316,580.
US Patent Application filed May 16, 2022, entitled "Automation System With Mobile Interface", U.S. Appl. No. 17/744,858.
US Patent Application filed May 19, 2020, entitled "User Interface in a Premises Network", U.S. Appl. No. 16/878,099.
US Patent Application filed May 23, 2018, entitled "Networked Touchscreen With Integrated Interfaces", U.S. Appl. No. 15/987,638.
US Patent Application filed May 23, 2022, entitled "Premise Management Systems and Methods", U.S. Appl. No. 17/664,524.
US Patent Application filed May 26, 2020, entitled "Premises Management Configuration and Control", U.S. Appl. No. 16/882,876.
US Patent Application filed Jun. 1, 2012, entitled "Gateway Registry Methods and Systems", U.S. Appl. No. 13/486,276.
US Patent Application filed Jun. 1, 2022, entitled "Integrated Cloud System for Premises Automation", U.S. Appl. No. 17/804,941.
PCT Application filed on Jun. 30, 2016, entitled "Integrated Cloud System with Lightweight Gateway for Premises Automation", PCT/US2016/040451.
PCT Application filed on Jul. 7, 2016, entitled "Automation System User Interface with Three-Dimensional Display", PCT/US2016/041353.
PCT Application filed on Aug. 16, 2016, entitled "Automation System User Interface", PCT/US2016/047172.
PCT Application filed on Aug. 17, 2016, entitled "Automation System User Interface", PCT/US2016/047262.
PCT Application filed on Oct. 13, 2016, entitled "Coordinated Control of Connected Devices in a Premise", PCT/US2016/056842.
PCT Application filed on Nov. 17, 2016, entitled "Mobile Premises Automation Platform", PCT/US2016/062519.
Prashyanusorn et al., "Sustainable tourism using security cameras with privacy protecting ability", Journal of Information Security, 2010, vol. 1, pp. 68-73.
Requirement for Restriction/Election mailed Jan. 22, 2013 for U.S. Appl. No. 13/104,932, filed May 10, 2011.
Requirement for Restriction/Election mailed Jan. 22, 2013 for U.S. Appl. No. 13/104,936, filed May 10, 2011.
Requirement for Restriction/Election mailed Oct. 24, 2012 for U.S. Appl. No. 12/750,470, filed Mar. 30, 2010.
Security For The Future, Introducing 5804B0—Advanced two-way wireless remote technology, Advertisement, ADEMCO Group, Syosset, NY, circa 1997.
Shang, Wei-Lai, "Study on Application Embedded Intelligent Area System", Journal of Anyang Institute of Technology, Dec. 2010, vol. 9, No. 6, pp. 56-57 and 65.
South African Patent App. No. 2013/02668, corresponds to WO2012/040653.
Supplemental European Search Report for Application No. EP05725743.8 mailed on Sep. 14, 2010, 2 pages.

(56)　　　　　References Cited

OTHER PUBLICATIONS

Supplementary European Search Report for Application No. EP10819658, mailed on Mar. 10, 2015, 2 pages.
Supplementary European Search Report for Application No. EP11827671, mailed on Mar. 10, 2015, 2 pages.
Supplementary Partial European Search Report for Application No. EP09807196, mailed on Nov. 17, 2014, 5 pages.
Supplementary European Search Report for Application No. EP2191351, mailed on Jun. 23, 2014, 2 pages.
Supplementary Non-Final Office Action mailed Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United States Patent and Trademark Office—Before the Patent Trial and Appeal Board, Alarm.com (U.S. Pat. No. 8,350,694B1) (inventors Stephen Scott Trundle & Alison Jane Slavin) V iControl Networks, Inc. (U.S. Appl. No. 13/311,365) (Inventors. Poul j. Dawes, Jim Fulker, Carolyn Wales, Reza Raji, And Gerald Gutt), Patent Interference 106,001 (HHB) (Technology Center 24000), Mar. 31, 2015.
US Patent Application filed Jan. 3, 2019, entitled "Methods and Systems for Data Communication", U.S. Appl. No. 16/239,114.
US Patent Application filed Jan. 5, 2023, entitled "Systems and Methods for Device Communication", U.S. Appl. No. 18/150,316.
US Patent Application filed Jan. 11, 2021, entitled "Premise Management Systems and Methods", U.S. Appl. No. 17/145,773.
US Patent Application filed Jan. 13, 2023, entitled "Communication Protocols in Integrated Systems", U.S. Appl. No. 18/154,590.
US Patent Application filed Jan. 14, 2022, entitled "Mobile Premises Automation Platform", U.S. Appl. No. 17/576,336.
US Patent Application filed Jan. 19, 2023, entitled "Premises Management Configuration and Control", U.S. Appl. No. 18/157,030.
US Patent Application filed Jan. 22, 2019, entitled "Data Model for Home Automation", U.S. Appl. No. 16/254,535.
US Patent Application filed Jan. 22, 2019, entitled "Premises System Automation", U.S. Appl. No. 16/254,480.
US Patent Application filed Jan. 23, 2020, entitled "Forming a Security Network Including Integrated Security System Components and Network Dev", U.S. Appl. No. 16/750,976.
US Patent Application filed Jan. 24, 2023, entitled "Server-Based Notification of Alarm Event Subsequent to Communication Failure With Armed Security System", U.S. Appl. No. 18/158,876.
US Patent Application filed Jan. 25, 2019, entitled Communication Protocols in Integrated Systems, U.S. Appl. No. 16/257,706.
US Patent Application filed Jan. 26, 2023, entitled "System for Data Routing in Networks", U.S. Appl. No. 18/159,869.
US Patent Application filed Jan. 28, 2019, entitled "Automation System User Interface With Three-Dimensional Display", U.S. Appl. No. 16/258,858.
US Patent Application filed Feb. 2, 2018, entitled "Three-Way Switch", U.S. Appl. No. 15/887,535.
US Patent Application filed Feb. 6, 2020, entitled "Activation Of Gateway Device", U.S. Appl. No. 16/784,159.
US Patent Application filed Feb. 8, 2022, entitled "Server-Based Notification of Alarm Event Subsequent to Communication Failure With Armed Security System", U.S. Appl. No. 17/650,324.
US Patent Application filed Feb. 8, 2023, entitled "Management of a Security System At a Premises", U.S. Appl. No. 18/166,052.
US Patent Application filed Feb. 8, 2023, entitled "Premises Management Configuration and Control", U.S. Appl. No. 18/166,046.
US Patent Application filed Feb. 9, 2021, entitled "Premises Management Networking", U.S. Appl. No. 17/171,398.
US Patent Application filed Feb. 13, 2023, entitled "Premise Management Systems and Methods", U.S. Appl. No. 18/168,314.
US Patent Application filed Mar. 2, 2017, entitled "Generating Risk Profile Using Data of Home Monitoring and Security System", U.S. Appl. No. 15/447,982.

US Patent Application filed Mar. 2, 2020, entitled "Communication Protocols in Integrated Systems", U.S. Appl. No. 16/807,100.
US Patent Application filed Mar. 2, 2020, entitled "Coordinated Control of Connected Devices in a Premise", U.S. Appl. No. 16/807,028.
US Patent Application filed Mar. 7, 2014, entitled "Activation of Gateway Device", U.S. Appl. No. 14/201,162.
US Patent Application filed Mar. 7, 2014, entitled "Communication Protocols in Integrated Systems", U.S. Appl. No. 14/200,921.
US Patent Application filed Mar. 7, 2014, entitled "Device Integration Framework", U.S. Appl. No. 14/201,227.
US Patent Application filed Mar. 7, 2014, entitled "Integrated Security and Control System With Geofencing", U.S. Appl. No. 14/201,189.
US Patent Application filed Mar. 7, 2014, entitled "Security System Integrated With Social Media Platform", U.S. Appl. No. 14/201,133.
US Patent Application filed Mar. 10, 2014, entitled "Communication Protocols in Integrated Systems", U.S. Appl. No. 14/202,573.
GTI Genex Technologies, Inc. OmniEye.(Trademark). Product Brochure, Sep. 14, 1999 (5 pages).
Yanni Zhai et al., Design of Smart Home Remote Monitoring System Based on Embedded System, 2011 IEEE 2nd International Conference on Computing, Control and Industrial Engineering, vol. 2, pp. 41-44.
"dragging" The Authoritative Dictionary of IEEE Standard Terms. 7th ed. 2000, p. 337.
"File", The Authoritative Dictionary of IEEE Standard Terms. 7th ed. 2000, pp. 432.
"icon", Newton's Telecom Dictionary, 21st ed., Mar. 2005.
"Application" The Authoritative Dictionary of IEEE Standard Terms. 7th ed. 2000.
"Modular programming", The Authoritative Dictionary of IEEE Standard Terms. 7th ed. 2000.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
6270 Touch Screen Keypad Notes, Floneywell, Sep. 2006.
Alarm.com—Interactive Security Systems, Elders [retrieved on Nov. 4, 2003], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Associate. Merriaim-Webster.com Dictionary, Merriam-Webster, https://web.archive.org/web/20061209213742/https://www.meniam-webster.com/dictionary/associate. Dec. 9, 2006.
AU application filed on Feb. 28, 2017, entitled "Control System User Interface", 2017201365.
AU application filed on Mar. 8, 2017, entitled "Integrated Security Network with Security Alarm Signaling System", 2017201585.
CA application filed on Aug. 15, 2017, entitled "Automation System User Interface", 2976682.
CA application filed on Aug. 16, 2017, entitled "Automation System User Interface", 2976802.
Chapter 6, Securing TCP/IP, pp. 135-164, Oct. 12, 2004.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.
CorAccess Systems, Companion 6 User Guide, Jun. 17, 2002.
Court action filed for U.S. Pat. No. 7,262,690; U.S. Pat. No. 7,911,341; U.S. Pat. No. 8,073,931; U.S. Pat. No. 8,335,842; U.S. Pat. No. 8,473,619; U.S. Pat. No. 8,478,844 in U.S. District Court, Estern District of Virginia, Case No. 1:13-CV-00834, between *iControl Networks, Inc.* (Plaintiff) vs *Alarm.com Incorporated et al.* (Defendant) on Jul. 10, 2013.

(56)                    References Cited

OTHER PUBLICATIONS

Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.

Elwahab et al.; Device, System and . . . Customer Premises Gateways, Sep. 27, 2001; WO 01/71489.

EP application filed on Jun. 9, 2016, entitled, "Data Model for Flome Automation", 16808247.7.

EP application filed on Aug. 16, 2017, entitled, "Automation System User Interface", 17186497.8.

EP examination report issued in EP08797646.0, dated May 17, 2017, 11 pages.

Examination Report under Section 18(3) re for UK Patent Application No. GB0620362.4, mailed on Aug. 13, 2007.

Examination Report under Section 18(3) re for UK Patent Application No. GB0724248.0, mailed on Jun. 4, 2008.

Examination Report under Section 18(3) re for UK Patent Application No. GB0724760.4, mailed on Jan. 30, 2008.

Examination Report under Section 18(3) re for UK Patent Application No. GB0800040.8, mailed on Jan. 30, 2008.

Faultline, "AT&T Targets video home security as next broadband market"; Nov. 2, 2006; The Register; 2 Pages.

Final Office Action mailed Aug. 1, 2011 for U.S. Appl. No. 12/630,092, filed Dec. 3, 2009.

Final Office Action mailed Jun. 1, 2009 for U.S. Appl. No. 11/084,232, filed Mar. 16, 2005.

Final Office Action mailed Jun. 5, 2012 for U.S. Appl. No. 12/771,071, filed Apr. 30, 2010.

Final Office Action mailed May 9, 2013 for U.S. Appl. No. 12/189,780, filed Aug. 11, 2008.

Final Office Action mailed May 9, 2013 for U.S. Appl. No. 12/952,080, filed Nov. 22, 2010.

Final Office Action mailed Jan. 10, 2011 for U.S. Appl. No. 12/189,785, filed Aug. 11, 2008.

Final Office Action mailed Jun. 10, 2011 for U.S. Appl. No. 11/084,232, filed Mar. 16, 2005.

Final Office Action mailed Jan. 13, 2011 for U.S. Appl. No. 12/189,780, filed Aug. 11, 2008.

Final Office Action mailed Oct. 17, 2012 for U.S. Appl. No. 12/637,671, filed Dec. 14, 2009.

Final Office Action mailed Sep. 17, 2012 for U.S. Appl. No. 12/197,958, filed Aug. 25, 2008.

Final Office Action mailed Mar. 21, 2013 for U.S. Appl. No. 12/691,992, filed Jan. 22, 2010.

Final Office Action mailed Jul. 23, 2013 for U.S. Appl. No. 13/531,757, filed Jun. 25, 2012.

Final Office Action mailed Feb. 26, 2013 for U.S. Appl. No. 12/771,471, filed Apr. 30, 2010.

Final Office Action mailed Jun. 29, 2012 for U.S. Appl. No. 12/539,537, filed Aug. 11, 2009.

Final Office Action mailed Dec. 31, 2012 for U.S. Appl. No. 12/770,365, filed Apr. 29, 2010.

Final Office Action mailed Oct. 31, 2012 for U.S. Appl. No. 12/771,624, filed Apr. 30, 2010.

Final Office Action mailed Feb. 16, 2011 for U.S. Appl. No. 12/019,568, filed Jan. 24, 2008.

US Patent Application filed Sep. 25, 2023, entitled "Control System User Interface", U.S. Appl. No. 18/474,039.

US Patent Application filed Sep. 27, 2019, entitled "Control System User Interface", U.S. Appl. No. 16/585,481.

US Patent Application filed Sep. 28, 2018, entitled "Control System User Interface", U.S. Appl. No. 16/146,715.

US Patent Application filed Sep. 28, 2018, entitled "Forming a Security Network Including Integrated Security System Components and Network Devices", U.S. Appl. No. 16/147,044.

US Patent Application filed Sep. 11, 18, entitled "Premises Management Networking", U.S. Appl. No. 16/128,089.

US Patent Application filed Oct. 1, 2018, entitled "Integrated Security System With Parallel Processing Architecture", U.S. Appl. No. 16/148,387.

US Patent Application filed Oct. 1, 2018, entitled "Integrated Security System with Parallel Processing Architecture", U.S. Appl. No. 16/148,411.

US Patent Application filed Oct. 1, 2018, entitled "User Interface In A Premises Network", U.S. Appl. No. 16/148,572.

US Patent Application filed Oct. 3, 2018, entitled "Activation of a Home Automation Controller", U.S. Appl. No. 16/150,973.

US Patent Application filed Oct. 7, 2022, entitled "Security System With Networked Touchscreen", U.S. Appl. No. 18/045,018.

US Patent Application filed Oct. 8, 2020, entitled "Communication Protocols in Integrated Systems", U.S. Appl. No. 17/065,841.

US Patent Application filed Oct. 9, 2023, entitled "Integrated Security System With Parallel Processing Architecture", U.S. Appl. No. 18/483,080.

US Patent Application filed Oct. 10, 2018, entitled "Method and System for Providing Alternate Network Access", U.S. Appl. No. 16/156,448.

US Patent Application filed Oct. 12, 2020, entitled "Integrated Security System With Paralle Processing Architecture", U.S. Appl. No. 17/068,584.

US Patent Application filed Oct. 13, 2017, entitled "Notification of Event Subsequent To Communication Failure With Security System", U.S. Appl. No. 15/783,858.

US Patent Application filed Oct. 18, 2018, entitled "Generating Risk Profile Using Data Of Home Monitoring And Security System", U.S. Appl. No. 16/164,114.

US Patent Application filed Oct. 18, 2019, entitled "Wifi-To-Serial Encapsulation in Systems", U.S. Appl. No. 16/656,874.

US Patent Application filed Oct. 25, 2021, entitled "Forming a Security Network Including Integrated Security System Components and Network Devices", U.S. Appl. No. 17/510,022.

US Patent Application filed Oct. 26, 2023, entitled "Controlling Data Routing in Premises Management Systems", U.S. Appl. No. 18/495,430.

US Patent Application filed Oct. 27, 2017, entitled "Security System With Networked Touchscreen", U.S. Appl. No. 15/796,421.

US Patent Application filed Nov. 6, 2023, entitled "Method, System and Apparatus for Automated Inventory Reporting of Security, Monitoring and Automation Hardware and Software At Customer Premises", U.S. Appl. No. 18/503,102.

US Patent Application filed Nov. 10, 2020, entitled "Integrated Cloud System for Premises Automation", U.S. Appl. No. 17/094,120.

US Patent Application filed Nov. 15, 2021, entitled "Communication Protocols in Integrated Systems", U.S. Appl. No. 17/526,915.

US Patent Application filed Nov. 15, 2021, entitled "Integrated Cloud System With Lightweight Gateway for Premises Automation", U.S. Appl. No. 17/455,005.

US Patent Application filed Nov. 19, 2019, entitled "Integrated Cloud System With Lightweight Gateway for Premises Automation", U.S. Appl. No. 16/688,717.

US Patent Application filed Nov. 22, 2023, entitled "Communication Protocols Over Internet Protocol (IP) Networks", U.S. Appl. No. 18/517,821.

US Patent Application filed Nov. 23, 2021, entitled "Security, Monitoring and Automation Controller Access and Use of Legacy Security Control Panel Information", U.S. Appl. No. 17/534,088.

US Patent Application filed Nov. 25, 2020, entitled "Premises Management Networking", U.S. Appl. No. 17/105,235.

US Patent Application filed Nov. 26, 2019, entitled "Communication Protocols Over Internet Protocol (IP) Networks", U.S. Appl. No. 16/696,657.

US Patent Application filed Nov. 27, 2023, entitled "Networked Touchscreen With Integrated Interfaces", U.S. Appl. No. 18/520,373.

US Patent Application filed Nov. 28, 2017, entitled "Forming A Security Network Including Integrated Security System Components", U.S. Appl. No. 15/824,503.

US Patent Application filed Nov. 29, 18, entitled "Premise Management Systems And Methods", U.S. Appl. No. 16/204,442.

(56)        References Cited

OTHER PUBLICATIONS

US Patent Application filed Nov. 29, 2022, entitled "Communication Protocols Over Internet Protocol (IP) Networks", U.S. Appl. No. 18/059,604.
US Patent Application filed Nov. 30, 2017, entitled "Controller and Interface for Home Security, Monitoring and Automation Having Customizable Audio Alerts for SMA Events", U.S. Appl. No. 15/828,030.
US Patent Application filed Nov. 30, 2022, entitled "Custom Content for Premises Management", U.S. Appl. No. 18/060,374.
US Patent Application filed Dec. 1, 2022, entitled "Controlling Data Routing in Premises Management Systems", U.S. Appl. No. 18/073,514.
US Patent Application filed Dec. 3, 2021, entitled "Communication Protocols in Integrated Systems", U.S. Appl. No. 17/542,302.
US Patent Application filed Dec. 3, 2021, entitled "Control System User Interface", U.S. Appl. No. 17/457,463.
US Patent Application filed Dec. 3, 2021, entitled "Method and System for Managing Communication Connectivity", U.S. Appl. No. 17/542,310.
US Patent Application filed Dec. 9, 2020, entitled "Integrated Security System With Parallel Processing Architecture", U.S. Appl. No. 17/115,936.
US Patent Application filed Dec. 14, 2018, entitled "Communication Protocols Over Internet Protocol (IP) Networks", U.S. Appl. No. 16/221,299.
US Patent Application filed Dec. 17, 2021, entitled "Cross-Client Sensor User Interface in an Integrated Security Network", U.S. Appl. No. 17/644,935.
US Patent Application filed Dec. 23, 2021, entitled "Defining and Implementing Sensor Triggered Response Rules", U.S. Appl. No. 17/645,889.
US Patent Application filed Dec. 27, 2018, entitled "Communication Protocols in Integrated Systems", U.S. Appl. No. 16/233,913.
US Patent Application filed Dec. 27, 2019, entitled "Premises Management Systems", U.S. Appl. No. 16/728,608.
US Patent Application filed Aug. 9, 18, entitled "Method and Systems for Processing Security Event Data", U.S. Appl. No. 16/059,833.
Valtchev, D., and I. Frankov. "Service gateway architecture for a smart home." Communications Magazine, IEEE 40.4 (2002): 126-132.
Visitalk, Communication with Vision, http://www.visitalk.jimbo.com; website accessed Jan. 10, 2018.
Wang et al., "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
Windows, Newton's Telecom Dictionary, 21st Edition, Mar. 2005, 937-938.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X. Li, R. Lu, X. Liang, X. Shen, J. Chen and X. Lin, "Smart community: an internet of things application," in IEEE Communications Magazine, vol. 49, No. 11, pp. 68-75, Nov. 2011, doi: 10.1109/MCOM.2011.6069711. (Year: 2011).
X10—ActiveHome, Home Automation Made Easy [retrieved on Nov. 4, 2003], 3 pages.
International Search Report for Application No. PCT/US2014/050548, mailed on Mar. 18, 2015, 4 pages.

J. David Eisenberg, SVG Essentials: Producing Scalable Vector Graphics with XML. O'Reilly & Associates, Inc., Sebastopol, CA 2002.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
Kobayashi et al., "Creating worldwide community safety with present technology and privacy protection: The e-JIKEI Network project", Procedia-Social and Behavioral Sciences, 2010, vol. 2, pp. 6-13.
Lagotek Wireless Home Automation System, May 2006 [retrieved on Aug. 22, 2012].
Network Working Group, Request for Comments H.Schulzrinne Apr. 1998.
Non-Final Office Action mailed Apr. 4, 2013 for U.S. Appl. No. 12/197,931, filed Aug. 25, 2008.
Non-Final Office Action mailed Mar. 4, 2013 for U.S. Appl. No. 13/400,477, filed Feb. 20, 2012.
Non-Final Office Action mailed May 5, 2010 for U.S. Appl. No. 12/189,780, filed Aug. 11, 2008.
Non-Final Office Action mailed May 5, 2010 for U.S. Appl. No. 12/189,785, filed Aug. 11, 2008.
Non-Final Office Action mailed Feb. 7, 2012 for U.S. Appl. No. 12/637,671, filed Dec. 14, 2009.
Non-Final Office Action mailed Feb. 7, 2013 for U.S. Appl. No. 12/970,313, filed Dec. 16, 2010.
Non-Final Office Action mailed Feb. 8, 2012 for U.S. Appl. No. 12/630,092, filed Dec. 3, 2009.
Non-Final Office Action mailed Apr. 9, 2012 for U.S. Appl. No. 12/771,624, filed Apr. 30, 2010.
Non-Final Office Action mailed Dec. 9, 2008 for U.S. Appl. No. 11/084,232, filed Mar. 16, 2005.
Non-Final Office Action mailed Aug. 10, 2012 for U.S. Appl. No. 12/771,471, filed Apr. 30, 2010.
Non-Final Office Action mailed Oct. 11, 2012 for U.S. Appl. No. 12/019,568, filed Jan. 24, 2008.
Non-Final Office Action mailed Apr. 12, 2012 for U.S. Appl. No. 12/770,365, filed Apr. 29, 2010.
Non-Final Office Action mailed Jul. 12, 2012 for U.S. Appl. No. 12/691,992, filed Jan. 22, 2010.
Non-Final Office Action mailed Oct. 12, 2012 for U.S. Appl. No. 12/630,092, filed Dec. 3, 2009.
Non-Final Office Action mailed Sep. 12, 2012 for U.S. Appl. No. 12/952,080, filed Nov. 22, 2010.
Non-Final Office Action mailed Jul. 13, 2010 for U.S. Appl. No. 12/019,568, filed Jan. 24, 2008.
Non-Final Office Action mailed Nov. 14, 2012 for U.S. Appl. No. 13/531,757, filed Jun. 25, 2012.
Non-Final Office Action mailed Sep. 14, 2010 for U.S. Appl. No. 11/084,232, filed Mar. 16, 2005.
Non-Final Office Action mailed Sep. 16, 2011 for U.S. Appl. No. 12/539,537, filed Aug. 11, 2009.
Non-Final Office Action mailed Sep. 17, 2012 for U.S. Appl. No. 12/189,780, filed Aug. 11, 2008.
Non-Final Office Action mailed Aug. 18, 2011 for U.S. Appl. No. 12/197,958, filed Aug. 25, 2008.
Non-Final Office Action mailed Feb. 18, 2011 for U.S. Appl. No. 12/630,092, filed Dec. 3, 2009.
Non-Final Office Action mailed Jan. 18, 2012 for U.S. Appl. No. 12/771,071, filed Apr. 30, 2010.
Non-Final Office Action mailed Jul. 21, 2010 for U.S. Appl. No. 12/630,092, filed Dec. 3, 2009.
Non-Final Office Action mailed Dec. 22, 2010 for U.S. Appl. No. 12/197,931, filed Aug. 25, 2008.
Non-Final Office Action mailed Jul. 22, 2013 for U.S. Appl. No. 12/630,092, filed Dec. 3, 2009.
Non-Final Office Action mailed Jan. 26, 2012 for U.S. Appl. No. 12/019,568, filed Jan. 24, 2008.
Non-Final Office Action mailed Nov. 26, 2010 for U.S. Appl. No. 12/197,958, filed Aug. 25, 2008.
Non-Final Office Action mailed Jun. 27, 2013 for U.S. Appl. No. 12/019,568, filed Jan. 24, 2008.

(56) References Cited

OTHER PUBLICATIONS

Non-Final Office Action mailed Dec. 30, 2009 for U.S. Appl. No. 11/084,232, filed Mar. 16, 2005.
Non-Final Office Action mailed May 30, 2008 for U.S. Appl. No. 11/084,232, filed Mar. 16, 2005.
Non-Final Office Action mailed Apr. 13, 2010 for U.S. Appl. No. 11/761,745, filed Jun. 12, 2007.
Non-Final Office Action mailed Feb. 21, 2013 for U.S. Appl. No. 12/771,372, filed Apr. 30, 2010.
Non-Final Office Action mailed Jan. 5, 2010 for U.S. Appl. No. 12/019,554, filed Jan. 24, 2008.
Non-Final Office Action mailed May 23, 2013 for U.S. Appl. No. 13/104, 932, filed May 10, 2011.
Non-Final Office Action mailed May 23, 2013 for U.S. Appl. No. 13/104,936, filed May 10, 2011.
Non-Final Rejection Mailed on Jan. 20, 2023 for U.S. Appl. No. 17/712,911, 8 pages.
Notice of Allowance mailed May 14, 2013 for U.S. Appl. No. 12/637,671, filed Dec. 14, 2009.
Notice of Allowance mailed Oct. 25, 2012 for U.S. Appl. No. 11/084,232, filed Mar. 16, 2005.
Oxford Dictionary, Definition of "application", 2021, 2 pages (Year: 2021).
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
US Patent Application filed Jun. 8, 2022, entitled "Methods and Systems for Data Communication", U.S. Appl. No. 17/835,394.
US Patent Application filed Jun. 9, 2021, entitled "Premises Management Configuration and Control", U.S. Appl. No. 17/343,315.
US Patent Application filed Jun. 10, 2020, entitled "Method and System for Communicating With and Controlling an Alarm System From a Remote Server", 16/898, 146.
US Patent Application filed Jun. 10, 2022, entitled "Media Content Management", U.S. Appl. No. 17/838,046.
US Patent Application filed Jun. 10, 2022, entitled "Method, System and Apparatus for Automated Reporting of Account and Sensor Zone Information To a Central Station", U.S. Appl. No. 17/806,341.
US Patent Application filed Jun. 18, 2021, entitled "Controlling Data Routing Among Networks", U.S. Appl. No. 17/304,342.
US Patent Application filed Jun. 22, 2022, entitled "Activation of Gateway Device", U.S. Appl. No. 17/808,146.
US Patent Application filed Jun. 22, 2022, entitled "Automation System User Interface With Three-Dimensional Display", U.S. Appl. No. 17/808,275.
US Patent Application filed Jun. 22, 2022, entitled "Communication Protocols in Integrated Systems", U.S. Appl. No. 17/808,118.
US Patent Application filed Jun. 24, 2020, entitled "Method and System for Processing Security Event Data", U.S. Appl. No. 16/910,967.
US Patent Application filed Jun. 27, 2018, entitled "Activation Of Gateway Device", U.S. Appl. No. 16/020,499.
US Patent Application filed Jul. 1, 2022, entitled "Forming a Security Network Including Integrated Security System Components", U.S. Appl. No. 17/856,448.
US Patent Application filed Jul. 2, 2019, entitled "Communication Protocols in Integrated Systems", U.S. Appl. No. 16/460,712.
US Patent Application filed Jul. 3, 2018, entitled "WIFI-To-Serial Encapsulation in Systems", U.S. Appl. No. 16/026,703.
US Patent Application filed Jul. 9, 2020, entitled "Automation System With Mobile Interface", U.S. Appl. No. 16/925,026.
US Patent Application filed Jul. 12, 2018, entitled "Integrated Security System with Parallel Processing Architecture", U.S. Appl. No. 16/034,132.
US Patent Application filed Jul. 13, 2023, entitled "Methods and Systems for Data Communication", U.S. Appl. No. 18/351,636.
US Patent Application filed Jul. 14, 2023, entitled "Bidirectional Security Sensor Communication for a Premises Security System", U.S. Appl. No. 18/352,803.

US Patent Application filed Jul. 20, 2018, entitled "Cross-Client Sensor User Interface in an Integrated Security Network", U.S. Appl. No. 16/041,291.
US Patent Application filed Jul. 21, 2023, entitled "Communication Protocols in Integrated Systems", U.S. Appl. No. 18/356,337.
US Patent Application filed Jul. 26, 2019, entitled "Device Integration Framework", U.S. Appl. No. 16/522,949.
US Patent Application filed Jul. 26, 2021, entitled "Notification of Event Subsequent to Communication Failure With Security System", U.S. Appl. No. 17/443,427.
US Patent Application filed Jul. 28, 2016, entitled "Method and System for Automatically Providing Alternate Network Access for Telecommunications", U.S. Appl. No. 15/222,416.
US Patent Application filed Jul. 30, 2021, entitled "Gateway Integrated With Premises Security System", U.S. Appl. No. 17/390,222.
US Patent Application filed Aug. 3, 2022, entitled "Premises Management Networking", U.S. Appl. No. 17/817,210.
US Patent Application filed Aug. 8, 2016, entitled "Security, Monitoring and Automation Controller Access and Use of Legacy Security Control Panel Information", U.S. Appl. No. 15/231,273.
US Patent Application filed Aug. 9, 2016, entitled "Controller and Interface for Home Security, Monitoring and Automation Having Customizable Audio Alerts for Sma Events", U.S. Appl. No. 15/232,135.
US Patent Application filed Aug. 9, 2018, entitled "Method and System for Processing Security Event Data", U.S. Appl. No. 16/059,833.
US Patent Application filed Aug. 10, 2021, entitled "Media Content Management", U.S. Appl. No. 17/398,939.
US Patent Application filed Aug. 11, 2022, entitled "Security Network Integrating Security System and Network Devices", U.S. Appl. No. 17/819,083.
US Patent Application filed Aug. 16, 2021, entitled "Control System User Interface", U.S. Appl. No. 17/403,526.
US Patent Application filed Aug. 16, 2023, entitled "Mobile Premises Automation Platform", U.S. Appl. No. 18/450,878.
US Patent Application filed Aug. 21, 2018, entitled "Premises System Management Using Status Signal" U.S. Appl. No. 16/107,568.
US Patent Application filed Aug. 23, 2019, entitled "Premises System Management Using Status Signal" U.S. Appl. No. 16/549,837.
US Patent Application filed Aug. 23, 2021, entitled "Method and System for Providing Alternate Network Access", U.S. Appl. No. 17/409,528.
US Patent Application filed Aug. 25, 2023, entitled "Automation System With Mobile Interface", U.S. Appl. No. 18/456,355.
US Patent Application filed Aug. 26, 2020, entitled "Automation System User Interface With Three-Dimensional Display", U.S. Appl. No. 17/003,550.
US Patent Application filed Aug. 31, 2021, entitled "Networked Touchscreen With Integrated Interfaces", U.S. Appl. No. 17/463,267.
US Patent Application filed Sep. 1, 2023, entitled "Communication and Automation in a Premises Management System", U.S. Appl. No. 18/460,355.
US Patent Application filed Sep. 6, 2018, entitled "Takeover of Security Network", U.S. Appl. No. 16/123,695.
US Patent Application filed Sep. 7, 2021, entitled "Gateway Registry Methods and Systems", U.S. Appl. No. 17/468,188.
US Patent Application filed Sep. 8, 2021, entitled "User Interface in a Premises Network", U.S. Appl. No. 17/469,417.
US Patent Application filed Sep. 9, 2021, entitled "Premises System Management Using Status Signal", U.S. Appl. No. 17/470,732.
US Patent Application filed Sep. 10, 2020, entitled "Security System With Networked Touchscreen", U.S. Appl. No. 17/017,519.
US Patent Application filed Sep. 11, 2020, entitled "Management Of Applications For A Device Located at a Premises", U.S. Appl. No. 17/018,901.
US Patent Application filed Sep. 17, 2018, entitled "Integrated Security System With Parallel Processing Architecture", U.S. Appl. No. 16/133,135.
US Patent Application filed Sep. 22, 2022, entitled "Forming a Security Network Including Integrated Security System Components and Network Devices", U.S. Appl. No. 17/934,443.
US Patent Application filed Sep. 22, 2023, entitled "Automation System User Interface", U.S. Appl. No. 18/472,477.

(56) References Cited

OTHER PUBLICATIONS

US Patent Application filed Sep. 22, 2023, entitled "Communication Protocols Over Internet Protocol (IP) Networks", U.S. Appl. No. 18/472,408.

US Patent Application filed Sep. 22, 2023, entitled "Cross-Client Sensor User Interface in an Integrated Security Network", U.S. Appl. No. 18/472,628.

Final Office Action mailed Jul. 12, 2010 for U.S. Appl. No. 12/019,554, filed Jan. 24, 2008.

Final Office Action mailed Sep. 14, 2011 for U.S. Appl. No. 12/197,931, filed Aug. 25, 2008.

Foreign communication from a related counterpart application—Written Opinion, App No. PCT/US02/14450, Oct. 21, 2003, 4 pgs.

Foreign communication from a related counterpart application—International Preliminary Examination Report, App No. PCT/US02/14450, Mar. 2, 2004, 4 pgs.

Foreign communication from a related counterpart application—International Search Report, App No. PCT/US02/14450, Dec. 17, 2002, 6 pgs.

Form PCT/ISA/210, "PCT International Search Report for the Application No. PCT/US05/08766," May 23, 2006, 2 pages.

Form PCT/ISA/210, "PCT International Search Report for the Application No. PCT/US08/72831," Nov. 4, 2008, 2 pages.

Form PCT/ISA/210, "PCT International Search Report for the Application No. PCT/US08/74246," Nov. 14, 2008, 2 pages.

Form PCT/ISA/210, "PCT International Search Report for the Application No. PCT/US08/74260," Nov. 13, 2008, 2 pages.

Form PCT/ISA/210, "PCT International Search Report for the Application No. PCT/US08/83254," Jan. 14, 2009, 2 pages.

Form PCT/ISA/210, "PCT International Search Report for the Application No. PCT/US09/53485," Oct. 22, 2009, 2 pages.

Form PCT/ISA/210, "PCT International Search Report for the Application No. PCT/US09/55559," Nov. 12, 2009, 2 pages.

Form PCT/ISA/210, "PCT International Search Report for the Application No. PCT/US10/50585," Dec. 30, 2010, 2 pages.

Form PCT/ISA/210, "PCT International Search Report for the Application No. PCT/US10/57674," Mar. 2, 2011, 2 pages.

Form PCT/ISA/210, "PCT International Search Report for the Application No. PCT/US11/34858," Oct. 3, 2011, 2 pages.

Form PCT/ISA/210, "PCT International Search Report for the Application No. PCT/US11/35994," Sep. 28, 2011, 2 pages.

Form PCT/ISA/210, "PCT International Search Report for the Application No. PCT/US11/53136," Jan. 5, 2012, 2 pages.

Form PCT/ISA/220, "PCT Notification of Transmittal of the International Search Report and the Written Opinion fo the International Searching Authority, or the Declaration for the Application No. PCT/US08/74260," Nov. 13, 2008, 1 page.

Form PCT/ISA/220, "PCT Notification of Transmittal of the International Search Report and the Written Opinion of the International Searching Authority, or the Declaration for the Application No. PCT/US08/72831," Nov. 4, 2008, 1 page.

Form PCT/ISA/220, "PCT Notification of Transmittal of the International Search Report and the Written Opinion of the International Searching Authority, or the Declaration for the Application No. PCT/US08/74246" Nov. 14, 2008, 1 page.

Form PCT/ISA/220, "PCT Notification of Transmittal of the International Search Report and the Written Opinion of the International Searching Authority, or the Declaration for the Application No. PCT/US08/83254," Jan. 14, 2009, 1 page.

Form PCT/ISA/220, "PCT Notification of Transmittal of the International Search Report and the Written Opinion of the International Searching Authority, or the Declaration for the Application No. PCT/US09/53485," Oct. 22, 2009, 1 page.

Form PCT/ISA/220, "PCT Notification of Transmittal of the International Search Report and the Written Opinion of the International Searching Authority, or the Declaration for the Application No. PCT/US09/55559," Nov. 12, 2009, 1 page.

Form PCT/ISA/220, "PCT Notification of Transmittal of the International Search Report and the Written Opinion of the International Searching Authority, or the Declaration for the Application No. PCT/US10/50585," Dec. 30, 2010, 1 page.

Form PCT/ISA/220, "PCT Notification of Transmittal of the International Search Report and the Written Opinion of the International Searching Authority, or the Declaration for the Application No. PCT/US10/57674," Mar. 2, 2011, 1 page.

Form PCT/ISA/220, "PCT Notification of Transmittal of the International Search Report and the Written Opinion of the International Searching Authority, or the Declaration for the Application No. PCT/US11/35994," Sep. 28, 2011, 1 page.

Form PCT/ISA/220, PCT Notification of Transmittal of the International Search Report and the Written Opinion of the International Searching Authority, or the Declaration for the Application No. PCT/US05/08766, May 23, 2006, 1 page.

Form PCT/ISA/237, "PCT Written Opinion ofthe International Searching Authority for the Application No. PCT/US05/08766," May 23, 2006, 5 pages.

Form PCT/ISA/237, "PCT Written Opinion of the International Searching Authority for the Application No. PCT/US08/72831," Nov. 4, 2008, 6 pages.

Form PCT/ISA/237, "PCT Written Opinion of the International Searching Authority for the Application No. PCT/US08/74246," Nov. 14, 2008, 6 pages.

Form PCT/ISA/237, "PCT Written Opinion of the International Searching Authority for the Application No. PCT/US08/74260," Nov. 13, 2008, 6 pages.

Form PCT/ISA/237, "PCT Written Opinion of the International Searching Authority for the Application No. PCT/US09/53485," Oct. 22, 2009, 8 pages.

Form PCT/ISA/237, "PCT Written Opinion of the International Searching Authority for the Application No. PCT/US09/55559," Nov. 12, 2009, 6 pages.

Form PCT/ISA/237, "PCT Written Opinion of the International Searching Authority for the Application No. PCT/US10/50585," Dec. 30, 2010, 7 pages.

Form PCT/ISA/237, "PCT Written Opinion of the International Searching Authority for the Application No. PCT/US10/57674," Mar. 2, 2011, 6 pages.

Form PCT/ISA/237, "PCT Written Opinion of the International Searching Authority for the Application No. PCT/US11/34858," Oct. 3, 2011, 8 pages.

Form PCT/ISA/237, "PCT Written Opinion of the International Searching Authority for the Application No. PCT/US11/35994," Sep. 28, 2011, 11 pages.

Form PCT/ISA/237, "PCT Written Opinion of the International Searching Authority for the Application No. PCT/US11/53136," Jan. 5, 2012.

Form PCT/ISA/237, "PCT Written Opinion of the International Searching Authority of the Application No. PCT/US08/83254," Jan. 14, 2009, 7 pages.

Fujii et al., "Community security platform for individually maintained home computers: The Vigilante Network Project", Proceedings of the 21st IEEE Instrumentation and Measurement Technology Conference, 2004, vol. 2, pp. 891-894.

Gateway Registry Methods and Systems, U.S. Appl. No. 13/486,276, filed Jun. 1, 2012.

Genex OmniEye http://www.qenextech.com/prod01.htm, 1999 5 pages.

Gong, Li, A Software architecture for open service gateways, Internet Computing, IEEE 5.1, Jan.-Feb. 2001, 64-70.

GrayelEctronics, "Digitizing TV cameras on TCP/IP Computer Networks," http://www.grayelectronics.com/default.htm, printed on Oct. 12, 1999 (2 pages).

GrayelEctronics, http://www.grayelectronics.com; webpage accessed on Jan. 10, 2018.

Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.

Indian Patent App. No. 10698/DELNP/2012, corresponds to WO2011/143273 filed Nov. 17, 2011.

Indian Patent App. No. 3687/DELNP/2012, corresponds to WO2011/038409.

(56) References Cited

OTHER PUBLICATIONS

Indicate. Memam-Webster.com Dictionary, Merriam-Webster, https://web.archive.org/web/20061209080613/https://www.merriam-webster.com/dictionary/indicate. Dec. 9, 2006.

International Search Report for Application No. PCT/US13/48324, mailed on Jan. 14, 2014, 2 pages.

US Patent Application filed Jul. 1, 2024, entitled "Activation of Gateway Device", U.S. Appl. No. 18/760,383.

US Patent Application filed Aug. 8, 2024, entitled "Custom Content for Premises Management", U.S. Appl. No. 18/798,419.

US Patent Application filed Aug. 15, 2024, entitled "Method and System for Processing Security Event Data", U.S. Appl. No. 18/806,202.

US Patent Application filed Feb. 29, 2024, entitled "Virtual Device Systems and Methods", U.S. Appl. No. 18/591,562.

US Patent Application filed Apr. 9, 2024, entitled "Activation of a Home Automation Controller", U.S. Appl. No. 18/630,397.

US Patent Application filed Apr. 19, 2024, entitled "Control System User Interface", U.S. Appl. No. 18/640,545.

US Patent Application filed Jan. 4, 2024, entitled "Media Content Management", U.S. Appl. No. 18/403,953.

US Patent Application filed Feb. 7, 2024, entitled "Defining and Implementing Sensor Triggered Response Rules", U.S. Appl. No. 18/435,908.

US Patent Application filed Nov. 5, 2025, entitled "Defining and Implementing Sensor Triggered Response Rules", U.S. Appl. No. 19/380,341.

\* cited by examiner

310 Receive Signal from Keypad Bus

320 Interpret Signal Received from Keypad Bus

330 Communication Mode to External N/W Selected?

335 Select Communication Mode to External Network

No

Yes

340 Generate Signal for Protocol of Selected Communication Mode Including Information from Keypad Bus Signal 350 Transmit Signal to External N/W on Selected Communication Mode

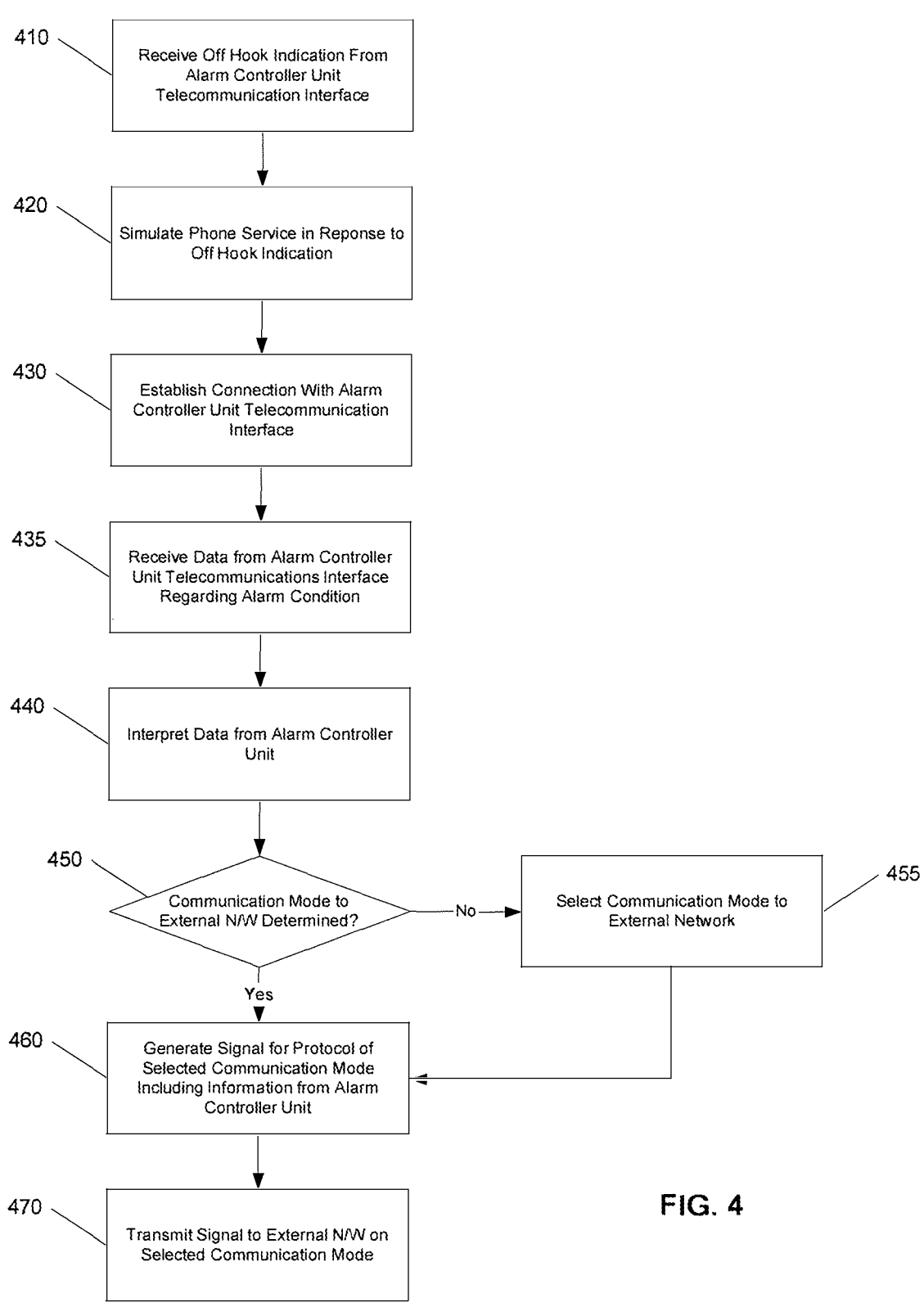

410 — Receive Off Hook Indication From Alarm Controller Unit Telecommunication Interface 420 — Simulate Phone Service in Reponse to Off Hook Indication 430 — Establish Connection With Alarm Controller Unit Telecommunication Interface 435 — Receive Data from Alarm Controller Unit Telecommunications Interface Regarding Alarm Condition 440 — Interpret Data from Alarm Controller Unit 450 — Communication Mode to External N/W Determined?

No → 455 — Select Communication Mode to External Network

Yes

460 — Generate Signal for Protocol of Selected Communication Mode Including Information from Alarm Controller Unit 470 — Transmit Signal to External N/W on Selected Communication Mode

FIG. 4

510 — Receive Signal from Remote Server

520 — Interpret Information from Received Signal

530 — Transmit Interpreted Information to Keypad Bus Using Keypad Bus Protocol

610 — Receive Data from Communication Unit

620 — Does Data Contain Reportable Information?

625 — Determine Nature of Reportable Information

Yes

No

640 — Determine Type of Event Communicated in Data

630 — Contact Monitoring Station To Appraise of Nature of Reportable Information 650 — Identify Proper Response to Event Type 660 — Perform the Identified Response

METHOD AND SYSTEM FOR MANAGING COMMUNICATION CONNECTIVITY

CROSS-REFERENCE TO RELATED APPLICATIONS

This application is a continuation of U.S. patent application Ser. No. 17/542,310, filed Dec. 3, 2021, now U.S. Pat. No. 11,809,174, which is a continuation of U.S. patent application Ser. No. 16/898,146, filed Jun. 10, 2020, now U.S. Pat. No. 11,194,320.

U.S. patent application Ser. No. 16/898,146 is a continuation of U.S. patent application Ser. No. 13/153,807, filed Jun. 6, 2011, now U.S. Pat. No. 10,747,216;

U.S. patent application Ser. No. 13/153,807 is a continuation of U.S. patent application Ser. No. 12/620,047 filed Nov. 17, 2009, now U.S. Pat. No. 7,956,736;

U.S. patent application Ser. No. 12/620,047 is a continuation of U.S. patent application Ser. No. 11/711,972, filed Feb. 28, 2007, now U.S. Pat. No. 7,633,385, each of which are hereby incorporated by reference in their entirety.

FIELD OF THE INVENTION

The present invention relates to the field of security systems, and more particularly relates to coupling a legacy alarm system to a server coupled to an external network via a plurality of monitored communication modes, enabling the server to provide control information to the legacy alarm system, and the legacy alarm system to report status and alarm conditions to the server.

BACKGROUND OF THE INVENTION

Security systems alert occupants of a dwelling and emergency authorities of a violation of premises secured by the security system. A typical security system includes a controller connected by wireless or wired connections to sensors deployed at various locations throughout the secured dwelling. In a home, sensors are usually deployed in doorways, windows, and other points of entry. Motion sensors can also be placed strategically within the home to detect unauthorized movement, while smoke and heat sensors can detect the presence of fire.

Security systems are usually connected to a central monitoring service system via a telecommunications line coupled to a public switched telephone network (PSTN). The central monitoring service system can be maintained by a security service provider and continuously monitors all activated subscriber security systems for alarms. Sensor activity occurs when a sensor detects, for example, an opening of a door or window, or presence of movement, or a fire. Sensor activity causes the sensor to send a signal to the controller of the security system. Responsive to receiving the signal, the controller can determine whether the signal represents an alarm condition and, if so, issue an audible alarm to alert the occupants of the dwelling and can originate a data transmission to the central monitoring service system via the telecommunications line. Upon receiving notification of an alarm, the central monitoring service system can determine the type of activity, attempt to contact the dwelling occupants, and alert appropriate authorities of an emergency situation.

Typically, the telecommunications line interconnecting the security system to the central monitoring service system is the dwelling occupant's telephone line. This line usually emanates from and is accessible from the exterior of the dwelling. It is this telecommunications line which delivers a security breach signal to the central monitoring service system via a PSTN.

One drawback of such a security system is that the telecommunications line becomes a potential single point of failure for providing a security breach signal to the central monitoring service system. Should the telephone line be rendered inoperative, for example, by an intruder cutting the telecommunications line prior to attempting entry, or due to other types of telecommunications systems failure, then the security breach signal will fail to be provided to the central monitoring service system and further action, such as notification of the authorities will not occur. Such links between a security system and a central monitoring service system are typically one-way, providing only data from the security system to the central monitoring system, which is another drawback. Such a one-way communication link does not allow for remote access of the security system to monitor or control the system.

Other security systems exist that can provide either a redundant communication mode or two-way communication between the security system and a remote server, either accessed by a central monitoring service system or a user. The drawbacks with regard to these prior art systems are that should a dwelling already have a security system such as that described above, the legacy security system would have to be deinstalled and then replaced by a security system providing redundant communication modes and/or two-way communication. There is no capacity to add such functionality to an existing alarm system. Such replacement of a legacy security system entails high costs, as the controller unit of the legacy security system must be replaced, and the sensors need to be rewired to a new controller unit.

It is therefore desirable to provide a cost-effective solution for enabling legacy (pre-installed) security systems to be remotely controlled and monitored by either a user of the system (e.g., a home owner) or a central monitoring service system, through a plurality of continuously-monitored communication modes.

BRIEF DESCRIPTION OF THE DRAWINGS

The present invention may be better understood, and its numerous objects, features and advantages made apparent to those skilled in the art by referencing the accompanying drawings.

FIG. 4 is a simplified flow diagram illustrating steps for providing information in an alarm signal received from alarm processor's telephone interface to an external network, in accord with embodiments of the present invention.

DETAILED DESCRIPTION

Embodiments of the present invention provide a communication system that can be added to a legacy alarm system to provide a plurality of communication modes to a remote server system from the legacy alarm system and provide remote control and monitoring to a user of the system via two-way communication links. Embodiments of the present invention can be configured to communicate with an alarm processor of the alarm system through use of a keypad bus typically used by the legacy alarm system for communications between the alarm processor and one or more keypads. Communication modes to the remote server system that can be provided by embodiments of the present invention can include, for example, communication over a public switched telephone network, cellular transmission, broadband transmission, and the like. Embodiments of the present invention can monitor all configured communication modes and determine which communication mode is the best for providing communication between the alarm system and the remote server. Through these communication modes and by virtue of being coupled to the alarm processor via the keypad bus, embodiments of the present invention can provide both transmission to the remote server of the status and alarm condition of the legacy alarm system as well as provide control signals from the remote server to the legacy alarm system.

Figure 1:
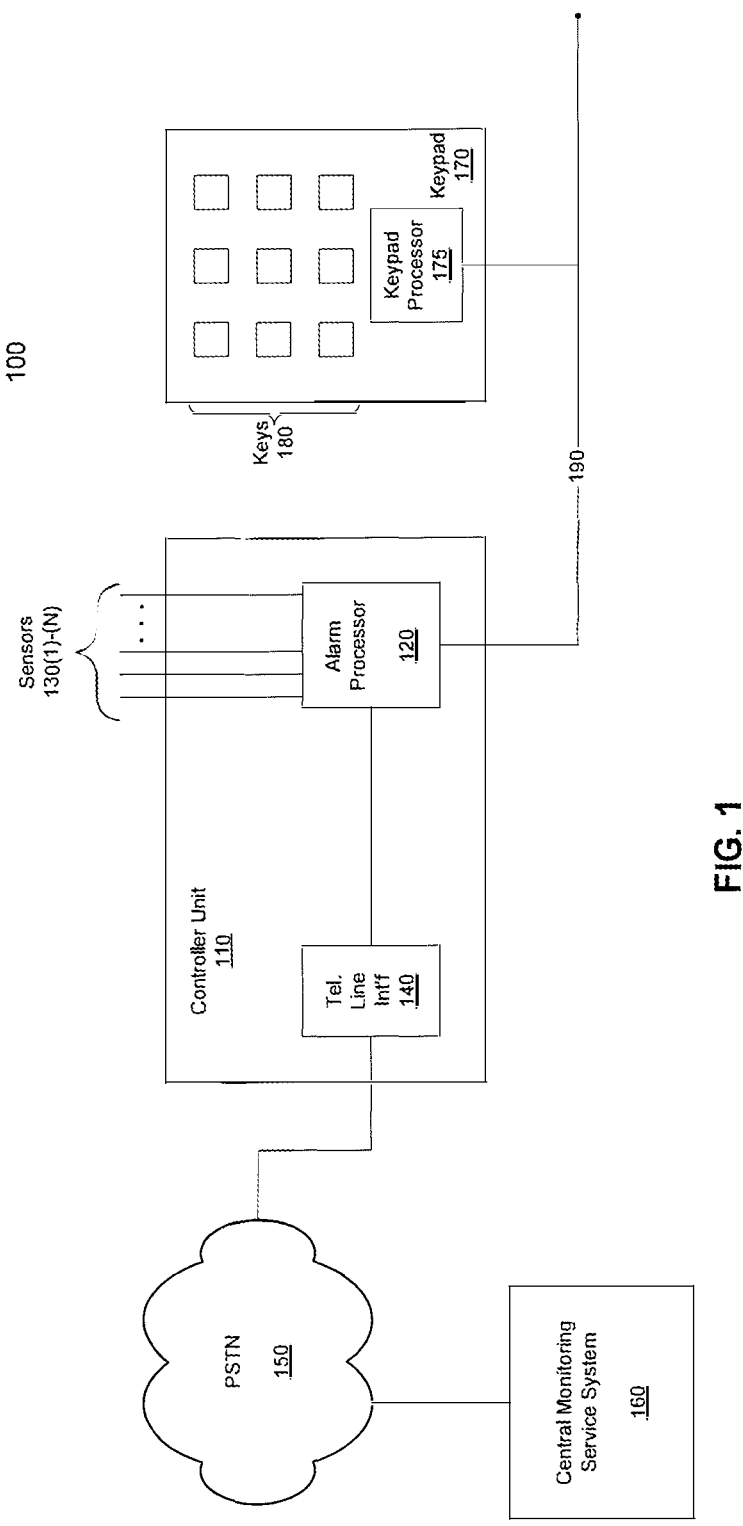
FIG. 1 is a simplified block diagram illustrating elements of an alarm system usable with embodiments of the present invention.

FIG. 1 is a simplified block diagram illustrating elements of a legacy alarm system 100. Alarm system 100 includes a controller unit 110. Controller unit 110 includes an alarm processor 120, which is coupled to sensors 130(1)-(N). Sensors 130(1)-(N) can be installed at various points of entry for a building to detect when such a point of entry is reached, and can also include, for example, motion, smoke, and fire detectors. Alarm processor 120 can define zones each of which can include one or more alarm sensors 130(1)-(N). Alarm processor 120 is further coupled to a telephone line interface 140. In the event of a triggering of one of sensors 130(1)-(N), alarm processor 120 can instruct telephone line interface 140 to dial a call through public switched telephone network (PSTN) 150 to a central monitoring service system 160. Alarm processor 120 can then send data through the connection to the central monitoring service system, providing information related to the type of security breach (e.g., identification of zone, fire or intrusion alarm, etc.).

Alarm processor 120 is also coupled to a keypad 170. Keypad 170 allows a user in the building to control the alarm system by performing tasks such as arming and disarming the alarm system, activating an alarm sequence to activate an audible alarm and call to the central monitoring service system, sending a silent distress signal to the central monitoring service system, and programming and configuring alarm system 100. Keypad 170 includes a keypad processor 175, which is coupled to keys 180 through which the user can enter commands. Keypad 170 can also include, for example, visual indicators of the status of the alarm system such as LEDs or a display, which are coupled to the keypad processor. Alarm processor 120 is coupled to keypad processor 175 through a keypad bus 190. Keypad bus 190 provides communication between the alarm processor and keypad processor using, for example, a serial digital protocol transmitted and received by the processors. One or more keypads can be connected to the alarm processor via the keypad bus.

Through the use of the keypad bus serial digital protocol, the alarm processor can provide to the keypad information such as whether the alarm is armed or disarmed, and whether zones are tripped or not. The keypad processor can provide arming codes and other control information to the alarm processor.

Figure 2:
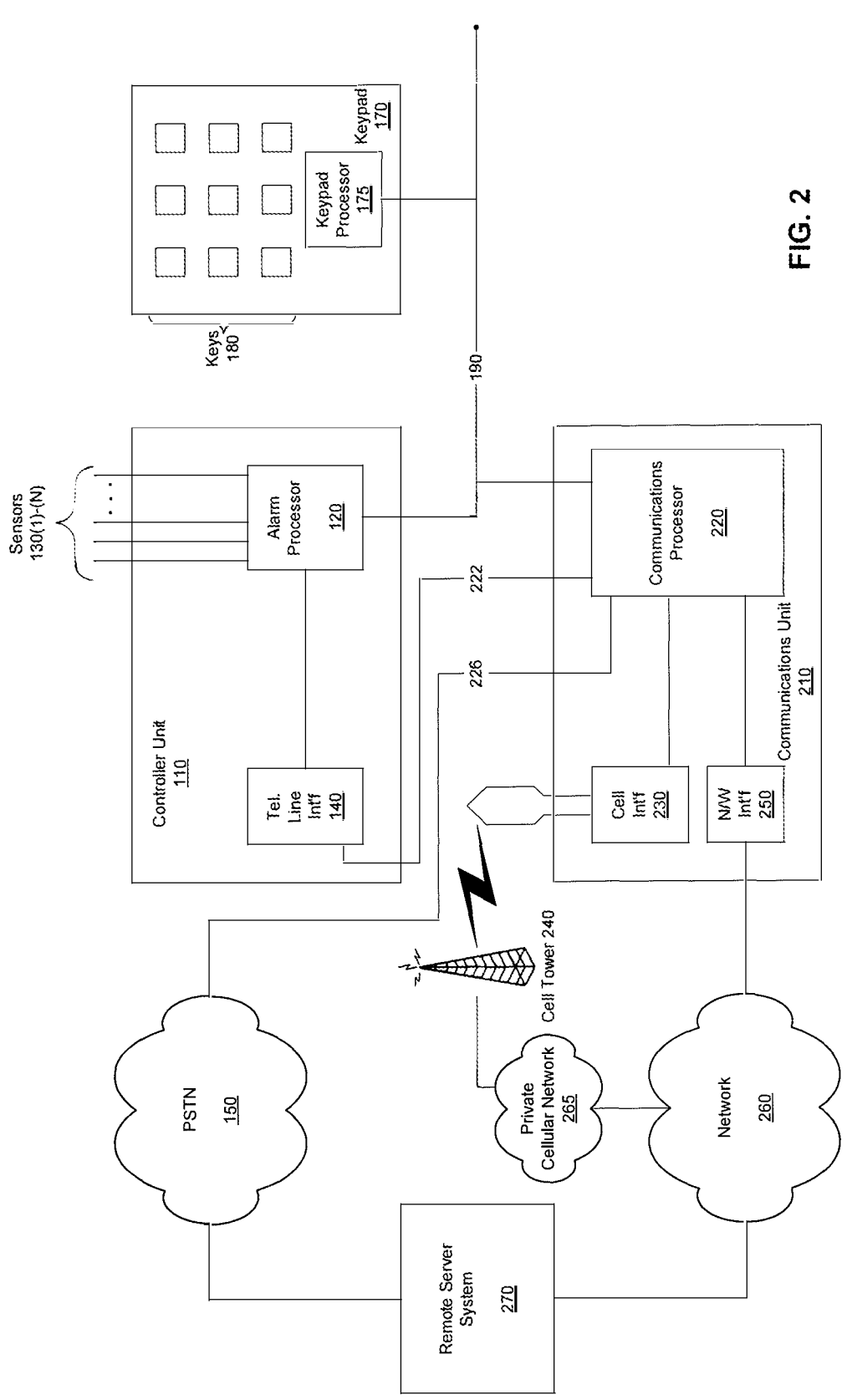
FIG. 2 is a simplified block diagram of components of a legacy alarm system coupled to a communications system, in accord with embodiments of the present invention.

FIG. 2 is a simplified block diagram of components of a legacy alarm system coupled to a communications system in accord with embodiments of the present invention. As discussed above, alarm controller 110 includes a microprocessor 120 that is coupled to sensors 130(1)-(N). Alarm processor 120 is coupled via keypad bus 190 to keypad processor 175 within keypad 170. Communications unit 210 provides a communications processor 220 that is coupled to alarm processor 120 and keypad processor 175 via keypad bus 190. Thus, communications processor 220 can exchange data with alarm processor 120 using the serial digital protocol of keypad bus 190. Communications processor 220 can be configured to automatically determine the type of serial digital protocol being used in communications between alarm processor 120 and keypad processor 175 as part of an initial configuration of communications unit 210 upon being coupled to the keypad bus.

Communications processor 220 is also coupled to controller unit 110 via telecommunications link 222, which is coupled to the outgoing port of telephone line interface 140. Communications processor 220 is further coupled to PSTN 150 by telecommunications link 226, thereby breaking the direct link between telephone line interface 140 and PSTN 150 illustrated in FIG. 1. Communications processor 220 then serves as an intermediary between alarm unit 110 and PSTN 150. It is through this link that communications processor 220 can provide communication from alarm controller unit 110 to a remote server system 270 via the PSTN, should that be a selected communication mode (as described below).

Remote server system 270 can be a network-coupled computer system that provides, in part, responsive communication to information received from communications unit 210. Such responsive communication can be provided to, for example, the user of the alarm system (e.g., a homeowner) or to emergency responders to alarm conditions. Remote server system 270 can also provide communication to communications unit 210, including, for example, configuration information and updates.

Communications processor 220 can also be coupled to a cellular interface 230 that can provide cellular transmission to a cell tower 240 that is also coupled, directly or indirectly, to a private cellular network 265, which is further coupled to a network 260. Through this link, communications processor 220 can provide a cellular transmission communication mode to server system 270, which is also coupled to network 260.

Communications processor 220 can also be coupled to a network interface 250. Network interface 250 can provide a broadband connection to network 260 (e.g., the Internet), which is also coupled to server system 270. Through network interface 250, communications processor 220 can provide a broadband communications mode to server system 270.

In alternate embodiments of communications unit 210, communications processor 220 can be coupled to other communication interfaces that can provide wireless broadband, Wi-Fi communication, and the like.

The multiple communication modes provided by communication unit 210 avoid the single point of failure (e.g., an external telephone line) present in legacy alarm systems. To this end, it is preferable that multiple communication modes not be transmitted over a common link from a building in which an alarm system is installed.

Communications processor 220 can monitor all of the available communication modes to determine which communication mode is the best for transmitting data to and from server system 270 at any point in time. For example, the communications processor, through network interface 250, can monitor whether there is an active connection to network 260. Such monitoring can be performed by, for example, by periodically establishing, or attempting to establish, a connection with server system 270 and monitoring a heartbeat signal. Alternatively, the communications processor can determine availability and viability of a network connection to the server system using, for example, network echo packets (e.g., pinging). Similarly, through cellular interface 230, communications processor 220 can periodically establish, or attempt to establish, a connection with server system 270 through private cellular network 265 and network 260. With regard to connections via PSTN 150, the communications processor can, for example, determine whether there is an appropriate voltage over the telecommunications link 226 from the PSTN. In an event of a voltage drop on telecommunications link 226, the communications processor can interpret such a drop as an event that needs to be communicated to the remote server (over either the broadband or cellular connection).

As the communications processor determines the best communication mode, that mode is then used for communication between communication unit 210 and server system 270 until a determination is made that an alternate communication mode is more appropriate. Alternatively, the communications processor can be configured to give primary preference to a particular communications mode (e.g., broadband), and then secondary preference to a different communications mode (e.g., cellular), and so on. In such a case, the communications processor will use the primary communications mode unless that communications mode is unavailable and then switch to a secondary (or lower) communications mode, depending upon availability of that mode.

An example communication mode configuration for the controller unit can provide for broadband being the primary communication mode, since broadband connections can be relatively inexpensive to maintain a constant link through and data rates are relatively high. The secondary communication mode can be a cellular connection because of difficulty involved in severing such a connection. But data rates may be lower for the cellular connection, as well as relatively more expensive. Thus, the communication unit can be configured, for example through control settings provided by server 270, to only communicate a subset of events through cellular connections. To compensate for this reduced event data bandwidth, the communications unit can cache event information, along with time stamps, in a memory local to the communications unit and provide all those events to the server when the broadband connection is restored. Further, PSTN communication can be configured as a tertiary communication mode. Data rates through PSTN can determine a different subset of events reportable through PSTN, and again the communication unit can be configured with that subset. For example, data rates over PSTN can limit the communication unit to only transmit alarm event information over that communication mode. Alternatively, PSTN communication can result in some or all non-alarm, reportable events being cached for later transmission through the PSTN. Further, PSTN communication may limit communication unit-to-server communication to a one-way link, rather than two-way communication provided by broadband and cellular.

As stated above, communications processor 220 and alarm unit 110 are coupled over telecommunications link 222 in order for the communications processor to function as an intermediary between the alarm unit and PSTN 150. In a legacy system, when alarm processor 120 detects an alarm situation, alarm processor 120 instructs telephone line interface 140 to dial out over PSTN 150 to communicate with the central monitoring service system. Communications processor 220 can simulate the phone service and the central monitoring system and interpret the alarm signals provided by alarm processor 120. Alarm processor 120 provides such communication using, for example, a ContactID format. Communications processor 220 can read the data supplied by alarm processor 120 over the telecommunications link, interpret that data, and transmit an appropriate signal over the chosen communication mode to server system 270.

Communications processor 220 can also interpret signals provided by alarm processor 120 over keypad bus 190, and provide that information to server system 270 over the chosen communication mode. As stated above, such information can include arm/disarm indicators, zone trip information, system trouble (e.g., low battery, clock reset, no power), and the like.

As stated above, communications processor 220 interprets event signals received from alarm processor 120 over either keypad bus 190 or telephone line interface 140. Communications processor 220 will then generate a signal to send over the selected communication mode to server system 270. This signal corresponds to the interpretation of the event signal received from the alarm processor. In the case of alarm events received over the telephone line interface, the communications processor can also encapsulate original data received for transmission to the server system. In this manner, should the server system need to further analyze the alarm indication in order to determine a proper response, that data is provided in its original form.

Communications processor 220 can also receive information provided by server system 270 over a communication mode selected by the server system. Communications processor 220 can interpret that received information and format the information for the appropriate serial digital protocol of keypad bus 190. Communications processor 220 can then provide the information to alarm processor 120 over keypad bus 190. Through such communication, communications processor 220 emulates keypad communication to alarm processor 120. Thus, there is no need to reprogram the legacy alarm system to allow the legacy alarm system to be controlled through communication unit 210.

Figure 3:
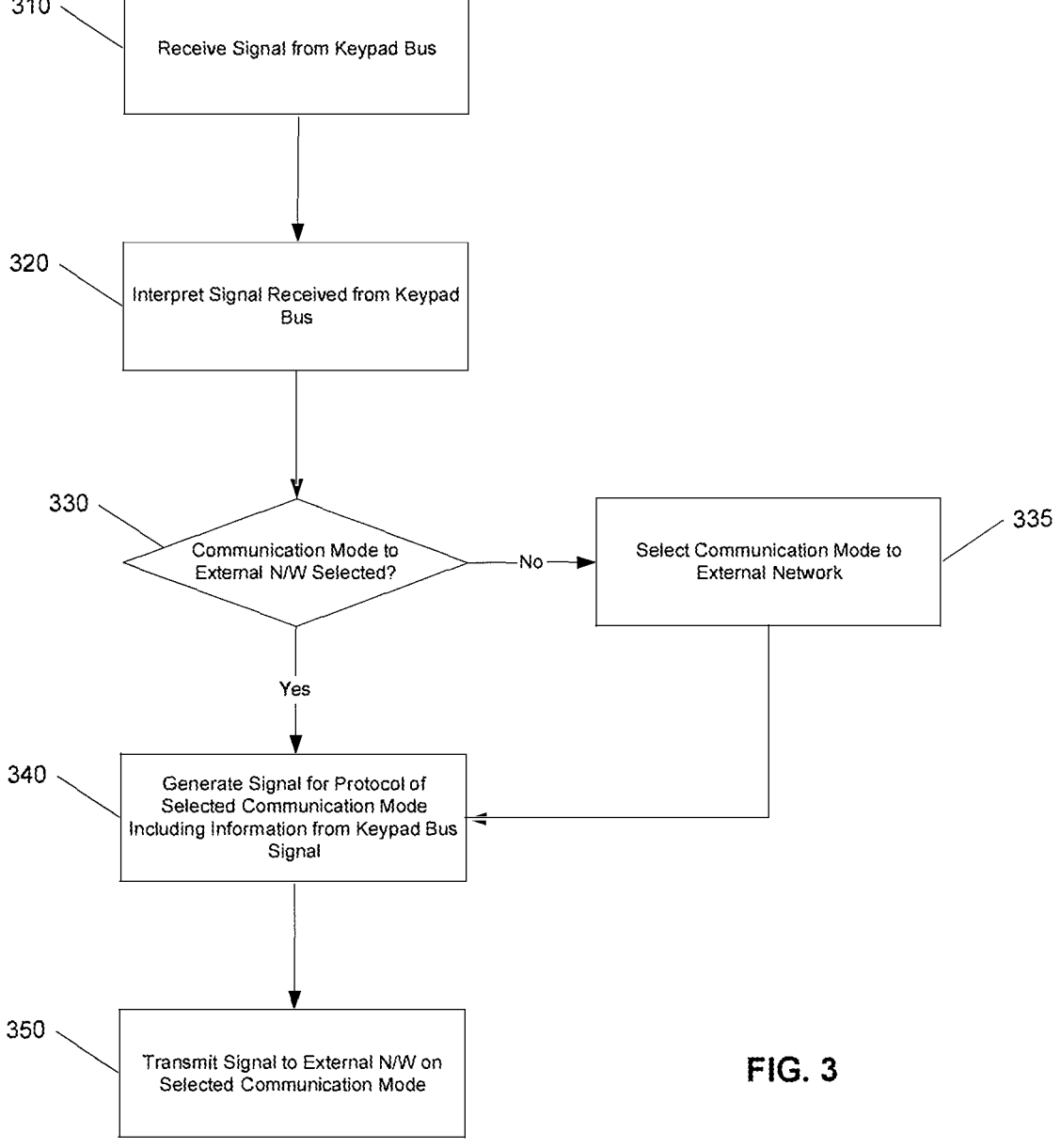
FIG. 3 is a simplified flow diagram illustrating steps performed in providing a signal received from a keypad bus to an external network over a selected communication mode, in accord with embodiments of the present invention.

FIG. 3 is a simplified flow diagram illustrating steps performed in providing a signal received from a keypad bus to an external network over a communication mode, in accord with embodiments of the present invention. A data signal is received from a connection to a keypad bus (310), for example, by a communications processor 220. Prior to receiving the signal, and typically upon initial startup of the communications unit when connected to the keypad bus, an identification of the serial digital protocol of the keypad bus is made. Such a determination of the keypad bus protocol can be made by one of several methods including, for example, analyzing the received data signal from the keypad bus and comparing that signal to expected signal formats for keypad bus protocols, or transmitting a test command from one of a plurality of possible keypad bus protocols and analyzing a received responsive signal for conformity with the protocol of the transmitted signal, or analyzing signals transmitted by a keypad 170 in response to a predetermined code entered into keys 180, or analyzing timing parameters of the serial digital signal to determine the protocol type.

Using the determined keypad bus protocol, the signal received from the keypad bus can be interpreted (320). This interpretation can include determining the nature of the keypad bus signal (e.g., arm/disarm, zone tripped/not tripped, alarm controller status). A determination can then be made as to whether a communication mode to an external network has been previously selected (330). If not, then a selection of a communication mode to the external network can be made (335). As discussed above, the selection of a communication mode is made in response to periodic or continuous monitoring of the communication modes available to the communications unit. When a communication mode has been selected, a signal can then be generated corresponding to the protocol of the selected communication mode, wherein that signal includes information corresponding to the signal received from the keypad bus (340). That generated signal can then be transmitted to the external network via the selected communication mode (350). In order to perform such a transmission, it may be necessary to establish a link with the external network and ultimately to a remote server system coupled to the external network (e.g., 270) in order to effect the data transfer.

FIG. 4 is a simplified flow diagram illustrating steps for providing information in an alarm signal received from alarm processor's telephone interface to an external network, in accord with embodiments of the present invention. As discussed above, upon detecting an alarm condition, such as a sensor breach, an alarm processor of a legacy alarm system will use a phone line to contact a central monitoring service system. Embodiments of the present invention are coupled to the telephone interface of the legacy alarm system and will receive an off hook indication generated by the alarm controller unit telecommunication interface (410). In response to receiving the off hook indication, the communications processor can simulate the response to the off hook signal expected by the alarm controller unit (420). A "connection" will then be established between the alarm controller unit's telecommunication interface and the communications processor (430), for example, by the communications processor simulating responses that the alarm controller unit would expect to receive from a central monitoring service system (e.g., a handshake signal).

The alarm processor will then provide data related to the alarm condition that triggered the dial out. This data will be received from the alarm controller unit's telecommunications interface (435). Such data can be provided in a form of, for example, a set of dual tone multi-frequency signals (e.g., tone dialing) or through a modem-like exchange. The received data can then be interpreted, for example, in accord with the ContactID format (440). As with FIG. 3, a determination can be made as to whether a communication mode for communicating over an external network to a remote server has been selected (450). If a communication mode has not been selected, then a communication mode can be selected from among the available communication modes, as discussed above (455). Once a communication mode has been selected, a signal can be generated in the protocol of the selected communication mode that includes the information received from the telephone interface (460). The generated signal can then be transmitted to the external network via the selected communication mode. In this manner, alarm conditions can be supplied to a remote server system coupled to the selected external network.

Figure 5:
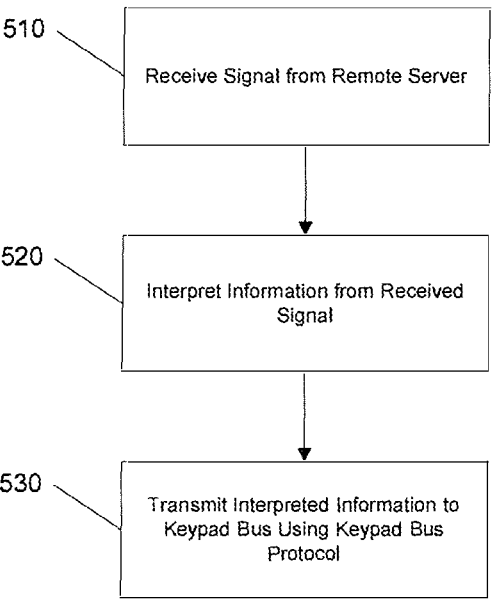
FIG. 5 is a simplified flow diagram illustrating steps performed in providing control information generated by a remote server to a legacy alarm system, in accord with embodiments of the present invention.

FIG. 5 is a simplified flow diagram illustrating steps performed in providing control information generated by a remote server to a legacy alarm system, in accord with embodiments of the present invention. For example, in response to a user command or for network system maintenance, a remote server (e.g., 270) can generate a signal containing control information for the legacy alarm system. The remote server can transmit that information to the control unit via a communication mode selected by the remote server. While the remote server can be periodically provided with information related to the communication unit's selected communication mode (as well as other status information related to the communication unit), the remote server can itself determine a preferred communication mode and use that mode. The remote server can track and provide information regarding the communication unit's selected communication mode.

A signal from the remote server containing the control information can be received (510). The received signal can then be interpreted to determine the nature of the control information contained in the signal (520). The interpreted information can then be transmitted to the keypad bus using a signal formatted for the appropriate keypad bus protocol (530).

As stated above, the remote server system (e.g., remote server system 270) is a computer system coupled to a network external to communications unit 210. The remote server system can receive status and alarm information from the communications unit and store and/or communicate the received status or alarm information to a user of the alarm system or to a monitoring station (e.g., a central station at which an operator can determine the appropriate authorities to contact based upon the nature of an alarm condition). The remote server system can also provide control information to the communications unit, including, for example, configuration information and updates to the communications unit and/or the alarm system. The remote server system can be configured to respond to the various status and/or alarm conditions by the user of the alarm system or an administrator of the remote server system, as discussed more fully below.

Figure 6:
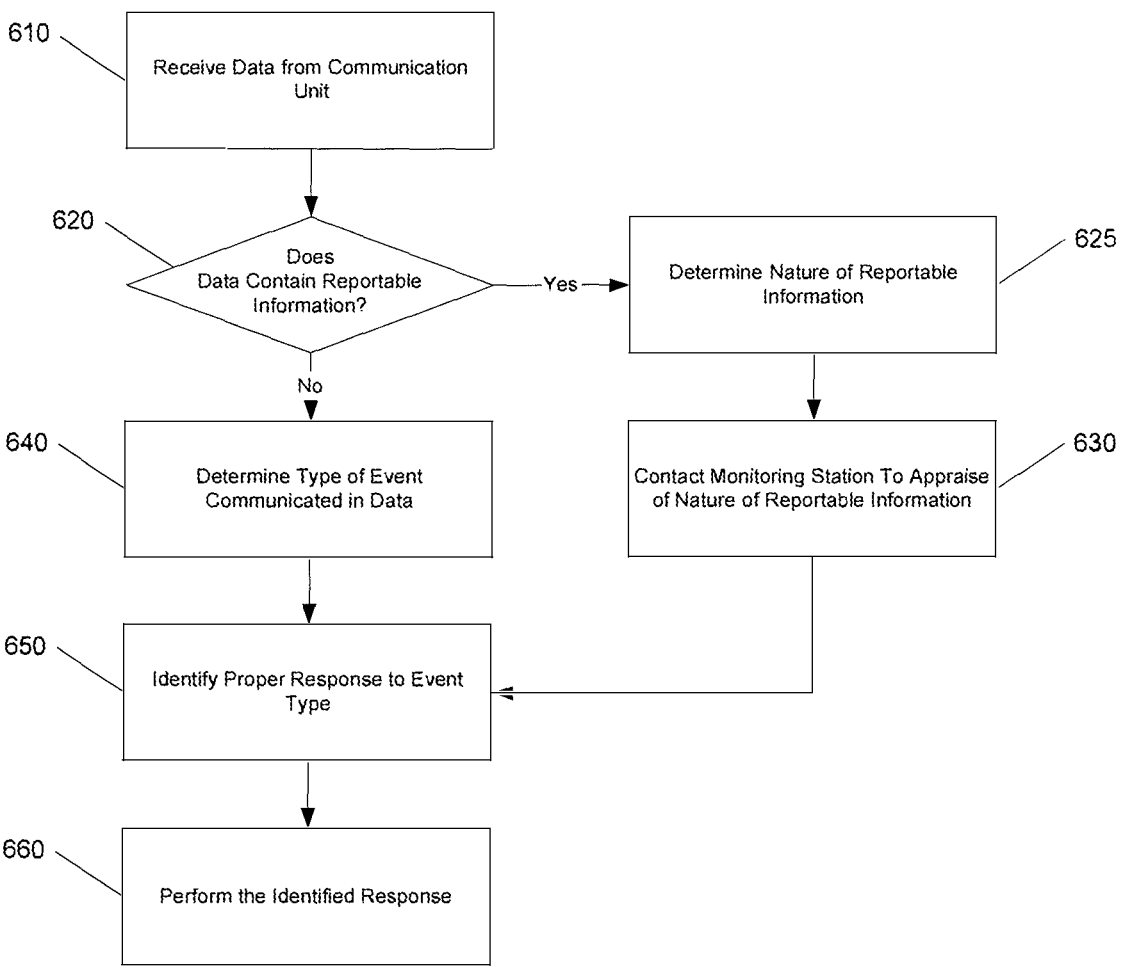
FIG. 6 is a simplified flow diagram illustrating a method performed by a remote server system in response to receiving data from a communications unit, in accord with embodiments of the present invention.

FIG. 6 is a simplified flow diagram illustrating a method followed by a remote server system in response to receiving data from a communications unit, in accord with embodiments of the present invention. The remote server system can receive data transmitted by a communications unit (e.g., 210) (610). The data will be received by the remote server system over a communication mode selected by the communication unit, as discussed above.

The data received can correspond to, for example, status information related to alarm controller unit 110 or communications unit 210, or alarm information related to a security breach. The remote server system will analyze the received data to determine whether the data contains reportable information, such as an alarm condition (620). If the data is related to reportable information, the server system will determine the nature of the reportable information (e.g., an alarm condition such as a fire or an unauthorized breach of a zone) (625). Based upon that determination, the remote server system can then contact a monitoring station to appraise an operator of the monitoring system, or an automated system, of the nature of the reportable information (630). Should the data received from the communication unit not contain reportable information, then the remote server system can determine the type of event described by the received data (640).

In either situation (reportable or non-reportable event), the remote server system can then identify a proper response to the event type described by the received data (650). Such an identification of a proper response can be performed through a search of a set of responses stored by the remote server system each of which are mapped to one or more event types. The set of responses can be defined, at least in part, by the user of the alarm system or an administrator of the remote server system. The remote server system can enable an authorized user to log on and can provide an interface (e.g., a set of web browser pages using, for example, HTML or XML or applets) through which the various responses can be added, deleted, or modified. For example, a user can configure the remote server system to alert a specified person when the remote server system receives data from the communications unit indicating that a specified disarm sequence has been provided through a keypad. Such an alert to the user can be provided by a specified communication path (e.g., electronic mail, text message, instant message, telephone or cellular phone call, RSS feed, a web page update or an applet).

Once a proper response to an event type is identified, the remote server system can then perform the identified response (660). For example, the remote server system can contact identified individuals and inform them of the nature of an event type, using a chosen communication delivery method such as electronic mail, text or instant messages, telephone calls, or an update to a web page or applet. The remote server system can also be configured to accept inputs from a user or administrator that correspond to control information for the alarm system controller unit (e.g., 110) or the communications unit (e.g., 210). An authorized user for a particular alarm system can access interfaces provided by the remote server system for entering such control information (e.g., web pages). The remote server system can then interpret the control information and provide that information to the communications unit over a communications mode selected by the remote server system. The communications unit will then receive that control information and provide the control information, as appropriate, to the alarm system controller unit as discussed above with regard to FIG. 5. An example of control information that can be provided by a user to the alarm system via the remote server system can include remotely arming or disarming the alarm system.

One of the advantages of the present invention is that the communication unit provides two-way communication over a plurality of communication modes to a legacy alarm system. Thus, without replacing the legacy alarm system, a user of the system gains added functionality such as redundant connectivity and the ability to monitor and remotely control the legacy alarm system. Such an addition of functionality, rather than a whole scale replacement of an alarm system, can be provided at a substantially lower cost than replacing the system.

Figure 7:
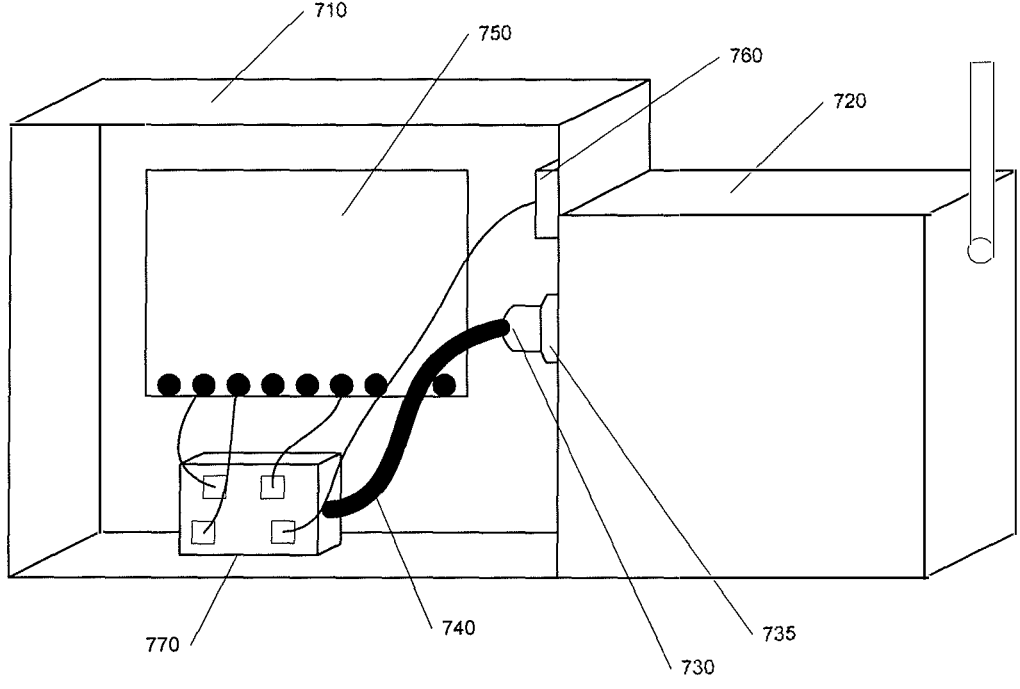
FIG. 7 is a simplified block diagram illustrating one example of a connection between a communication unit and a legacy alarm system controller, in accord with embodiments of the present invention.

FIG. 7 is a simplified block diagram illustrating one example of a connection between a communication unit 210 and a legacy alarm system controller unit 110. Typically, a legacy alarm system controller is housed in a wall-mounted metal housing 710. Such an alarm system controller housing will typically have a key-lockable door (not shown) in order to restrict access to the circuitry and connections inside. One embodiment of a communications unit of the present invention can be housed in a housing 720 that can be attached to the alarm control unit housing 710. Coupling between communications unit housing 720 and alarm control unit housing 710 can be performed by creating a hole in the alarm control unit's housing (typically by cutting out a pre-etched punch out in the housing) and passing through that hole a connector 730 that is rigidly mounted to the exterior of the communication unit housing and securing that connector to the alarm control unit's housing 710 (e.g., through use of a nut 735 threaded on the connector). Connector 730 can allow for passage into alarm control unit housing 710 of a cable 740 that includes necessary connector wires for coupling the communications unit to, for example, alarm system power, the keypad bus, and the telecommunications link to the alarm processor (all coupled to an alarm printed circuit board 750), and the telephone line interface 760. Typically, connections can be made to the alarm system power, keypad bus, etc. through already present screw down connections coupled to the alarm printed circuit board, or to modular jack connections (e.g., the telephone line interface). For ease of providing such connections, cable 740 can terminate in a hub 770 that provides connectors for the various coupling lines to the alarm printed circuit board 750 and telephone line interface 760. Thus, connection of a communications unit to the alarm system can be performed by a homeowner, rather than a paid installer, thereby further reducing the cost, both to the user and to a supplier of the communications unit.

Embodiments of the present invention therefore provide a cost-effective solution for providing a legacy alarm system with a capacity to communicate over a selected one of a plurality of communication modes, thereby avoiding a single point of failure of many legacy alarm systems, and provides the added functionality of two-way communication from a remote server allowing control over the legacy alarm system from a location other than within the premises in which the alarm system is installed.

An Example Computing Environment

As shown above, the present invention can be implemented using a variety of computer systems, for example with regard to server system 270. An example of one such computing environment is described below with reference to FIG. 8.

Figure 8:
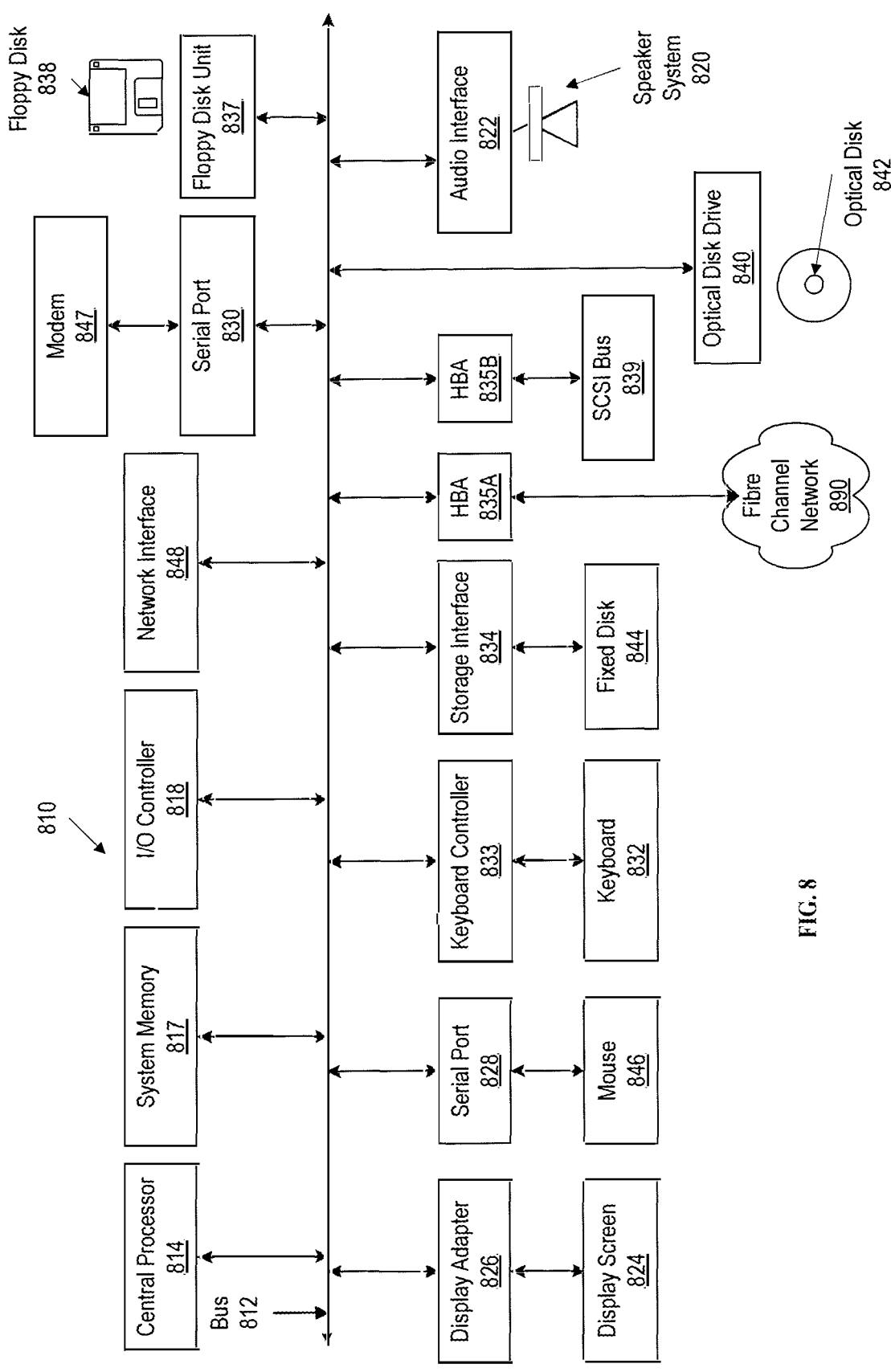
FIG. 8 depicts a block diagram of a computer system suitable for implementing embodiments of the present invention.

FIG. 8 depicts a block diagram of a computer system 810 suitable for implementing embodiments of the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote computer, or a communications unit 210, via a telephone link through a PSTN. Network interface 848 may provide a direct connection to a remote computer, or a communications unit 210, via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present invention. The devices and subsystems can be interconnected in different ways from that shown in FIG. 8. The operation of a computer system such as that shown in FIG. 8 is readily known in the art and is not discussed in detail in this application. Code to implement the present invention can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Other Embodiments

The present invention is well adapted to attain the advantages mentioned as well as others inherent therein. While the present invention has been depicted, described, and is defined by reference to particular embodiments of the present invention, such references do not imply a limitation on the invention, and no such limitation is to be inferred. The invention is capable of considerable modification, alteration, and equivalents in form and function as will occur to those ordinarily skilled in the pertinent arts. The depicted and described embodiments are examples only, and are not exhaustive of the scope of the invention.

The foregoing describes embodiments including components contained within other components (e.g., the various elements shown as components of communications unit 210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected" or "operably coupled" to each other to achieve the desired functionality.

The foregoing detailed description has set forth various examples of the present invention via the use of block diagrams, flow charts, and examples. It will be understood by those within the art that each block diagram component, flow chart step, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalence in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

13

The invention claimed is:

1. A method comprising:

receiving, by a first computing device located at a premises, event data associated with one or more premises devices located at the premises;

caching, based on a determination that connectivity associated with a plurality of communication modes does not satisfy a threshold, the event data;

determining that connectivity associated with at least a first communication mode and a second communication mode of the plurality of communication modes satisfies the threshold;

determining, by the first computing device, that the first communication mode has better connectivity than the second communication mode;

determining that the second communication mode has a higher priority than the first communication mode; and sending, to a second computing device, based on determining that the second communication mode has the higher priority than the first communication mode, the event data via the second communication mode.

2. The method of claim 1, wherein the caching the event data comprises storing at least one of the event data in a memory associated with the first computing device or storing time stamps associated with the event data.

3. The method of claim 1, wherein the event data is first event data, and wherein the method further comprises:

receiving, by the first computing device, second event data associated with the one or more premises devices; and sending, based on a determination of a type associated with the second event data, the second event data to the second computing device via the first communication mode.

4. The method of claim 1, wherein at least one of the first communication mode or the second communication mode comprises at least one of a broadband connection, a cellular connection, or a public switched telephone network (PSTN).

5. The method of claim 1, wherein the connectivity associated with the plurality of communication modes comprises at least one of a connection strength, a connection with a network, a heartbeat signal, a voltage, or a bandwidth.

6. The method of claim 1, wherein the event data comprises at least one of sensor data, camera data, information indicative of a voltage drop, status information, control information, or alarm event information.

7. A first computing device comprising:

one or more processors; and memory storing instructions that, when executed by the one or more processors, cause the first computing device to:

receive event data associated with one or more premises devices located at a premises, wherein the first computing device is located at the premises;

cache, based on a determination that connectivity associated with a plurality of communication modes does not satisfy a threshold, the event data;

determine that connectivity associated with at least a first communication mode and a second communication mode of the plurality of communication modes satisfies the threshold;

determine, by the first computing device, that the first communication mode has better connectivity than the second communication mode;

determine that the second communication mode has a higher priority than the first communication mode; and

send, to a second computing device, based on determining that the second communication mode has the higher priority than the first communication mode, the event data via the second communication mode.

8. The first computing device of claim 7, wherein causing the first computing device to cache the event data further comprises causing the first computing device to store at least one of the event data in a memory associated with the first computing device or store time stamps associated with the event data.

9. The first computing device of claim 7, wherein the event data is first event data, and wherein the instructions, when executed, further cause the first computing device to:

receive, by the first computing device, second event data associated with the one or more premises devices; and send, based on a determination of a type associated with the second event data, the second event data to the second computing device via the first communication mode.

10. The first computing device of claim 7, wherein at least one of the first communication mode or the second communication mode comprises at least one of a broadband connection, a cellular connection, or a public switched telephone network (PSTN).

11. The first computing device of claim 7, wherein the connectivity associated with the plurality of communication modes comprises at least one of a connection strength, a connection with a network, a heartbeat signal, a voltage, or a bandwidth.

12. The first computing device of claim 7, wherein the event data comprises at least one of sensor data, camera data, information indicative of a voltage drop, status information, control information, or alarm event information.

13. A system comprising:

a first computing device located at a premises;

a second computing device; and one or more premises devices located at the premises, wherein the first computing device is configured to:

receive event data associated with the one or more premises devices located at the premises;

cache, based on a determination that connectivity associated with a plurality of communication modes does not satisfy a threshold, the event data;

determine that connectivity associated with at least a first communication mode and a second communication mode of the plurality of communication modes satisfies the threshold;

determine that the first communication mode has better connectivity than the second communication mode;

determine that the second communication mode has a higher priority than the first communication mode; and send, to the second computing device, based on determining that the second communication mode has the higher priority than the first communication mode, the event data via the second communication mode.

14. The system of claim 13, wherein the first computing device is further configured to store at least one of the event data in a memory associated with the first computing device or store time stamps associated with the event data.

15. The system of claim 13, wherein the event data is first event data, and wherein the first computing device is further configured to:

receive second event data associated with the one or more premises devices; and

send, based on a determination of a type associated with the second event data, the second event data to the second computing device via the first communication mode.

16. The system of claim 13, wherein at least one of the first communication mode or the second communication mode comprises at least one of a broadband connection, a cellular connection, or a public switched telephone network (PSTN).

17. The system of claim 13, wherein the connectivity associated with the plurality of communication modes comprises at least one of a connection strength, a connection with a network, a heartbeat signal, a voltage, or a bandwidth.

18. The system of claim 13, wherein the event data comprises at least one of sensor data, camera data, information indicative of a voltage drop, status information, control information, or alarm event information.

19. A non-transitory computer-readable medium storing instructions that, when executed, cause:

receiving, by a first computing device located at a premises, event data associated with one or more premises devices located at the premises;

caching, based on a determination that connectivity associated with a plurality of communication modes does not satisfy a threshold, the event data;

determining that connectivity associated with at least a first communication mode and a second communication mode of the plurality of communication modes satisfies the threshold;

determining, by the first computing device, that the first communication mode has better connectivity than the second communication mode;

determining that the second communication mode has a higher priority than the first communication mode; and sending, to a second computing device, based on determining that the second communication mode has the higher priority than the first communication mode, the event data via the second communication mode.

20. The non-transitory computer-readable medium of claim 19, wherein the instructions, when executed, further cause storing, by the first computing device, at least one of the event data in a memory associated with the first computing device or storing time stamps associated with the event data.

21. The non-transitory computer-readable medium of claim 19, wherein the event data is first event data, and wherein the instructions, when executed, further cause:

receiving, by the first computing device, second event data associated with the one or more premises devices; and sending, based on a determination of a type associated with the second event data, the second event data to the second computing device via the first communication mode.

22. The non-transitory computer-readable medium of claim 19, wherein at least one of the first communication mode or the second communication mode comprises at least one of a broadband connection, a cellular connection, or a public switched telephone network (PSTN).

23. The non-transitory computer-readable medium of claim 19, wherein the connectivity associated with the plurality of communication modes comprises at least one of a connection strength, a connection with a network, a heartbeat signal, a voltage, or a bandwidth.

24. The non-transitory computer-readable medium of claim 19, wherein the event data comprises at least one of sensor data, camera data, information indicative of a voltage drop, status information, control information, or alarm event information.

* * * * *